(12) United States Patent
Shives et al.

(10) Patent No.: US 12,455,287 B2
(45) Date of Patent: Oct. 28, 2025

(54) FLOW CYTOMETRY EVALUATION FOR UNASSOCIATED NON-ENVELOPED VIRAL PARTICLES

(71) Applicant: Sartorious BioAnalytical Instruments, Inc., Bohemia, NY (US)

(72) Inventors: Katherine D. Shives, Aurora, CO (US); Antje Schickert, Arvada, CO (US); Rebecca K. Montange, Louisville, CO (US); Jeffrey W. Steaffens, Broomfield, CO (US)

( * ) Notice: Subject to any disclaimer, the term of this patent is extended or adjusted under 35 U.S.C. 154(b) by 1031 days.

(21) Appl. No.: 17/441,177

(22) PCT Filed: Feb. 5, 2020

(86) PCT No.: PCT/US2020/016808
§ 371 (c)(1),
(2) Date: Sep. 20, 2021

(87) PCT Pub. No.: WO2020/197644
PCT Pub. Date: Oct. 1, 2020

(65) Prior Publication Data
US 2022/0268773 A1  Aug. 25, 2022

Related U.S. Application Data

(60) Provisional application No. 62/824,116, filed on Mar. 26, 2019.

(51) Int. Cl.
  *G01N 33/569* (2006.01)
  *G01N 1/30* (2006.01)
  *G01N 15/14* (2006.01)
  *G01N 15/00* (2006.01)

(52) U.S. Cl.
  CPC ......... *G01N 33/56983* (2013.01); *G01N 1/30* (2013.01); *G01N 15/1459* (2013.01); *G01N 2015/0038* (2013.01)

(58) Field of Classification Search
  CPC .............. G01N 33/56983; G01N 1/30; G01N 15/1459; G01N 2015/0038
  See application file for complete search history.

(56) References Cited

U.S. PATENT DOCUMENTS

| | | |
|---|---|---|
| 4,857,451 A | 8/1989 | Schwartz |
| 5,040,890 A | 8/1991 | North, Jr. |
| 5,245,318 A | 9/1993 | Tohge et al. |
| 5,306,467 A | 4/1994 | Douglas-Hamilton et al. |
| 5,321,130 A | 6/1994 | Yue et al. |
| 5,351,118 A | 9/1994 | Spinell |
| 5,374,398 A | 12/1994 | Isami et al. |
| 5,395,588 A | 3/1995 | North, Jr. et al. |
| 5,410,030 A | 4/1995 | Yue et al. |
| 5,483,469 A | 1/1996 | Van den Engh et al. |
| 5,602,039 A | 2/1997 | Van den Engh |
| 5,616,502 A | 4/1997 | Haugland et al. |
| 5,690,895 A | 11/1997 | Matsumoto et al. |
| 5,736,105 A | 4/1998 | Astle |
| 5,895,764 A | 4/1999 | Sklar et al. |
| 6,110,427 A | 8/2000 | Uffenheimer |
| 6,183,697 B1 | 2/2001 | Tanaka et al. |
| 6,248,590 B1 | 6/2001 | Malachowski |
| 6,256,096 B1 | 7/2001 | Johnson |
| 6,432,630 B1 | 8/2002 | Blankenstein |
| 6,550,324 B1 | 4/2003 | Mayer et al. |
| 6,589,792 B1 | 7/2003 | Malachowski |
| 6,592,822 B1 | 7/2003 | Chandler |
| 6,597,438 B1 | 7/2003 | Cabuz et al. |
| 6,664,047 B1 | 12/2003 | Haugland et al. |
| 6,813,944 B2 | 11/2004 | Mayer et al. |
| 6,878,556 B2 | 4/2005 | Sklar et al. |
| 6,880,414 B2 | 4/2005 | Norton |
| 6,890,487 B1 | 5/2005 | Sklar et al. |
| 7,016,022 B2 | 3/2006 | Fritz et al. |
| 7,061,595 B2 | 6/2006 | Cabuz et al. |
| 7,069,191 B1 | 6/2006 | Moore |
| 7,277,166 B2 | 10/2007 | Padmanabhan et al. |
| 7,307,721 B2 | 12/2007 | King |
| 7,318,336 B2 | 1/2008 | Roth et al. |
| 7,355,696 B2 | 4/2008 | Mueth et al. |

(Continued)

FOREIGN PATENT DOCUMENTS

| | | |
|---|---|---|
| CA | 2796489 A1 | 5/2014 |
| EP | 0822404 A2 | 2/1998 |

(Continued)

OTHER PUBLICATIONS

Brown, M. R., et al., 2015, Flow cytometric quantification of viruses in activated sludge, Water Research 68:414-422.*
Cantera, J. L., et al., Jan. 2010, Detection of Infective Poliovirus by a Simple, Rapid, and Sensitive Flow Cytometry Method Based on Fluorescence Resonance Energy Transfer Technology, Appl. Environmental Microbiol. 76(2):584-588.*
Sandhu, K. S., et al., 2008, Monitoring of the Adenovirus Production Process by Flow Cytometry, Biotechnol. Prog. 24:250-261.*
Berlier, J. E., et al., 2003, Quantitative Comparison of Long-wavelength Alexa Fluor Dyes to Cy Dyes: Fluorescence of the Dyes and Their Bioconjugates, J. Histochem. Cytochem. 51(12):1699-1712.*

(Continued)

*Primary Examiner* — Jeffrey S Parkin
(74) *Attorney, Agent, or Firm* — Holzer Patel Drennan

(57) ABSTRACT

A method for flow cytometry evaluation of unassociated non-enveloped viral particles having a non-enveloped viral capsid includes preparing a fluorescently-stained fluid sample in which at least one fluorescent staining step is performed at an acidic pH in an acidic pH range and then subjecting the fluorescently-stained fluid sample to flow cytometry evaluation. A kit includes a plurality of sealed container with a first sealed container containing a fluorescent stain composition and a second sealed container including an aqueous dilution liquid at an acidic pH.

20 Claims, 11 Drawing Sheets

(56) References Cited

U.S. PATENT DOCUMENTS

| | | |
|---|---|---|
| 7,368,084 B2 | 5/2008 | Sklar et al. |
| 7,420,659 B1 | 9/2008 | Cabuz et al. |
| 7,452,725 B2 | 11/2008 | Leary et al. |
| 7,471,394 B2 | 12/2008 | Padmanabhan et al. |
| 7,485,153 B2 | 2/2009 | Padmanabhan et al. |
| 7,553,453 B2 | 6/2009 | Gu et al. |
| 7,671,987 B2 | 3/2010 | Padmanabhan et al. |
| 7,688,427 B2 | 3/2010 | Cox et al. |
| 7,691,636 B2 | 4/2010 | Frazier et al. |
| 7,754,421 B2 | 7/2010 | Transfiguracion et al. |
| 7,758,811 B2 | 7/2010 | Durack et al. |
| 7,776,268 B2 | 8/2010 | Rich |
| 7,780,916 B2 | 8/2010 | Bair et al. |
| 7,817,276 B2 | 10/2010 | Kiesel et al. |
| 7,978,329 B2 | 7/2011 | Padmanabhan et al. |
| 7,981,661 B2 | 7/2011 | Rich |
| 8,017,402 B2 | 9/2011 | Rich |
| 8,071,051 B2 | 12/2011 | Padmanabhan et al. |
| 8,134,705 B2 | 3/2012 | Kaduchak et al. |
| 8,182,767 B2 | 5/2012 | Padmanabhan et al. |
| 8,187,888 B2 | 5/2012 | Rich |
| 8,202,733 B1 | 6/2012 | Javadi |
| 8,262,990 B2 | 9/2012 | Bair et al. |
| 8,263,955 B2 | 9/2012 | Kiesel et al. |
| 8,273,294 B2 | 9/2012 | Padmanabhan et al. |
| 8,283,177 B2 | 10/2012 | Ball et al. |
| 8,482,731 B2 | 7/2013 | Muraki |
| 9,546,936 B2 | 1/2017 | Rowlen et al. |
| 9,816,912 B2 | 11/2017 | Artinger et al. |
| 9,880,085 B2 | 1/2018 | Wilson et al. |
| 9,903,803 B2 | 2/2018 | Smolak et al. |
| 9,927,346 B2 | 3/2018 | Wilson et al. |
| 10,031,061 B2 | 7/2018 | Rowlen et al. |
| 10,041,103 B2 | 8/2018 | Bellinzoni et al. |
| 10,101,262 B2 | 10/2018 | Artinger et al. |
| 10,161,850 B2 * | 12/2018 | Artinger ................. C12N 7/00 |
| 10,184,878 B2 | 1/2019 | Smolak et al. |
| 10,408,734 B2 | 9/2019 | Artinger et al. |
| 10,520,420 B2 | 12/2019 | Smolak et al. |
| 10,545,084 B2 | 1/2020 | Artinger et al. |
| 10,585,030 B2 | 3/2020 | Artinger et al. |
| 10,705,007 B2 | 7/2020 | Rowlen et al. |
| 10,739,246 B2 | 8/2020 | Artinger et al. |
| 11,137,337 B2 | 10/2021 | Gates et al. |
| 2003/0235919 A1 | 12/2003 | Chandler |
| 2005/0105077 A1 | 5/2005 | Padmanabhan et al. |
| 2006/0038989 A1 | 2/2006 | Domack et al. |
| 2006/0134002 A1 | 6/2006 | Lin |
| 2006/0163119 A1 | 7/2006 | Hirano et al. |
| 2006/0195268 A1 | 8/2006 | Vega |
| 2006/0259253 A1 | 11/2006 | Ellison et al. |
| 2008/0021674 A1 | 1/2008 | Puskas |
| 2008/0100840 A1 | 5/2008 | Oma et al. |
| 2008/0152542 A1 | 6/2008 | Ball et al. |
| 2008/0252884 A1 | 10/2008 | Carr |
| 2009/0023132 A1 | 1/2009 | Champseix |
| 2009/0029870 A1 | 1/2009 | Ward et al. |
| 2009/0104075 A1 | 4/2009 | Rich |
| 2009/0105963 A1 | 4/2009 | Laursen et al. |
| 2010/0261153 A1 | 10/2010 | Scholl et al. |
| 2010/0284016 A1 | 11/2010 | Teitell et al. |
| 2010/0319469 A1 | 12/2010 | Rich |
| 2011/0024615 A1 | 2/2011 | Tanner et al. |
| 2011/0089328 A1 | 4/2011 | Li |
| 2012/0077260 A1 | 3/2012 | Sharon et al. |
| 2012/0140205 A1 | 6/2012 | Kaduchak et al. |
| 2013/0050782 A1 | 2/2013 | Heng et al. |
| 2013/0080082 A1 | 3/2013 | Howes et al. |
| 2013/0137135 A1 | 5/2013 | Tai et al. |
| 2013/0171683 A1 | 7/2013 | Durack et al. |
| 2013/0252237 A1 | 9/2013 | Wagner |
| 2013/0327957 A1 | 12/2013 | Ayliffe |
| 2013/0338968 A1 | 12/2013 | Hanashi et al. |
| 2015/0132766 A1 | 5/2015 | Yasuda et al. |
| 2016/0273058 A1 | 9/2016 | Akashika et al. |
| 2017/0023570 A1 | 1/2017 | Reyes |
| 2021/0239581 A1 | 8/2021 | Montange et al. |

FOREIGN PATENT DOCUMENTS

| | | |
|---|---|---|
| EP | 1176412 A2 | 1/2002 |
| EP | 2652511 B1 | 5/2017 |
| KR | 20130128348 A | 11/2013 |
| WO | 9306482 A1 | 4/1993 |
| WO | 9636882 A1 | 11/1996 |
| WO | 2005059178 A1 | 6/2005 |
| WO | 2007103969 A2 | 9/2007 |
| WO | 2008010120 A2 | 1/2008 |
| WO | 2009093017 A1 | 7/2009 |
| WO | 2010132053 A1 | 11/2010 |
| WO | 2013147114 A1 | 10/2013 |
| WO | 2014062719 A2 | 4/2014 |
| WO | 2014210370 A1 | 12/2014 |
| WO | 2015187700 A2 | 12/2015 |
| WO | 2015187783 A1 | 12/2015 |
| WO | 2016048872 A1 | 3/2016 |
| WO | 2016154283 A1 | 9/2016 |
| WO | 2016154286 A1 | 9/2016 |
| WO | 2020028639 A1 | 2/2020 |
| WO | 2020197644 A1 | 10/2020 |

OTHER PUBLICATIONS

Virus Counter(R), Hardware Model: 3100, Software Version 3.0, Operation Manual, Sartorius; Rev B, Mar. 2018.

Rossi et al.; "Evaluation of ViroCyt Virus Counter for Rapid Filovirus Quantification"; Viruses; Feb. 20, 2015; 7; pp. 857-872.

Stoffel et al.; "Design and Characterization of a Compact Dual Channel Virus Counter"; Cytometry Part A, 65A, Wiley-Liss, Inc. (2005), pp. 140-147.

Wikipedia; "Virus Quantification"; http://en.wikipedia.org/wiki/Virus_quantification; 8 pgs.

Automation.com; "Honeywell Introduces High-Performance, Liquid Nano-Flow Sensor"; Jul. 30, 2004; 5 pgs.

Hercher et al.; "Detection and Discrimination of Individual Viruses by Flow Cytometry"; Journal of Histochemistry & Cytochemistry; Jan. 1, 1979; pp. 350-352.

Molecular Probes, "Electrophoretic Mobility-Shift Assay (EMSA) Kit (E33075)", Product Information MP33075, 2007, 4 pages.

Gates, Tyler et al., "Rapid, Real Time Quantification of Lentivirus Particles Using Antibody-Based Detection on the Virus Counter® 3100 Platform", 2018, Sartorius Stedim Biotech, 4 pages.

Gates, Tyler et al., "Rapid, Real Time Quantification of Lentivirus Particles Using Antibody-Based Detection on the Virus Counter® 3100 Platform", Application Note, 2018, Sartorius, 4 pages.

Decherchi et al, "Dual staining assessment of Schwann cell viability within whole peripheral nerves using calcein-AM and ethidium homodimer", Journal of Neuroscience Methods., vol. 71, No. 2, 1997, pp. 205-213.

Natunen, Katariina et al., "Nile Red staining of phytoplankton neutral lipids: species-specific fluorescence kinetics in various solvents", J Appl Phycol, 2015, vol. 27, pp. 1161-1169 (published online Sep. 17, 2014).

Stacking (chemistry), Wikipedia, 10 pages, accessed Apr. 28, 2018.

S6653, SYPRO® Red protein gel stain, Safety Data Sheet, ThermoFisher Scientific, 2018, 9 pages.

Wong, Amy G. et al., "The dye SYPRO orange binds to amylin amyloid fibrils but not pre-fibrillar intermediates", Protein Science, 2016, vol. 25, pp. 1834-1840.

P3584, POPO™—3 iodide (534/570) *1 mM solution in DMF*, Safety Data Sheet, Life Technologies, 2013, 7 pages.

Zhegalova, Natalia G. et al., "Minimization of self-quenching fluorescence on dyes conjugated to biomolecules with multiple labeling sites via asymmetrically charged NIR fluorophores", Contrast Media Mol Imaging, 2014, vol. 9(5), pp. 355-362, NIH Public Access Author Manuscript.

SYPRO® Orange and SYPRO® Red Protein Gel Stains, Product Information, 2003, Molecular Probes, 5 pages.

(56) References Cited

OTHER PUBLICATIONS

Dimeric Cyanine Nucleic Acid Stains, Product Information, 2000, Molecular Probes, 4 pages.

Guryev, Oleg et al., "Control of the Fluorescence of Dye-Antibody Conjugates by (2-Hydroxypropyl)-ß-cyclodextrin in Fluorescence Microscopy and Flow Cytometry", Analytical Chemistry, 2011, vol. 83, pp. 7109-7114.

Steinberg, Thomas H., Chapter 31, Protein Gel Staining Methods: An Introduction and Overview, Methods in Enzymology, vol. 463, 2009, pp. 541-563.

Hawe, Andrea et al., "Extrinsic Fluorescent Dyes as Tools for Protein Characterization", Pharmaceutical Research, vol. 25, No. 7, 2008, pp. 1487-1499.

Handbook of Flourescent Probes and Research Products, 2002, Molecular Probes, Table of Contents (2 pages), and pp. 1-6 (Introduction), 269-287 (Section 8.1, Nucleic Acid Stains), 355-377 (Section 9.1, Introduction to Protein Detection, and Section 9.2, Quantification and Selective Purification of Proteins in Gels, on Blots and in Capillary Electrophoresis) and 909-950 (Master Product List), accessed at www.mobitec.de/probes/docs.

Virus Counter(R), 3100 Reagent Kit, Part No. VIR-92333, Sartorius, 2018; Reference Doc: 3987, Effective Date Dec. 14, 2018, 1 page.

Matthiesen, Steen H et al., "Fast and Non-Toxic In Situ Hybridization without Blocking of Repetive Sequences", PLoS One, Jul. 2012, vol. 7, Issue 7, e40675, pp. 1-8.

Suomalainen, Maarit et al., "Uncoating of non-enveloped viruses" SciVerse Science Direct, CurrentOpinion in Virology, www.sciencedirect.com, 2013, vol. 3, pp. 27-33.

Phelps, Donald K. et al., "Theoretical studies of viral capsid proteins", Current Opinion in Structural Biology, 2000, Department of Medicinal Chemistry, Purdue University, vol. 10, pp. 170-173.

Lin, Jun et al., "Structure of the Fab-Labeled 'Breathing' State of Native Poliovirus", Journal of Virology, downloaded from http://jvi.asm.og on Jan. 26, 2017; Mar. 7, 2012, vol. 86, No. 10, pp. 5959-5962.

Wang, Lintao et al., "Detecting structural changes in viral capsids by hydrogen exchange and mass spectometry", Protein Science, 2001, vol. 10, pp. 1234-1243.

Bremner, K. Helen et al., Adenovirus Transport via Direct Interaction of Cytoplasmic Dynein with the Viral Capsid Hexon Subunit, Cell Host & Microbe Article, Dec. 17, 2009, vol. 6, pp. 523-535.

Varga, Mikael J. et al., "Antibodies with Specificities against a Dispase-Produced 15-Kilodalton Hexon Fragment Neutralize Adenovirus Type 2 Infectivity" Journal of Virology, vol. 64, No. 9, Sep. 1990, pp. 4217-4225.

Scherer, Julian et al., "Adenovirus Recruits Dynein by an Evolutionary Novel Mechanism Involving Direct Binding to pH-Primed Hexon", www.dmpi.com/journal/viruses, 2011, doi:10.3390/v3081417, vol. 3, pp. 1417-1431.

Salganik, Maxim et al., "Evidence for pH-Dependent Protease Activity in the Adeno-Associated Virus Capsid", Journal of Virology, downloaded from http://jvi.asm.org on Jul. 3, 2018; Nov. 2012, vol. 86, No. 21, pp. 11877-11885.

Moraes, Adolfo H. et al., "Antibody Binding Modulates Conformational Exchange in Domain III of Dengue Virus E Protein", Journal of Virology, downloaded from http://jvi.asm.org on Aug. 24, 2018; Feb. 2016, vol. 90, No. 4, pp. 1802-1811.

Haslwanter, Denise et al., "A novel mechanism of antibody-mediated enhancement of flavivirus infection", PLOS Pathogens, https://doi.org/10.1371/journal.ppat.1006643, Sep. 15, 2017, pp. 1-27.

Brown, M.R., et al. "Flow cymetric quantification of viruses in activated sludge", Water Research, Elsevier, Amsterdam, NL, vol. 68, Oct. 8, 2014, pp. 414-422.

Safety Data Sheet Buffer Solution pH4, Carolina Biological Supply Company, Oct. 29, 2015, URL:https://www.lewisu.edu/academics/biology/pdf/pH%20Bufter"/"204.pdt [retrieved on May 15, 2020], 4 pages.

El-Hamalawi A-R A et al. "The Fluorometric Determination of Nucleic Acids in Pea Seeds by Use of Ethidium Bromide Complexes", Analytical Biochemistry, Academic Press, vol. 67, No. 2, Aug. 1, 1975, pp. 384-391.

\* cited by examiner

FLOW CYTOMETRY EVALUATION FOR UNASSOCIATED NON-ENVELOPED VIRAL PARTICLES

CROSS-REFERENCE

This application claims a priority benefit provisional patent application No. 62/824,116 entitled "FLOW CYTOMETRY EVALUATION FOR UNASSOCIATED NON-ENVELOPED VIRAL PARTICLES", filed Mar. 26, 2019, the entire contents of which are incorporated herein by reference for all purposes. The entire contents of each of the following co-owned patent applications are incorporated by reference herein for all purposes: U.S. provisional patent application No. 62/713,377 entitled "METHOD, KIT AND STAIN COMPOSITION FOR FLOW CYTOMETRY EVALUATION OF UNASSOCIATED VIRUS-SIZE PARTICLES USING MULTIPLE FLUOROGENIC DYES", filed Aug. 1, 2018; international patent application no. PCT/US2019/044623 entitled "METHODS, KITS AND STAIN COMPOSITIONS FOR FLOW CYTOMETRY EVALUATION OF UNASSOCIATED VIRUS-SIZE PARTICLES USING MULTIPLE FLUOROGENIC DYES", fried Aug. 1, 2019; and U.S. patent application Ser. No. 16/781,782 entitled "LIQUID FLUORESCENT DYE CONCENTRATE FOR FLOW CYTOMETRY EVALUATION OF VIRUS-SIZE PARTICLES AND RELATED PRODUCTS AND METHODS" filed Feb. 4, 2020.

BACKGROUND

Flow cytometry is an analytical technique for measuring physical and/or chemical properties of particles as they flow in a fluid sample through an investigation cuvette, commonly referred to as a flow cell, of a flow cytometer. Although a sample fluid may be investigated by subjecting the sample fluid to a variety of stimuli, radiation, typically in the form of light, is common stimulus technique. Flow cytometry is an important analytical technique that has gained wide acceptance for analyzing particles of biological material, and in particular for investigating properties of cells. More recently, flow cytometry has been adapted for use to detect unassociated (free in solution) virus particles, typically referred to as virions, and other extremely small particles of biological material of a similar size to viruses, referred to as virus-size particles. Such virus-size particles typically have a size of smaller than one micron, smaller 500 nanometers and in many cases smaller than 300 nanometers, smaller than 200 nanometers or even smaller than 100 nanometers. Some virus-size particles have a size on the order of tens of nanometers, although many have a size of at least 10 nanometers, often at least 20 nanometers or even at least 30 nanometers or larger. There are many types of viruses and other virus-size particles that have a particle size in a range of from 20 nanometers to 300 nanometers. As used herein, particle size is a reference generally to the maximum cross-dimension of the particle (e.g., diameter of a sphere, length of a rod). Systems and procedures for accurately analyzing such small particles by flow cytometry has been challenging, including with respect to repeatability of analytical results.

Traditional flow cytometry for detection of particles of a size on the order of cells, which are often several microns in size or larger, rely upon particle identification through light scatter detection. Additional information about specific biological attributes (e.g., cell type or infection of the cell by a particular virus) of a particle identified through light scatter detection may be provided through supplemental use of fluorescent antibody stains that bind to particular biological binding sites, or epitopes, for which the fluorescent emission signature may be detected separately from light scatter detection. However, particle identification through light scatter detection is generally not practical for virus-size particles, as the small size of the particles becomes closer in size to the wavelength of light used as an excitation source for the flow cytometry evaluation. As a consequence, techniques have been developed for detection and analysis of fluorescent emission response to both identify the presence of a particle and also for determining particular particle attributes. An example of a flow cytometer designed for detection and counting of virus size particles through the use of fluorescent stains is the Virus Counter® 3100 flow cytometer (Sartorius Stedim Biotech).

A very useful class of fluorescent stains for flow cytometry evaluation of virus-size particles are the so-called fluorogenic dyes. When in a free, unbound state in solution, a fluorogenic dye exhibits only a very weak fluorescent response (quantum yield) to an excitation light source. However, when the molecule orientation of the fluorogenic dye becomes conformationally more rigid when bound to a particle, the fluorescent quantum yield increases significantly, often by an order of magnitude or more relative to the fluorescent response of the fluorogenic dye in the free, unbound state. This permits the strong fluorescent signals of the bound dye molecules to be identified over the relatively weak background fluorescence from the unbound dye molecules. The functioning of fluorogenic dyes is significantly different than the functioning of traditional fluorophore stains, often in the form of fluorescent antibody stains, commonly used in flow cytometry evaluation of cells. Such fluorophore stains exhibit a strong fluorescent response whether bound to a particle or in a free, unbound state in solution.

One limitation on the use of fluorogenic dyes for staining virus-size particles is that the dyes tend to be nonspecific, and do not bind to a particular biological binding site, or epitope, as is the case with fluorescent antibody stains. One important technique for use of fluorogenic dyes flow cytometry evaluation for virus-size particles involves simultaneous staining with one fluorescent dye that non-specifically stains protein content and a second fluorescent stain that nonspecifically stains nucleic acid content (e.g., DNA, RNA). By using stain formulations including a mixture of both types of fluorogenic dyes, detection of simultaneous occurrence of the fluorescent emission signatures of both of the nonspecific protein stain and the nonspecific nucleic acid stain is indicative of a particle that the particle may be an intact virus containing for example an envelope protein and genetic material, whereas detecting only one of the fluorescent signatures is indicative of a different type of particle not containing both the protein and nucleic acid attributes, for example a virus-like particle having protein content but not genetic material. This type of simultaneous use of multiple fluorogenic dyes for flow cytometry evaluation of virus-size particles has achieved significant success, for example in combination with use of the Virus Counter® 3100 flow cytometer. Still, formulating multiple fluorogenic dyes in a mixture having significant shelf life and that can be conveniently used to stain unassociated virus-size particles for flow cytometry evaluation with a high level of precision, or repeatability, has proved challenging. For example, a Combo Dye® reagent kit that has been available for use with the Virus Counter® flow cytometer includes a dry powder mixture of fluorogenic dyes for nonspecific protein staining and non-specific nucleic acid staining of unassociated virus-size particles and acetonitrile and aqueous buffer solution used to reconstitute the dry powder dye mixture into an aqueous liquid stain formulation that is added to a fluid sample containing biological material to simultaneously stain the fluid sample with both fluorogenic dyes. To prepare the aqueous liquid stain formulation, the dry powder mixture is mixed with the acetonitrile to promote dissolution of the fluorogenic dyes into the acetonitrile and then after a 5-minute incubation period aqueous buffer solution at about pH 7.4, near physiological pH, is added to the mixture to prepare the aqueous liquid stain formulation that is then added to the fluid sample, at a similar pH near physiological pH, containing the biological material to be stained for flow cytometry evaluation for unassociated virus-size particles. One example of such a dry powder mixture includes a mixture of POPO™-3 iodide nucleic acid stain (ThermoFisher Scientific) and SYPRO™ Red protein stain (ThermoFisher Scientific). Such a kit has reasonable shelf life and is relatively easy to use to stain fluid samples for flow cytometry evaluation. However, even though such kits have had a level of success, there remains a need for stain products and staining techniques that provide improved flow cytometry performance when using fluorogenic stains for flow cytometry evaluation for unassociated particles of virus size, including in terms of enhanced precision and repeatability of flow cytometry results.

Another limitation on the use of fluorogenic dyes and staining unassociated virus-size particles is that accuracy of flow cytometry results tends not to be uniform across all different types of particles. In particular flow cytometry results using fluorogenic dyes, such as in a Combo Dye® reagent kit, on unassociated non-enveloped virus particles tend to be less reliably accurate, and often by a significant amount, than flow cytometry results using such fluorogenic dyes on unassociated enveloped virus particles. Both for nonspecific staining of protein content and for nonspecific staining of nucleic acid content, the fluorogenic dye molecules appear to more reliably be able to access and adhere to the targeted biologic content for purposes of flow cytometry evaluation for unassociated enveloped virus particles than for flow cytometry evaluation for unassociated non-enveloped virus particles. Remarkably, this is the case for nonspecific staining of nucleic acid content inside the viral capsid of enveloped virus particles relative to non-enveloped virus particles, even though the dye molecule must penetrate through both the viral envelope and the viral capsid to access nucleic acid content in an unassociated enveloped virus particle and need only penetrate through the viral capsid to access nucleic acid content in an unassociated non-enveloped virus particle. Although the use of fluorogenic staining techniques for flow cytometry evaluation of non-enveloped virus particles may provide valuable information in many situations, the apparent performance deficiency relative to flow cytometry evaluation of unassociated enveloped virus particles has to a significant degree limited acceptance of flow cytometry evaluation as a reliably accurate analytical technique for quantification of non-enveloped virus particles.

With respect to protein staining, an alternative to nonspecific staining using a fluorogenic stain is to use stains specific for antigenic binding with an epitope of an unassociated virus particle, such as with a fluorescent antibody stain specific for the epitope. For flow cytometry evaluation of unassociated enveloped virus particles a fluorescent antibody stain may be targeted to an epitope of the viral envelope, whereas for flow cytometry evaluation of unassociated non-enveloped virus particles a fluorescent antibody stain may be targeted to an epitope of the non-enveloped viral capsid. Examples of some fluorescent antibody stains both for use with unassociated enveloped virus particles and for use with unassociated non-enveloped virus particle are those provided in ViroTag™ reagent kits (Sartorius Stedim Biotech) for use with the Virus Counter® 3100 flow cytometer. However, similar to the situation with fluorogenic dyes, fluorescent antibody stains also tend to perform better to access and adhere to target viral envelope epitopes for purposes of flow cytometry evaluation for unassociated enveloped virus particles than to access and adhere to target viral capsid epitopes for purposes of flow cytometry evaluation for unassociated non-enveloped virus particles. With respect to staining of nucleic acid content inside viral capsids, fluorescent antibody stain techniques do not provide an alternative to use of fluorogenic dye for flow cytometry evaluation of unassociated non-enveloped virus particles. There continues to be a significant need for enhanced flow cytometry techniques and fluorescent stain products for quantification of unassociated non-enveloped virus particles by flow cytometry evaluation.

SUMMARY

A first aspect of this disclosure is directed to a method for flow cytometry evaluation of a biological material for unassociated non-enveloped viral particles, such unassociated non-enveloped viral particles having a non-enveloped viral capsid. The method comprises:

preparing a fluorescently-stained fluid sample for flow cytometry evaluation, the fluorescently-stained fluid sample comprising:
  an aqueous liquid medium;
  a sample of biological material to be evaluated by flow cytometry for the unassociated non-enveloped viral particles, having the non-enveloped viral capsid;
  at least one fluorescent stain to fluorescently stain the unassociated non-enveloped viral particles to prepare unassociated labeled particles of virus size dispersed in the aqueous liquid medium, wherein each said unassociated labeled particle comprises a said unassociated non-enveloped viral particle stained with the at least one fluorescent stain, and wherein each said fluorescent stain has a fluorescent emission response when the unassociated labeled particle is subjected to a stimulation radiation;
after the preparing, subjecting the fluorescently-stained fluid sample to flow cytometry evaluation in a flow cytometer, the flow cytometry evaluation comprising flowing the fluorescently-stained fluid sample through an investigation zone of the flow cytometer and in the investigation zone subjecting the fluorescently-stained fluid sample to the stimulation radiation and detecting for the fluorescent emission response from the investigation zone and counting identified occurrences of the unassociated labeled particles; and
the preparing the fluorescently-stained fluid sample comprising fluorescent staining the biological material in a fluid sample composition with a said fluorescent stain to prepare a stained fluid sample composition at an acidic pH in an acidic pH range of from pH 3.0 to pH 6.5.

A number of feature refinements and additional features are applicable to this first aspect of the disclosure. These feature refinements and additional features may be used individually or in any combination within the subject matter of this aspect or any other aspect of this disclosure. As such each of the following features may, but are not required to be, used with any other feature or a combination of features of this aspect or any other aspect of this disclosure.

Flow cytometry evaluation for unassociated viral particles using reagent kits such as the Combo Dye® reagent kits for nonspecific staining with fluorogenic dyes or ViroTag® reagent kits for specific epitope staining with fluorescent antibody stain prepared and subjected the fluorescently-stained fluid samples to flow cytometry at about physiological pH, at about pH 7.4. However, it has been found in particular for flow cytometry evaluation of biological material for unassociated non-enveloped viral particles that preparing the fluorescently-stained fluid sample instead by fluorescent staining at an acidic pH and subjecting the fluorescently-stained fluid sample to flow cytometry evaluation at such an acidic pH may significantly improve flow cytometry performance and accuracy of flow cytometry results for quantification of such unassociated non-enveloped virus particles. Such fluorescent staining followed by flow cytometry at an acidic fluid sample pH appears to increase accessibility of the fluorescent stain to adhere to the biological features of the unassociated non-enveloped virus particles targeted for fluorescent staining while also maintaining sufficient particle integrity of the unassociated labeled particles of virus size at the acidic pH for advantageous processing through a flow cytometer for fluorescent response investigation of such unassociated labeled particles in the investigation zone of the flow cytometer, and without an apparent detrimental degree of disassociation of the viral particle form during staining or processing in a flowing fluid stream through the flow cytometer, and remarkably resulting in surprising enhancement of flow cytometry results. In alternative processing a fluid sample may be fluorescently stained at an acidic pH in such an acidic pH range in at least one fluorescent staining steps followed by pH adjustment to a higher pH prior to flow cytometry evaluation.

As summarized above, preparation of the fluorescently-stained fluid sample for flow cytometry evaluation involves at least one fluorescent staining step in which the resulting stained fluid sample composition is at an acidic pH in an acidic pH range. Such a stained fluid sample composition at the acidic pH within the acidic pH range may be the final fluorescently-stained fluid sample that is fed to the flow cytometer for the flow cytometry evaluation, or may be a preliminary stained fluid sample that is further processed to prepare such final fluorescently-stained fluid sample. Such an acidic pH range may have a lower limit selected from a group consisting of pH 3.0, pH 3.5, pH 4.0, pH 4.5, pH 4.8, pH 5.0, pH 5.2, pH 5.3 and pH 5.4 and an upper limit selected from a group consisting of pH 6.5, pH 6.2, pH 6.0, pH 5.8, pH 5.6, pH 5.4. pH 5.2 or pH 5.0 provided that the upper limit is selected to be larger than the lower limit. An acidic pH of between about pH 4.0 and about pH 6.0, or in the narrower range of about pH 5.0 to about pH 5.7, or even at about pH 5.5, appears to work well for a number of situations across a number of different types of unassociated non-enveloped viral particles although a particular pH range that may be most suitable for some different type of particles may differ by particle type. However, an appropriate acidic pH for particular unassociated non-enveloped viral particles may be readily determined through routine experimentation by testing and comparing flow cytometry results for stained fluid samples prepared at different acidic pH's within an above-noted acidic pH range. At some point as the pH of fluorescently-stained fluid samples is increased accessibility of fluorescent stain to targeted particle features may be reduced and flow cytometry quantification results may detrimentally decrease, and at some point as the pH of fluorescently-stain fluid sample is decreased particle integrity may suffer to an extent that flow cytometry quantification results may also detrimentally decrease.

In some embodiments, fluorescent staining may be performed at a low pH at which particle integrity may begin to degrade, but pH may be raised following staining to impart greater particle integrity that may be more beneficial for flow cytometry performance. In some preferred embodiments following fluorescent staining at an acidic pH, the pH of the fluorescently-stained fluid sample is not altered, or not significantly altered, so that the fluorescently-stained fluid sample as fed to flow cytometry evaluation is at an acidic pH in an acidic pH range as described above. Each step of pH adjustment increases processing complexity, time and cost, and adds another step where errors may be introduced, and in some preferred embodiments a fluorescently-stained fluid sample is prepared at an acidic pH and then fed to the flow cytometry evaluation at that acidic pH, and such simplified processing may advantageously be employed to evaluate for non-enveloped viral particles over a wide range of virus families with good results. However, the method of the disclosure also provides flexibility to adjust the fluid sample pH to a higher pH for additional staining and/or for flow cytometry following a staining step performed at an acidic pH when such PH adjustment is beneficial for the particular situation.

Unassociated non-enveloped viral particles refers to any unassociated particles of virus size having a non-enveloped viral capsid. Such unassociated particles of virus size may for example comprise unassociated non-enveloped virus particles (vinous) or unassociated virus-like particles having a non-enveloped viral capsid corresponding to a particular virus but lacking the genetic material inside the viral capsid. The non-enveloped viral capsid of the unassociated non-enveloped viral particles may be of any virus family, whether in a fully intact virus particle or some other viral particle such as a virus-like particle. Some example virus families, and some example viruses within such families, for such unassociated non-enveloped viral particles for use in the ma include the following: Adenoviridae (e.g., adenovirus), Parvoviridae (e.g., adeno adeno-associated virus, minute virus of mice, feline panleukopenia virus); Picornaviridae (e.g., enterovirus); Reoviridae (e.g., rotavirus); Papillomaviridae; Polyomaviridae; Bidnaviridae; Circoviridae; Astroviridae; Calciciviridae; Hepeviridae; Potyviridae; Papovaviridae; Myoviridae; Podoviridae; Siphoviridae; Rudiviridae; Clavaviridae; Corticoviridae; Marseilleviridae; hycodnaviridae; Sphaerolipoviridae; Tectiviridae; Turriviridae; Lavidaviridae; Spiraviridae; Anelloviridae; Geminiviridae; Genomoviridae; Inoviridae; Microviridae; Nanoviridae; Spiraviridae; Amalgaviridae; Birnaviridae; Chrysovirus; Endornaviridae; Hypoviridae; Megabirnaviridae; Partitiviridae; Totiviridae; Quadriviridae; Dicistroviridae; flaviridae; Marnaviridae; Secoviridae; Alphaflexiviridae; Betaflexiviridae; Gammaflexiviridae; Tymoviridae; Barnaviridae; Benyviridae; Bromoviridae; Carmotetraviridae; Closteroviridae; Leviviridae; Luteoviridae; Nodaviridae; Permutotetraviridae; Tombusviridae; Virgaviridae and Aspiviridae. In some preferred implementations of the method, the unassociated non-enveloped viral particles are particles of a bacteriophage or have a viral capsid of a bacteriophage.

The viral capsid, and/or nucleic acid content inside the capsid may include artificial, engineered features. For example the non-enveloped viral particles may be genetically modified, such as viral vectors with genetically modified nucleic acid content. Artificial, engineered features may include chimeric, hybridized or artificially reconstructed features.

The unassociated non-enveloped viral particles, and the unassociated labeled particles, which include such a non-enveloped viral particle stained with at least one fluorescent stain, are of virus size. By a particle being of virus size and being unassociated, it is meant that the particle is not part of a larger particle structure that is larger than virus size, tier example the unassociated particle is not within a host cell or bound to an immunoassay bead or microsphere or part of an agglomerate that is larger than virus size. By a particle being virus size, it is meant that the size of the particle, in terms of maximum cross-dimension of the particle, is at or smaller than about 2 microns, 1 micron, 600 nanometers, 300 nanometers or an even smaller maximum particle size. Such unassociated particles of a virus size may in some implementations have a particle size, in terms of maximum cross-dimension, of at least 10 nanometers, 20 nanometers, 30 nanometers, 40 nanometers, 50 nanometers or an even larger minimum particle size. As may be appreciated, an unassociated labeled particle including an unassociated non-enveloped viral particle labeled with fluorescent stain for flow cytometry detection by fluorescent emission response may be somewhat larger than the unassociated non-enveloped viral particle prior to fluorescent staining, due for example to the added mass of the fluorescent label. The size of an unassociated non-enveloped viral particle may typically be the size of the non-enveloped viral capsid, and the size of a corresponding unassociated labeled particle of virus size may typically have a size of the viral capsid as modified or added to by the presence of the fluorescent stain. Such unassociated labeled particles of virus size may far example often be no more than 100 nanometers, no more than 50 nanometers, no more than 25 nanometers or no more than 15 nanometers larger than the corresponding unassociated non-enveloped viral particle, which will depend upon the nature of fluorescent stains that are used and the location of the biological feature targeted for staining. In the case of fluorescent antibody scams, such stains may often be of a size on the order of about 7 nanometers, which may be expected to increase the size of the unlabeled unassociated particles on the order of about 14 nanometers. Such a size increase may be larger in the case of indirect antibody staining where a primary antibody attaches to the unassociated non-enveloped viral particle and a secondary antibody with fluorophore attaches to the primary antibody. As some examples, when an unassociated non-enveloped viral particle has a size of 2 microns or smaller the corresponding unassociated labeled particle may have a particle size of 2.1 microns or smaller, when the unlabeled viral particle has a size of 1 micron or smaller the corresponding labeled viral particle may have a size of 1.1 microns or smaller, when the unlabeled viral particle as a size of 600 nanometers or smaller, the corresponding labeled viral particle may have a size of 625 nanometers or smaller, when the unlabeled viral particle has a size of 400 nanometers or smaller the corresponding labeled viral particle may have a size of 425 nanometers or smaller, when the unlabeled viral particle as a size of 200 nanometers or smaller the corresponding labeled viral particle may have a size of 225 nanometers or smaller and when the unlabeled viral particle has a size of 100 nanometers or smaller the corresponding labeled viral particle may have a size of 125 nanometers or smaller. In the case of staining only with fluorogenic dyes, the labeled viral particles may have no or no significant increase in particle size. Also, as may be appreciated the size of an unassociated non-enveloped viral particle and of an unassociated labeled particle may be somewhat different at different pH conditions for example at an acidic pH relative to at physiological pH possibly as a consequence of some opening of the viral capsid at the acidic pH relative to near a physiological pH.

Fluorescent stains that may be used with the method of the disclosure may be any component that may be added to a fluid sample to fluorescently stain target particles so that the particles may be identified through detection of the fluorescent response signature from the attached stain on the particles. Such fluorescent stains as added to a fluid sample for staining may be fluorogenic or fluorophore in nature. By a fluorescent stain being fluorogenic in nature, it is meant that the active fluorescent stain component in the form added to a fluid sample for staining does not exhibit a strong fluorescent response (low quantum yield) in that form, but does exhibit a strong fluorescent response (higher quantum yield) when attached to and staining the target particle feature, as discussed above and elsewhere herein with respect to the so-called fluorogenic dyes. Examples of fluorogenic stains are such fluorogenic dye molecules that exhibit only a very weak fluorescent response to an excitation light source when in a free, unbound state in solution but have a much stronger fluorescent response to the same excitation light source in the conformationally more rigid state when bound to a target particle. As noted above, examples of such fluorogenic dye molecules include the POPO™-3 iodide nucleic acid stain and the SYPRO™ Red protein stain in the Combo Dye® reagent kits, and more generally the so-called cyanine dyes, which also include the so-called merocyanine dyes. Other examples of such fluorogenic dyes are disclosed in U.S. provisional patent application No. 62/713,377 and international patent application no. PCT/US2019/044623 and in U.S. Pat. Nos. 5,410,030 and 5,616,502; the entire contents of each of which are incorporated herein by reference for all purposes. Some other example fluorogenic dyes for use with the different aspects of this disclosure include: YOYO™-1 iodide nucleic acid stain (ThermoFisher Scientific), YO-PRO™-1 iodide nucleic acid stain (ThermoFisher Scientific), SYPRO™ Tangerine protein stain (ThermoFisher Scientific), Krypton™ protein stain (ThermoFisher Scientific), and SYBR™ Green nucleic acid stains such as SYBR™ Green I and SYBR™ Green II (ThermoFisher Scientific). Essentially, when the fluorogenic dye molecule attaches to and stains the target particle feature, the attached molecule becomes a fluorophore. By fluorophore in nature, it is meant that the active fluorescent stain component exhibits a strong fluorescent response of generally the same magnitude whether or not attached to a particle or free in solution in an unbound state. Examples of some fluorophore stains include the so-called fluorescent antibody stains, which include an antibody specific for antigenic binding with an epitope, which may be an epitope of unassociated non-enveloped viral particle for direct staining or an epitope of another antibody that attaches to the target unassociated non-enveloped viral, particle for indirect staining. The fluorescent antibody stain includes one or more fluorescently active materials attached to the antibody in such a manner that the fluorescently active materials are fluorophores, that is the fluorescent activity is not dependent on whether the fluorescent antibody stain is in a free, unbound state in solution or is bound to a particle. Such fluorophores attached to the antibody may be a dye molecule, such as those discussed above and elsewhere herein with respect to fluorogenic stains. Such fluorescent antibody stains may be such stains as provided in the ViroTag™ reagent kits. Examples of some fluorescent antibody stains are discussed in U.S. Pat. No. 10,161,850 entitled "EVALUATING BIOLOGICAL MATERIAL FOR UNASSOCIATED VIRUS-SIZE, PARTICLES WITH INFLUENZA VIRUS EPITOPE", the entire contents of which are incorporated herein by reference for all purposes. The epitope corresponding to an antibody of an antibody stain may be any type of epitope on the viral capsid, and may for example be a sequential epitope or a conformational epitope. A fluid sample may include multiple fluorescent stains for staining multiple different features on target unassociated non-enveloped viral particles Or for staining distinct features on different target unassociated non-enveloped viral particles within a fluid sample. When multiple fluorescent stains are used, such fluorescent stains may include one or more fluorogenic stains (e.g., fluorogenic dyes) and/or one or more fluorophore stains (e.g., fluorescent antibody stains). Such multiple fluorescent stains may be a combination with both fluorogenic stain and fluorophore stain or may include only fluorogenic stains (e.g., only fluorogenic dyes) or only fluorophore stains (e.g., only fluorescent antibody stains). One preferred implementation with multiple fluorescent stains includes a first fluorogenic dye for nonspecific staining of nucleic acid content within the non-enveloped viral capsid and a second fluorogenic dye for nonspecific staining of protein content of the non-enveloped viral capsid. Another preferred implementation with multiple fluorescent stains includes a fluorogenic dye for nonspecific staining of nucleic acid content inside the non-enveloped viral capsid and a fluorescent antibody stain for a targeted epitope of the non-enveloped viral capsid.

In some preferred implementations of the method, preparing the fluorescently-stained fluid sample includes mixing the fluorescent stain with biological material to be evaluated by flow cytometry and after such mixing, not removing unbound fluorescent stain from the fluid sample prior to the flow cytometry evaluation. In the case of fluorogenic stains, such stains typically provide minimal fluorescent response in the unbound stain and generally do not interfere with identification of fluorescent response from stained particles. In the case of fluorescent antibody stains, although such stains are fluorophore in nature and accordingly provide strong fluorescent response even in an unbound state, such fluorescent response from unbound fluorescent antibody stain may be accommodated while still distinguishing fluorescent response signals indicative of the unassociated labeled particles of virus size provided the unbound portion of the fluorescent antibody stain is maintained within a concentration range to ensure adequate staining of the targeted epitope sites on the unassociated non-enveloped particles while not providing an overwhelming level of background signal from the unbound antibody stain that remains free in solution in the fluorescently stained fluid sample, in some implementations an unbound portion of a fluorescent antibody stain is within a range having a lower limit of 0.25 microgram per milliliter, 0.35 microgram per milliliter, 0.5 microgram per milliliter, 0.75 microgram per milliliter, 1 microgram per milliliter or 1.5 micrograms per milliliter and having an upper limit of 10 micrograms per milliliter, 8 micrograms per milliliter, 6 micrograms per milliliter, 5 micrograms per milliliter, 4 micrograms per milliliter or 3 micrograms per milliliter. Additional information concerning such processing using fluorescent antibody stains is provided in U.S. Pat. No. 10,161,850, referenced previously.

Preparing the fluorescently-stained fluid sample may include any appropriate processing and using any appropriate reagents to bring the biological material under investigation, which is known or suspected of containing the target unassociated non-enveloped viral particles, in contact with the fluorescent stain or stains to be used to identify the presence of such unassociated non-enveloped viral particles and such that the fluorescently-stained fluid sample including biological material is at a pH within the noted acidic pH range.

In some processing implementations, the fluorescently-stained fluid sample as fed to the flow cytometer is at a pH within the acidic pH range, and which may or may not be the acidic pH of the stained sample composition from the fluorescent staining step. A final step of preparing such a fluorescently-stained fluid sample in the acidic pH range for flow cytometry evaluation may be addition of the fluorescent stain or stains to a preliminary fluid sample composition with aqueous liquid already adjusted to within the desired acidic pH range. Such pH adjustment may be accomplished by using reagents having appropriate pH properties to prepare such a preliminary fluid sample composition in the final desired acidic range and such that any added fluorescent stain compositions during the fluorescent staining step do not further adjust the pH to outside of a desired acidic pH range for flow cytometry evaluation. In some processing implementations, no pH adjustments are made following addition of the fluorescent stain compositions, and the final fluorescently-stained fluid sample for feed to the flow cytometer is the stained fluid sample composition at an acidic pH in the acidic pH range resulting from a final fluorescent staining step.

In some other processing the final fluorescently-stained fluid sample for feed to the flow cytometer may be at a different pH than the acidic pH of the stained fluid sample composition as prepared during a fluorescent staining step, and typically at a higher pH than the acidic pH of the stained fluid sample composition. Such a higher pH may be at a higher pH within the acidic pH range or may be outside of such range. Such a higher pH may be at least 0.5 pH unit larger, at least 1.0 pH unit larger, at least 1.5 pH units larger, at least 2.0 pH units larger, or even at least 2.5 pH units larger than the acidic pH of the of the stained fluid sample composition from the fluorescent staining. Such a higher pH may be pH 5.5 or larger, 5.8 or larger, pH 6.0 or larger, pH 6.2 or larger, or pH 6.5 or larger. In some embodiments such a higher pH may be larger than pH 6.5, may be at least pH 6.7, may be at least pH 6.9 or may be at least pH 7.0, although such a higher pH may often be not larger than pH 8.5, not larger than pH 8.0, not larger than pH 7.5 or not lamer than pH 7.2. One situation when the fluorescently-stained fluid sample fed to the flow cytometer may be at such a higher pH than the acidic pH of the stained fluid sample composition from the fluorescent staining is when following such fluorescent staining the biological material is then stained with one or more additional fluorescent stains that have a higher sensitivity to low pH than a fluorescent stain applied at the acidic pH. In one example an initial fluorescent staining in an acidic pH range may be performed using one or more fluorogenic dyes, and in particular a fluorogenic dye for nonspecific staining of nucleic acid content that must penetrate into the inside of the non-enveloped viral capsid, followed by subsequent fluorescent staining with a fluorescent antibody stain in which the antibody is susceptible to damage at the acidic pH at winch the fluorogenic dye staining was beneficially performed. In such a case, the processing may include a pH adjustment to raise the pH of the stained fluid sample composition with the fluorogenic dye to a higher pH more suitable form the antibody stain, even if such higher pH is still acidic, but not as acidic as was used for staining with the fluorogenic dye. An advantage of such sequential staining with fluorogenic dye for nonspecific staining of nucleic acid content at a lower pH followed by staining with a fluorescent antibody stain at a higher pH is that once the fluorogenic dye has penetrated into the non-enveloped viral capsid to stain nucleic acid, a subsequent increase in pH should not detrimentally affect the nucleic acid staining while the antibody stain may be applied at a more optimal pH for the particular antibody/viral particle combination at issue. Much of the discussion below concerning fluorescent staining at an acidic pH and preparation of a fluorescently-stained fluid sample composition is provided in the context of preparation of a final fluorescently-stained fluid sample for feed to a flow cytometer. However, it should be appreciated that the discussion applies equally to preparation of a preliminary fluorescently-stained fluid sample at an acidic pH in an acidic pH range that is then further processed to prepare the final fluorescently-stained fluid sample at a higher pH for feed to flow cytometry evaluation.

Reagents that may be used to prepare the fluorescently-stained fluid sample for the flow cytometry evaluation include various aqueous dilution liquids, including such aqueous dilution liquids that may be used to prepare a preliminary fluid sample composition to be stained and including such aqueous dilution liquids that may be used to prepare a stain formulation for addition to such a preliminary fluid sample composition to effect the fluorescent staining. Various such reagents may be aqueous in nature and may form or become part of the aqueous liquid medium of the fluorescently-stained fluid sample. Such aqueous dilution liquids that are targeted to dilution of a fluid sample prior to fluorescent staining are sometimes referred to herein as aqueous sample dilution liquids, and such aqueous dilution liquids that are targeted to preparation of fluorescent stain formulations for use to fluorescently stain a fluid sample are referred to herein as aqueous stain dilution liquids. In some preferred implementations, some or all such aqueous dilation liquids that are used to prepare the fluo-rescently-stained fluid sample are at an acidic pH within an acidic pH range as described above for the fluorescently-stained fluid sample, or in some cases may be at a more acidic pH such that when combined with other reagents used to prepare the fluid sample result in the aqueous liquid medium of the final fluorescently-stained fluid sample being, at a desired pH in a desired acidic pH range for the flow cytometry evaluation. In some preferred implementations, aqueous sample dilution liquids used to prepare diluted fluid sample at appropriate dilution factors for flow cytometry evaluation at an acidic pH have a pH within the noted acidic pH range for the fluorescently-stained fluid sample, although as may be appreciated the pH of the aqueous sample dilution liquid may be at a lower pH than the final pH of the fluorescently-stained fluid sample due to the possible use also of higher pH reagents during processing to prepare the final fluorescently-stained fluid sample that is subjected to now cytometry evaluation. In one such example, aqueous sample dilution liquid used to prepare a fluorescently-stained fluid sample may be at an acidic pH within or below a desired final acidic pH range and an aqueous stain dilution liquid used in the preparation of a fluorescent stain formulation used to prepare the fluorescently-stain fluid sample may be at a higher pH, for example at about a physiological pH (e.g., about pH 7.4) or at an even higher pH (e.g., up to about pH 8.0), with the relative quantities of the aqueous sample dilution liquid and the aqueous stain dilution liquid combining to provide the desired acidic pH in the desired acidic pH range for the final fluorescently-stained fluid sample. In other implementations, such aqueous stain dilution liquids used to prepare stain formulations may also be at an acidic pH within such a desired final acidic pH range. Such aqueous dilution liquids, and the resulting aqueous liquid medium of the fluorescently-stained fluid sample, may have any composition compatible with the unassociated non-enveloped viral particles and fluorescent dyes, and such aqueous dilution liquids and resulting aqueous liquid medium preferably comprise buffer solution including any appropriate buffering agent for the acidic pH of the aqueous liquid medium, and including an appropriate biologically-acceptable salt concentration (e.g., of sodium chloride or potassium chloride), and with final pH adjustment as necessary with added acid or base (e.g., hydrochloric acid or sodium hydroxide). Some example buffering agents useful in the acidic pH environment of the aqueous liquid medium of the fluorescently-stained fluid sample include for example buffering systems based on 2-(N-morpholino)ethanesulfonic acid (MES), citric acid, acetic acid, cacodylic acid, or phosphoric acid, a salt form any of the foregoing (e.g., related conjugate bases such as 2-(N-morpholino)ethane-sulfonates, dihydrogen citrates, mono-hydrogen citrates, citrates, acetates, cacodylates, dihydrogen phosphates, hydrogen phosphates, phosphates) and combinations thereof. Such salt forms may preferably be salts of alkaline metals, such as of sodium or potassium.

Fluorescent stains may be initially provided for use to prepare the fluorescently-stained fluid sample in any convenient form. Fluorescent stain may be provided in a liquid formulation with scam dispersed, preferably dissolved, in a liquid medium in which the fluorescent stain is suitably stable. Such a liquid medium may be organic or aqueous in nature. Fluorescent antibody stains are often provided in liquid formulations, including in the VitoTag™ reagent kits. Fluorescent stain may be provided in a dry powder form, which is sometimes the case for fluorogenic dyes, for example in the Combo Dye® reagent kits, which include a dry powder mixture of a fluorogenic dye for nonspecific nucleic acid staining and another fluorogenic dye for non-specific protein staining. Such initial stain compositions may be further processed to prepare a modified stain formulation for addition to a fluid sample to effect the fluorescent staining.

In the case of dry powder compositions including one or more fluorogenic dyes in dry powder form, significant preliminary processing may be involved to reconstitute the dry powder components into a final stain formulation for addition to a fluid sample for fluorescent staining. Such processing may be complicated by susceptibility of many fluorogenic dye molecules to pi stacking interactions in aqueous liquids. In some preferred implementations when processing a such a dry powder composition, preparing the fluorescently-stained fluid sample may comprise:

first preparatory processing to prepare a concentrated stain formulation with the fluorogenic dye containing at least one aromatic group susceptible to pi stacking interactions in aqueous liquids, the first preparatory processing comprising dissolving the fluorogenic dye into a first liquid medium from a dry powder dye composition with the fluorogenic dye, wherein the first liquid medium comprises the organic liquid component;

after the first preparatory processing, second preparatory processing while the fluorogenic dye remains in solution to prepare an aqueous diluted stain formulation comprising the fluorogenic dye dissolved in a diluted aqueous liquid comprising the organic liquid component, the second preparatory processing comprising diluting the first liquid medium with aqueous stain dilution liquid; and mixing at least a portion of the aqueous diluted stain formulation with a sample of biological material to be evaluated by flow cytometry for presence of the unassociated labeled particles of virus size during the flow cytometry evaluation.

Fluorogenic dyes in such dry powder form have exhibited good stability over a reasonable shelf life. However, dry powder dye formulations continue to be difficult and complex to use, including processing required for reconstitution of the fluorogenic dyes in aqueous liquid media prior to staining a fluid sample for flow cytometry evaluation for unassociated virus-size particles, such as the unassociated non-enveloped viral particles. In addition to requiring significant personnel time to perform the reconstitution, the reconstitution processing adds complexity to the operation and opportunities for error and processing variation that can affect the repeatability of flow cytometry results. Inclusion of the fluorogenic dyes in a dry powder dye formulation for fluorescent staining products, such as in the Combo Dye® reagent kit, also increases complexity and cost to prepare the dry powder dye formulations. Even with these complexities, such dry powder dye compositions have continued to be used, because the fluorogenic dyes are stable and have good shelf life in the dry powder forms. However it has now been found that fluorogenic dye mixtures may be formulated in a liquid dye concentrate that exhibits a desirable combination of fluorogenic dye stability, shelf life and flow cytometry performance, at least comparable to the use of dry powder mixtures of fluorogenic dyes, while avoiding the problems presented by manufacture and use of such dry powder dye mixtures.

Accordingly, when the fluorescent stain is to include multiple fluorogenic stains, in some preferred implementations some or all of the fluorogenic dyes may advantageously be provided in a liquid form in a liquid dye concentrate. Such a liquid dye concentrate comprises a plurality of different fluorogenic dyes in a liquid medium, each different said fluorogenic dye having a different fluorescent emission signature for detection when bound to a said unassociated virus-size particle; and the method may comprise at least one member selected from the group consisting of:

(i) it the liquid medium of the liquid dye concentrate comprising a mixture including water and liquid, phase organic material, and preferably the liquid medium is aqueous, and more preferably the liquid medium of the liquid dye concentrate comprising more than 50 percent by moles of water;

(ii) the liquid dye concentrate comprising disaccharide dissolved in the liquid medium of the liquid dye concentrate;

(iii) the providing the liquid dye concentrate being in the absence of reconstituting the fluorogenic dyes from a dry form into the liquid medium of the liquid dye concentrate; and (iv) combinations including two or more of any of (i)-(lii).

The plurality of fluorogenic dyes in the liquid dye concentrate may be or include a first fluorogenic dye for nonspecific staining of nucleic acid content within the non-enveloped viral capsid and a second fluorogenic dye for nonspecific staining of protein content of the non-enveloped viral capsid. The liquid dye concentrate may be provided in or have features of the liquid dye concentrate of the kit of a second aspect of this disclosure. The method may include unsealing a sealed container containing the liquid dye concentrate and removing the liquid dye concentrate, or a portion thereof, from the unsealed container for use in preparing the fluorescently-stained fluid sample. In some preferred implementations, the liquid dye concentrate includes both (i) and (ii). The liquid phase organic material preferably comprises, and more preferably consists essentially of DMSO. When the liquid dye concentrate has an aqueous liquid medium, the aqueous liquid medium may be provided with any convenient pH, which may be at an acidic, neutral or basic pH. The liquid medium of the liquid dye concentrate is also referred to herein as a stain liquid medium, for convenience of reference.

In some preferred implementations the sample of biological material is provided to the mixing step in a preliminary fluid sample composition already at an acidic pH, such as at a pH at or somewhat below a final desired acidic pH range for the final fluorescently-stained fluid sample, and a result of the mixing is such a fluorescently-stained fluid sample at acidic pH for flow cytometry evaluation without further pH adjustment.

Also, as a consequence of such first and second preparatory processing, the fluorescently-stained fluid sample will comprise an organic liquid component as a minor component in the acidic aqueous liquid medium of the fluorescently-stained fluid sample. Such a liquid component may be an organic liquid component that is mutually soluble with water in the minor content included in the aqueous liquid medium. One example for such an organic liquid component is dimethyl sulfoxide (DMSO) and another example is acetonitrile, with DMSO being particularly preferred for use as the organic liquid component in such situations.

When well aqueous liquid medium of the fluorescently-stained fluid sample includes such an organic liquid component, in some implementations the aqueous liquid medium may include a relatively large ratio of water to organic liquid medium on a weight basis, such as for the aqueous liquid medium to comprise a weight ratio of water to the organic component of at least 30:1 and preferably in mine of from 30:1 to 3000:1, or a narrower range. In other implementations, the aqueous liquid medium of the fluorescently-stained sample includes a larger proportion of the organic liquid component relative to water on a weight basis, although even in such other implementations, the organic liquid component will still typically be a minor component on a molar basis, and also often on a weight basis, relative to water. The aqueous stain dilution liquid and/or the aqueous liquid of the aqueous diluted stain formulation may have a pH in an acidic range as described above for the fluorescently-stained fluid sample, or may have a higher pH, for example in a range of from pH 7 to pH 8, or around physiological pH (e.g., about pH 7.4).

The first preparatory processing may include mixing a dry powder dye composition with the first liquid medium and after the mixing permitting the resulting; mixture to sit for a residence time, preferably at least 3 minutes and preferably at least 5 minutes, and more preferably at least 7 minutes when the organic liquid components as DMSO. Such a dry powder dye composition may include a single fluorogenic dye, preferably a fluorogenic dye for nonspecific staining nucleic acid content, or may include a dry powder mixture including a plurality of different fluorogenic dyes, for example with a first fluorogenic dye for non-specific staining of nucleic acid content and a second fluorogenic dye for nonspecific staining of protein content, and both fluorogenic dyes may be dissolved into the first liquid medium to prepare the concentrated stain formulation to include both of the fluorogenic dyes. The second preparatory processing may include, while both fluorogenic dyes remain in solution, preparing the aqueous diluted stain formulation comprising both of the fluorogenic dyes dissolved the diluted aqueous liquid. The flow cytometry evaluation may include detecting and counting occurrences of the unassociated labeled particles stained with both fluorogenic dyes.

Use of DMSO as the organic liquid component is particularly preferred for processing fluorogenic dyes provided in a dry powder stain composition, and the description that follows is provided with primary reference to the use of DMSO as the organic liquid component, although the concentrations and other disclosed process features described below for DMSO are applicable also for use of other organic liquid components, including acetonitrile. The description below is also provided primarily with reference to a dry powder dye mixture including a plurality of different fluorogenic dyes including at least first and second fluorogenic dyes. Which is a generally preferred embodiment when using a dry powder dye composition, but the description applies equally to processing of dry powder dye compositions including only a single fluorogenic dye. For convenience of reference, the aqueous stain dilution liquid used in the second preparatory processing may be referred to below as an aqueous liquid diluent, and the concentrated and aqueous diluted-stain formulations may be referred to as concentrated and aqueous diluted dye formulations.

Regarding DMSO as particularly preferred far use as the organic liquid component, self-quenching is a phenomenon in which fluorescence energy from fluorescent stains is consumed by energy transfer between dye molecules in close proximity to each other that effectively consumes the anticipated wavelength of light that otherwise might be emitted. Such close proximity of dye molecules that may cause quenching may result from overcrowding of the molecules on a stained substrate, such as a particle. In the case of fluorogenic dyes, if dye molecules are susceptible to existing in aggregated forms in aqueous liquids, such as are typically used to prepare flow cytometry fluid samples and fluorogenic stain formulations for staining such fluid samples, such aggregates of dye molecules attaching to a particle may have a significant propensity to self-quench a significant amount of fluorescent emission, and the presence of such aggregates on a stained particle may reduce the total strength of a fluorescent emission signal from a stained particle during flow cytometry. Such impairment of fluorescent emission signals may have a pronounced negative effect on flow cytometry evaluation of stained particles of virus size, because of the smaller available area on such small particles to accommodate dye molecule attachment than on larger particles such as cells. Occupying portions of such available attachment area with dye molecule aggregates may significantly reduce the strength of the total fluorescent emission signal from a stained virus-size particle, and such self-quenching effects may impair precision of flow cytometry results, and repeatability of results between fluid samples. One measure of the precision of flow cytometry in flow cytometry results is the coefficient of variation (standard error of measurements divided by the mean of the measurements, often abbreviated as c.v.) which is an indication of the statistical variation of flow cytometry results between fluid samples of the same composition stained and processed in the same way. It has been found that different vials from a batch, or lot, of aqueous fluorogenic dye formulation prepared from dry powder fluorogenic dye mixtures reconstituted as summarized above using acetonitrile in the reconstitution process can vary significantly in flow cytometry performance, which is believed to be due to inconsistent solvation and dispersion of the fluorogenic dyes as present in the final aqueous stain formulation, leading to inconsistent staining and greater-than-desired variation in flow cytometry results. Sample-to-sample variations can be above 20% and day-to-day variations can be 30% or more. More particularly, it is believed that such inconsistent solvation and dispersion results in significant part from formation and/or persistence of dye molecules held in aggregates through pi stacking in term in the aqueous liquid formulations of fluorogenic dye molecules-used to stain fluid samples for flow cytometry evaluation. Pi stacking (which is also called $\pi$ stacking or $\pi$-$\pi$ stacking, or sometimes is simply referred to as "stacking"), refers to a noncovelant attraction that occurs between aromatic rings. Such interactions, for example, are involved with base stacking in three-dimensional structures of DNA and RNA molecules.

It has been found that dissolving a dry powder mixture with multiple different fluorogenic dyes in a liquid medium with dimethyl sulfoxide (DMSO) before dilution with added aqueous liquid to prepare final aqueous fluorogenic dye for that are used to stain fluid samples for flow cytometry evaluation for unassociated (free in solution) virus-size particles have been found to, significantly reduce the coefficient of variation of flow cytometry results between fluid samples. This surprising and unexpected finding followed testing of an unsuccessful approach to reduce pi stacking interactions, and therefore fluorescent energy quenching, through the addition of a chemical agent, (2-hdroxypropyl)-β-cyclodextrin, to disrupt pi stacking interactions. Disruption of such pi stacking interactions was suggested by Gurgyev, et al., Control of the Fluorescence of Dye—Antibody Conjugates by (2-Hydroxypropyl)-β-cyclodextrin in Fluorescence Microscopy and Flow Cytometry, Anal. Chem., 2011, 83, 7109-7114, 2011 (American Chemical Society). Rather than improving flow cytometry performance, addition of the chemical agent was detrimental to virus particle counting accuracy. Using DMSO instead of acetonitrile to initially dissolve dry powder mixtures of multiple fluorogenic dyes prior to dilution with aqueous liquid to prepare final aqueous dye formulations for staining was tried, without expectation for reduction in pi stacking interactions or significant change in flow cytometry results. When using acetonitrile or DMSO, the final concentration of the liquid organic solvent in either case is very small in the final aqueous dye formulation used to stain fluid samples. Moreover, reduction in pi stacking interactions using DMSO relative to acetonitrile is counter-indicated by Norberg, Jan & Nilsson Lennart, Solvent Influence on Base Stacking, Biophysical Journal, Vol. 74, 394-402, January 1998 (Biophysical Society), finding that base stacking in a solvent becomes more favored as the dielectric constant of the solvent increases. DMSO with a dielectric constant of 47.24 (20° C.) would be indicated as more favorable to such stacking interactions than acetonitrile with a lower dielectric constant of 36.64 (20° C.). However, on the contrary, the performance improvement found with the use of DMSO relative to acetonitrile was surprising and unexpected in providing significant enhancement in precision of flow cytometry results to quantify unassociated virus particles in fluid samples across a number of different viruses.

Preferably, the first liquid medium may beneficially comprise a large concentration of DMSO, typically at least 34 percent by moles of DMSO and with even higher concentrations of DMSO in the first liquid medium being more preferred. In that regard, the first liquid medium may comprise, in order of increasing preference, at least 40 percent by moles of DMSO, at least 50 percent by moles of DMSO, at least 60 percent by moles of DMSO, at least 70 percent by moles of DMSO, at least 80 percent by moles of DMSO, at least 90 percent by moles of DMSO, at least 95 percent by moles of DMSO, or even at least 99 percent by moles of DMSO. In some particularly preferred implementations, the first liquid medium may consist essentially of DMSO, and optionally may consist of only DMSO. In addition to DMSO, the first liquid medium may include other components, which in some preferred implementations are minor components relative to DMSO (each present at a smaller molar concentration than DMSO). For example, the first liquid medium may include quantities of water and/or other organic solvents and/or dissolved solids. When water is present, it preferably makes up no more than 66 percent by moles of the first liquid medium, and with even lower concentrations being more preferred. In that regard, the first liquid medium may comprise, in order of increasing preference, no more than 60 percent by moles of water, no more than 50 percent by moles of water, no more than 40 percent by moles of water, no more than 30 percent by moles of water, no more than 20 percent by moles water, no more than 10 percent by moles of water, no more than 5 percent by moles of water, or even no mote than 1 percent by moles of water, in some preferred implementations, the first liquid medium is an organic liquid medium, in which the first liquid medium is made up of at least a majority by moles (at least 50 percent by moles) of liquid phase organic material comprised of the DMSO and, optionally, one or more other organic components in addition to the DMSO. When such liquid phase organic material includes one or more such other organic components DMSO will typically make up the largest percent by moles of the liquid phase organic material, DMSO will make up preferably a majority by moles (over 50 percent by moles) of the liquid phase organic material, more preferably at least 75 percent by moles of the liquid phase organic material, even more preferably at least 90 percent by moles of the liquid phase organic material, and most preferably at least 95 percent by moles of the liquid phase organic material. Particularly preferred is for such liquid phase organic material to consist essentially of, or to consist of only, DMSO. The organic liquid medium will necessarily comprise either no water or an amount of water that is smaller than 50 percent by moles, with lower water content or no water content being more preferred, in the same manner as discussed above for increasing preference for lower water contents. Such liquid phase organic material of the organic liquid medium may comprise a majority by moles (over 50 percent by moles) of DMSO, and with even higher content of DMSO being more preferred. In that regard, such liquid phase organic material of the organic liquid medium may comprise, in order of increasing preference, at least at least 60 percent by moles of DMSO, at least 70 percent by moles of DMSO, at least 80 percent by moles of DMSO, at least 90 percent by moles of DMSO, at least 95 percent by moles of DMSO, or even at least 99 percent by moles of DMSO. In some particularly preferred implementations, such liquid phase organic material of the organic liquid medium may consist essentially of, or consist of only, DMSO. Such liquid phase organic material may include a mixture of DMSO with one or more other organic solvents, preferably with each such other organic solvent, and such other organic solvents together, being minor components on a molar basis, preferably making up less than 50 percent by moles, more preferably no more than 40 percent by moles, more preferably no more than 30 percent by moles and even more preferably no more than 20 percent by moles. Some examples of some other organic solvents that may be mixed with DMSO in such liquid phase organic material includes one or more of acetonitrile methanol, ethanol, or dimethyl formamide. By liquid phase organic material, it is meant organic material that is present in a liquid phase, whether as a solvent or as a solute in the composition. As will be appreciated, when the first liquid medium is in the absence of water and other inorganic components, the first liquid medium may be made up entirely of such liquid phase organic material.

The first liquid medium is preferably in a single fluid phase, and more preferably a single organic fluid phase comprising DMSO at the highest molar concentration of any components, and with other minor components (e.g., water and or other organic solvents) being dissolved in the DMSO. In some preferred implementations, the first liquid medium is an organic liquid medium that is an anhydrous composition. In some implementations, DMSO and water together may comprise at least 80 percent by moles, at least 90 percent by moles, at least 95 percent by moles, at least 98 percent by moles or even more of the first liquid medium. In some implementations the first liquid medium may consist essentially of or consist of only, DMSO and water. In some preferred implementations when the first liquid medium comprises DMSO and water, the first liquid medium includes a majority by moles of DMSO.

The dry powder dye composition includes a plurality of different fluorogenic dyes, which may include only the first fluorogenic dye and the second fluorogenic dye, or may include one or more additional different fluorogenic dyes in addition to the first fluorogenic dye and the second fluorogenic dye. In some preferred implementations, the dry powder dye formulation consists essentially of, or consists of only, the plurality of different fluorogenic dyes, which as noted may be constituted of only the first fluorogenic dye and the second fluorogenic dye.

Aromatic groups include a cyclic structure having one or more rings with a very stable electron shell configuration and a generally planar structure, and are generally susceptible to pi stacking interactions in aqueous liquids, although the degree of susceptibility may vary based on the particular aromatic group and the particular molecular structure in which the aromatic group is contained. Each of the fluorogenic dyes may have at least one such aromatic group susceptible to pi stacking interactions in aqueous liquids. Such aromatic groups may be homocyclic, containing only carbon atoms in the aromatic ring or rings, or heterocyclic, containing one or more atoms other than carbon (referred to as heteroatoms) in the aromatic ring or rings. An aromatic ring containing only carbon atoms in the ring may be referred to as a homoaromatic ring, and an aromatic ring containing a heteroatom in the ring may be referred to as a heteroaromatic ring. Some common heteroatoms include nitrogen, oxygen and sulfur, and an aromatic group of a fluorogenic dye may include one or more of these or other heteroatoms. Such an aromatic group may often include a 6-member aromatic ring and/or a 5-member aromatic ring, each of which may independently be a homocyclic ring or a heterocyclic ring. Such an aromatic group may include a single aromatic ring or may be polycyclic, containing multiple aromatic rings in the aromatic group. Such aromatic group may be part of a fused ring moiety, for example including a 6-member aromatic ring fused with either one or both of a 5-member aromatic ring and a 6-member aromatic ring. One important type of fused ring moiety used in fluorogenic dyes includes a 6-member homoaromatic ring fused with a 6-member heteroaromatic ring, for example including nitrogen as a heteroatom. Another important type of fused ring moiety used in fluorogenic dyes includes 6-member homoaromatic ring fused with a 5-member heteroaromatic ring, and in which the heteroaromatic ring includes both nitrogen and oxygen as heteroatoms or both nitrogen and sulfur as heteroatoms. Examples of some fluorogenic dyes having such fused ring moieties are described for example in U.S. Pat. Nos. 5,410,030 and 5,616,502, referenced above.

Many useful fluorogenic dyes for use with the aspects of this disclosure are cyanine dyes, and one or more of the fluorogenic dyes may be a cyanine dye. Cyanine dyes are those including methine group (=CH—) linkages. One important group of cyanine dyes are referred to as merocyanine dyes, which have a quaternary nitrogen heterocycle linked to an electron pair-donating moiety by an alkylene or polyalkylene bridge. The fluorogenic dyes disclosed in U.S. Pat. Nos. 5,410,030 and 5,616,502 are examples of cyanine dyes, with those of U.S. Pat. No. 5,616,502 being examples of merocyanine dyes. The cyanine dyes disclosed in U.S. Pat. No. 5,410,030 are cyanine diners, and more particularly certain diners of unsymmetrical cyanine dyes. One or more of, or all of, the plurality of different fluorogenic dyes may be cyanine dyes, and may be cyanine dyes as disclosed in U.S. Pat. Nos. 5,410,010 and 5,616,502.

During the second preparatory processing, sufficient aqueous liquid diluent may be added to the concentrated dye formulation to dilute the first liquid medium such that the aqueous liquid medium of the aqueous diluted dye formulation has a weight ratio of water to DMSO that will typically be larger, and often much larger, than in the concentrated dye formulation. In some implementations the aqueous liquid medium of the aqueous diluted dye formulation may have a relatively large weight ratio of water to DMSO, which weight ratio may in some implementations may be at least of 10:1, at least 25:1, at least 50:1, at least 75:1 or at least 100:1. In some implementations such a weight ratio of water to DMSO in the aqueous diluted dye formulation may be up to (no larger than) 1000:1, 750:1, 500:1, 300:1 and 200:1. One particularly preferred range for such a weight ratio of water to DMSO in the aqueous diluted dye formulation for some implementations when the weight ratio of water to DMSO in the aqueous diluted dye formulation is relatively large is for the weight ratio to be in a range of from 10:1 to 200:1. In some implementations, the aqueous diluted dye formulation may comprise at least 80 weight percent water, at least 85 weight percent water, at least 90 weight percent water, at least or at least 95 weight percent water or at least 97 weight percent water, in some implementations, the aqueous diluted dye formulation may comprise no more than 99.8 weight percent water, or no more than 99.5 weight percent water and often no more than 99.1 weight percent water. The aqueous liquid diluent may be or include a purified water product, and preferably is an aqueous buffered solution, such as any of those used in the processing of biological materials. In some preferred implementations, the buffer solution is a sodium chloride buffer solution containing TRIS and EDTA. An aqueous diluted dye formulation of this disclosure may at times be referred to herein as simply an aqueous dye formulation, for brevity. In some implementations when the aqueous diluted dye formulation is prepared with a relatively large weight ratio of water to DMSO, the aqueous diluted dye formulation may have an upper concentration limit of DMSO of up to (not larger than) 9 weight percent, 8 weight percent, 7 weight percent, 6 weight percent, 4 weight percent, 2 weight percent, 1 weight percent or 0.5 weight percent, although in such implementations, the aqueous diluted dye formulation may optionally have a lower concentration limit of DMSO of at least 0.1 weight percent, at least 0.2 weight percent, at least 0.4 weight percent, at least 0.8 weight percent, at least 1 weight percent, at least 2 weight percent, 3 weight percent, 5 weight percent or 7 weight percent, provided that in a concentration range the upper concentration limit is larger than the lower concentration limit of the range.

Attaining the desired weight ratio of water to DMSO in the aqueous diluted dye formulation involves diluting the first liquid medium with the aqueous liquid daunt at a large volume ratio of the added volume of aqueous liquid diluent the volume of the first liquid medium to attain preferred weight ratios of water to DMSO in the aqueous diluted dye formulation. For implementations using a relatively large weight ratio of water to DMSO, the volume ratio of water to DMSO may be at least 10:1, at least 25:1, at least 50:1, at least 75:1 or at least 100:1, and is often not more than 1000:1, 750:1, 50011, 300:1 or 200:1, with a range of from 10:1 to 200:1 being particularly preferred for some implementations.

It has also been found that performance of fluorogenic stain formulations prepared in aqueous liquid media may be significantly improved by including a significant quantity (although a minor quantity on a molar basis) of DMSO in the aqueous liquid medium of the fluorogenic stain formulation that is used to stain fluid samples, and which results in a quantity (although a minor quantity on a molar basis) of DMSO also being present in the final stained fluid sample that is then subjected to flow cytometry. Also, although the discussion is presented in relation to inclusion of such a quantity of DMSO in the aqueous fluorogenic stain composition, which is preferred, the concept is not so limited, and a similar beneficial effect may be obtained using other polar organic solvent liquids, for example acetonitrile, and the discussion of that aspect of this disclosure, although provided primarily with reference to DMSO as the organic liquid component, applies equally to other organic liquid components, such as for example acetonitrile.

In some preferred implementations, the aqueous diluted dye formulation may be prepared to include a larger proportion of DMSO to water (or conversely a smaller weight ratio of water to DMSO) than in the implementations discussed that contain a relatively large weight ratio of water to DMSO, and which also results in stained fluid samples having larger concentration of DMSO as fed to a flow cytometer for flow cytometry evaluation, Although even in implementations when DMSO is present in a larger proportion, the DMSO will still typically be a minor component on a molar basis, and also often on a weight basis, relative to water. As will be appreciated, being an aqueous formulation, water will be the component present in the aqueous diluted dye formulation at the largest concentration on a molar basis even in implementations that contain a relatively large proportion of DMSO than the implementations discussed above having, a relatively large weight ratio water to DMSO. In some implementations when the aqueous diluted dye formulation includes a lamer concentration of DMSO, the aqueous diluted dye formulation may have a lower concentration limit for DMSO of at least 10 weight percent, at least 12 weight percent, at least 15 weight percent, at least 17 weight percent or at least 20 weight percent. Such an aqueous diluted dye formulation may in some implementations have an upper concentration limit for DMSO of not larger than 50 weight percent, not larger than 45 weight percent, not larger than 40 weight percent, not larger than 35 weight percent, not larger than 30 weight percent, not larger than 25 weight percent, not larger than 22 weight percent, not larger than 18 weight percent, not larger than 16 weight percent, not larger than 13 weight percent or not larger than 11 weight percent, provided that in a concentration range for DMSO, the upper concentration limit of the range will be larger than the lower concentration limit of the range. During the second preparatory processing, the first liquid medium may be diluted with the aqueous liquid diluent to prepare the aqueous liquid medium of the aqueous diluted dye formulation to have a weight ratio of water to DMSO in some implementations of at least 10:7, at least 10:6, at least 10:5, at least 10:4, at least 10:3, at least 10:2.5, at least 10:2 or at least 10:1.5. Stain formulation stability appears to generally increase with increasing DMSO concentration in the aqueous diluted stain although at DMSO concentrations above about 20 weight percent, DMSO may start to exhibit some biocidal activity that could be detrimental to the biological material under investigation and to a flow cytometry evaluation of that biological material. Although higher concentrations of DMSO can be accommodated in the diluted aqueous dye formulation because the concentration of DMSO will be diluted to a lower concentration in the final stained fluid sample, when using relatively large concentrations of DMSO in the aqueous diluted dye formulation, care is advised to slowly introduce the DMSO into and to rapidly disperse (e.g. through vigorous mixing) the introduced DMSO in the fluid sample being stained, to reduce or avoid detrimental effects from localized concentration shocks to biological material within the fluid sample. In some preferred implementations, the aqueous liquid medium of the aqueous diluted dye formulation is prepared to contain a weight percentage of DMSO in a range of from 10 weight percent DMSO to 30 weight percent DMSO, and in some more preferred implementations, the liquid medium of the aqueous diluted dye formulation is prepared to contain a weight percentage of DMSO in a range of from 15 weight percent to 25 weight percent. In some implementations, the stained fluid sample may include a concentration of DMSO of at least 0.25 weight percent, at least 0.5 weight percent, at least 1 weight percent, at least 2 weight percent, at least 3 weight percent, at least 4 weight percent, at least 5 weight percent, at least 6 weight percent or at least 7 weight percent; and such a stained fluid sample may in some implementations include a concentration of DMSO of up to (not greater than) 30 weight percent, 25 weight percent, 20 weight percent, 15 weight percent, 10 weight percent, 8 weight percent, 5 weight percent, 3 weight percent, 2 weight percent, 1.25 weight percent, or even 1 weight percent.

One issue with a number of liquid organic components for the liquid phase organic material is that they tend to be very good solvents for a number of other materials. As a concentration of liquid phase organic material, such as DMSO becomes larger, there is increased potential that the liquid phase organic material in the stained fluid sample may contribute to extraction of components from polymeric materials of fluidic components (e.g., polymeric materials of construction of tubing and valve parts) in flow cytometers or may be absorbed into and swell such fluidic components, either of which may be detrimental to flow cytometry performance. Accordingly, in some preferred implementations, when the stained fluid sample includes DMSO, the stained fluid sample includes the DMSO in a range having a lower limit selected from the group consisting of 0.25 weight percent, 0.35 weight percent and 0.5 weight percent and an upper limit selected from the group consisting of 2 weight percent and 1.25 weight percent.

Some of the DMSO in the aqueous diluted dye formulation, and in the stained fluid sample, may be provided in the first liquid medium used to dissolve the fluorogenic dyes during the first preparatory processing to prepare a concentrated dye formulation. When the aqueous diluted dye formulation is prepared to contain only a small concentration of DMSO, all of the DMSO for the aqueous diluted dye formulation and for the final stained fluid sample may conveniently be provided in such a first liquid medium. Some of the DMSO for the aqueous diluted dye formulation, and for the stained fluid sample, may also be provided from alternative sources of DMSO, which may typically be the case when the aqueous diluted dye formulation is to contain a larger concentration of DMSO. One preferred source for providing DMSO for the aqueous diluted dye formulation is to include some amount of DMSO in the aqueous liquid diluent used to dilute the first liquid medium of the concentrated dye formulation during the second preparatory processing. The aqueous liquid diluent may include the DMSO as a minor component on a molar basis, and typically at a lower weight percentage concentration than DMSO in the first liquid medium in which the fluorogenic dyes are dissolved during the first preparatory processing. In some implementations, the aqueous liquid diluent may comprise DMSO at a concentration of at least 0.25 weight percent, at least 0.5 weight percent at least weight percent, at least 2 weight percent, at least 5 weight percent, at least 7 weight percent, at least 10 weight percent, at least 12 weight percent, at least 15 weight percent, at least 17 weight percent, or at least 20 weight percent; although in some implementations, the aqueous liquid diluent may include the DMSO at a concentration up to (no larger than) 50 weight percent, 45 weight percent, 40 weight percent, 35 weight percent, 30 weight percent, 25 weight percent, 22 weight percent, 18 weight percent, 15 weight percent, 13 weight percent, 11 weight percent, 8 weight percent, 6 weight percent, 5 weight percent, 2 weight percent, 1.25 weight percent or 1 weight percent. When using a liquid dye concentrate to prepare a stained fluid sample stained with multiple fluorogenic dyes, in one preferred implementation, the stain liquid medium of the liquid dye concentrate preferably includes a liquid mixture of water and DMSO, and the DMSO may be at a concentration in the liquid mixture, or in the liquid dye concentrate, of any of concentrations or ranges as described above for the aqueous liquid diluent.

Another complication with the use of fluorogenic dyes is that some fluorogenic dyes have limited stability in aqueous stain formulations used to stain fluid samples, and stain formulation performance may deteriorate significantly over a short period of time following preparation, significantly limiting the useful shelf life for the stain formulation before use. A further complication with the use of fluorogenic dyes is that for some fluorogenic dyes, the dye molecules appear to aggregate in stain formulations and stained fluid samples in a manner such that when such aggregates are in a free state m solution, not attached to and staining a particle, the aggregates may sometimes become sufficiently fluorescent that during flow cytometry evaluation the fluorescent response from the free aggregates may be difficult to differentiate from stained particles of interest, which can lead to significant inaccuracies in particle counts determined by flow cytometry. One technique for correcting raw flow cytometry particle count results is to subtract from those raw results background particle counts determined from flow cytometry on blank fluid samples of the same or similar fluid matrix but without containing any particles. Such blank fluid samples are stained in the same manner as the fluid samples with biological material under investigation and are subjected to the same flow cytometry evaluation to determine a blank particle count that is then subtracted from raw particle counts from flow cytometry results on the fluid samples under investigation. However, fluorescent activity of some dye molecule aggregates may significantly increase background counts for some fluorogenic dyes, to a level where it may become difficult to meaningful distinguish between blank and real particle counts. The noted complications concerning stain formulation instability highly fluorescent dye molecule aggregates appear to be more associated with fluorogenic dyes that have higher hydrophobicity, such as is the case for example with SYPRO™ Red protein stain.

It has also been found that problems associated with blank particle counts, which are thought to be attributable to aggregates of fluorogenic dye molecules, may be significantly reduced by including a disaccharide in the final stained fluid samples, both in stained blank fluid samples and in stained fluid samples with the biological material of interest for flow cytometry evaluation. Not to be bound by theory, it is thought that the presence of the disaccharide in solution in the stained fluid sample helps disperse and reduce aggregation of fluorogenic dyes, and particularly those that are more hydrophobic such as SYPRO™ Red, to reduce possible detrimental effects of highly fluorescent dye molecule aggregates during flow cytometry. Surprisingly, including dissolved disaccharide in stained fluid samples was found to significantly reduce blank particle counts, whereas including dissolved monosaccharide or trisaccharide was not found to provide any significant benefit and in some cases was detrimental.

In some preferred implementations, the stained fluid sample is prepared to include dissolved disaccharide, typically dissolved in aqueous liquid of the stained fluid sample. In some implementations, the stained fluid sample may preferably include the dissolved disaccharide at a concentration of at least 0.1 weight percent, at least 0.2 weight percent or at least 0.3 weight percent. In some implementations, the stained fluid sample may preferably include the dissolved disaccharide at a concentration up to (not greater than) not greater than 3 weight percent, not greater than 2 weight percent, not greater than 1 weight percent or even not greater than 0.75 weight percent. The disaccharide may include only a single type of disaccharide material or may include a mixture of multiple disaccharide materials. The disaccharide may include for example one or more of trehalose, sucrose, lactose, lactulose, melibiose, melibiulose, cellobiose, nigerose, isomaltose, isomaltulose, maltulose, rutinose, β-laminaribiose, or maltose, with trehalose generally being a preferred disaccharide material.

Disaccharide to be included in the stained fluid sample may be provided in any convenient form and may be introduced at any stage of processing leading to the final stained fluid sample. For example, some or all of the disaccharide may be introduced into a fluid sample before, during and/or after adding stain to the fluid sample.

In seine implementations, preparing the stained fluid sample may include mixing at least a portion oldie aqueous diluted dye formulation with a preliminary fluid sample containing the biological material of interest for evaluation, and wherein the preliminary fluid sample comprises disaccharide to provide at least a portion of the dissolved disaccharide in the stained fluid sample. In seine implementations, such a preliminary fluid sample may preferably have a concentration of disaccharide of at least 0.1 weight percent, at least 0.3 weight percent or at least 0.5 weight percent. In some implementations, such a preliminary fluid sample may preferably have a concentration of disaccharide of up to (not greater than) 5 weight percent, not greater than 3 weight, percent, not greater than 1.5 weight percent or not greater than 1 weight percent. The preliminary fluid sample may be prepared with the disaccharide by including disaccharide in aqueous sample dilution liquid that is mixed with biological material of interest in preparing a diluted fluid sample. For example, it is common to prepare a dilution series of fluid samples prepared at different dilution factors for flow cytometry evaluation. In the process of preparing such a dilated fluid sample, the aqueous sample dilution liquid, typically an aqueous buffer solution, may include some or all of the disaccharide to be included in the final stained fluid sample. In some implementations, when such an aqueous sample dilation liquid includes disaccharide, the disaccharide concentration in the aqueous sample dilution liquid may preferably be at least 0.1 weight percent, at least 0.2 weight percent, at least 0.3 weight percent or at least 0.5 weight percent. In some implementations, a disaccharide concentration in the aqueous sample dilution liquid may preferably be up to (not greater than) 5 weight percent, not greater than 3 weight percent, not greater than 1.5 weight percent or not greater than 1 weight 1.0 percent. In other implementations, a preliminary fluid sample and/or sample dilution liquid may include disaccharide at any concentration, or in any concentration range, as described above for the stained fluid sample. As will be appreciated, because a preliminary fluid sample will typically be comprised of a great majority of aqueous sample dilution liquid, the concentration of disaccharide in a preliminary fluid sample may typically be very close to, and at larger dilution factors may be essentially the same as, the concentration of the disaccharide in the aqueous sample dilution liquid used to prepare a preliminary fluid sample.

In some implementations, some or all of the disaccharide for the dissolved disaccharide in the stained fluid sample may be provided in the aqueous diluted dye formulation when a dry powder mixture of fluorogenic dyes is used, in which case in some implementations the aqueous liquid diluent added to the first liquid medium of the concentrated dye formulation may include disaccharide. In some implementations, when the aqueous diluted dye formulation includes disaccharide, the disaccharide may preferably be present in the aqueous diluted dye formulation at a concentration of at least 0.3 weight percent, at least 0.6 weight percent or at least 0.9 weight percent. In some preferred implementations, a disaccharide concentration in the aqueous diluted dye formulation may be up to (not greater than) 9 weight percent, not greater than 6 weight percent, not greater than 4.5 weight percent or not greater than 3 weight percent. In some implementations. When the aqueous liquid diluent for stain formulation preparation includes disaccharide, the disaccharide may preferably be present in the aqueous liquid diluent at a concentration of at least 0.3 weight percent, at least 0.6 weight percent or at least 0.9 weight percent. In some implementations a disaccharide concentration in the aqueous liquid diluent may preferably be up to (not greater than) 9 weight percent, not greater than 6 weight percent, not greater than 4.5 weight percent or not greater than 3 weight percent. As will be appreciated, because an aqueous dilated dye formulation will typically be comprised of a great majority of aqueous liquid diluent, the concentration of disaccharide in an aqueous diluted dye formulation may typically be very close to, and often essentially the same as, the concentration of the disaccharide in the aqueous liquid diluent used to prepare the aqueous diluted dye formulation.

In some implementations, disaccharide in a preliminary fluid sample, aqueous sample dilution liquid, aqueous diluted dye formulation or aqueous liquid diluent may be at a concentration, or in a concentration range described above for the stained fluid sample.

In some implementations, all of the disaccharide for the dissolved disaccharide in the stained fluid sample may be provided either in a preliminary fluid sample to be stained, in which case the disaccharide may be from one or more than one aqueous sample dilution liquids used to prepare the preliminary fluid sample, or in an aqueous diluted stain formulation when reconstituting a dry powder dye mixture, in which case the disaccharide may be from one or more than one aqueous liquid diluents used to prepare the aqueous diluted stain formulation, or in a liquid dye concentrate containing a plurality of fluorogenic dyes, which may be a pre-prepared dye concentrate provided in a sealed container in a kit or as a separate product.

In some implementations, all of the disaccharide for a stained fluid sample may be provided from a single source, e.g., aqueous sample dissolution liquid, aqueous liquid diluent or liquid dye concentrate, in some other implementations, different portions of the disaccharide may be provided in multiple different sources. For example, a portion of disaccharide for the dissolved disaccharide for the stained fluid sample may be provided in the preliminary fluid sample and another portion of disaccharide for such dissolved disaccharide in the stained fluid sample may be provided in an aqueous diluted dye formulation or a liquid dye concentrate. In such other implementations, the concentration of disaccharide may be the same or different in the preliminary fluid sample and the respective other source. Such concentrations of disaccharide in the preliminary fluid sample (and aqueous sample dilution liquid) and in the aqueous diluted stain formulation (and the aqueous liquid diluent) or in the liquid dye concentrate may, for example, each be in concentration ranges summarized above for the preliminary fluid sample and aqueous diluted dye formulation, or may be in different ranges adjusted to the relative proportions of disaccharide provided in each one of them, provided that the combined quantities of disaccharide provide the desired concentration of the dissolved disaccharide in the stained fluid sample. Also, all or a portion of disaccharide for the dissolved disaccharide in the stained fluid sample may be provided from a source other than a preliminary fluid sample or an aqueous diluted dye formulation or a liquid dye concentrate.

It is noted that disaccharide in a preliminary fluid sample (and aqueous sample dilution liquid used to make the preliminary fluid sample), in an aqueous diluted dye formulation (and aqueous diluent liquid used to make the aqueous diluted dye formulation) or in a liquid dye concentrate will typically be dissolved in aqueous liquid of the respective composition, although for clarity of description the term "dissolved disaccharide" is used herein primarily in reference to the disaccharide in the stained fluid sample.

Each fluorogenic dye may be included in the dry powder dye composition in such an amount so as to provide a desired concentration for such fluorogenic dye in the concentrated dye formulation, and ultimately in the aqueous diluted dye formulation. In terms of molar concentration, the aqueous diluted dye formulation may be prepared such that each of the plurality of different fluorogenic dyes (including each of the first fluorogenic dye and the second fluorogenic dye) may independently have a concentration within a range having a lower limit selected from the group consisting of 0.1 micromole per liter, 1 micromole per liter, 10 micromoles per liter and 100 micromoles per liter and an upper limit selected from the group consisting of 2500 micromoles per liter, 2000 micromoles per liter, 1500 micromoles per liter and 1000 micromoles per liter. In terms of weight-to-volume concentration, the aqueous diluted dye formulation may be prepared such that each of the plurality of different fluorogenic dyes (including each of the first fluorogenic dye and the second fluorogenic dye may independently have a concentration within a range having a lower limit and selected from the group consisting of 1 microgram per milliliter, 10 micrograms per milliliter and 50 micrograms per milliliter and an upper limit selected from the group consisting of 1000 micrograms per milliliter, 500 micrograms per milliliter and 250 micrograms per milliliter. A weight-to-volume concentration of each of the plurality of fluorogenic dyes (including each of the first fluorogenic dye and the second fluorogenic dye) in the concentrated dye formulation may be at least 5 times as large, at least 10 times as large, at least 50 times as large, at least 75 times as large or at least 100 times as large as a corresponding weigh-to-volume concentration in the aqueous diluted dye formulation.

The first preparatory processing preferably comprises, after mixing the dry powder dye composition with the first liquid medium, permitting the resulting mixture to sit for a residence time (also referred to as an incubation time) prior to diluting the first liquid medium with the aqueous liquid diluent during the second preparatory processing. The residence time is preferably at least 6 minutes, more preferably at least 7 minutes, even more preferably at least 8 minutes and still more preferably at least 9 minutes. Typically, the residence time need not be longer than 20 minutes, and preferably not longer than 15 minutes. A residence time of about 10 minutes is preferred for some implementations.

The method may be performed to prepare a batch of the aqueous diluted dye formulation that is sufficient for staining multiple fluid samples to prepare multiple fluorescently-stained fluid samples for flow cytometry evaluation, and preferably all such fluorescently-stained fluid samples would be subjected to flow cytometry within 4 hours after completion of preparation of the aqueous diluted dye formulation. The method may include preparing a plurality of fluorescently-stained fluid samples using different aliquots of die aqueous diluted dye formulation.

Additional description regarding processing using DMSO as the organic liquid component is provide in U.S. provisional patent application No. 62/713,377 and international patent application no. PCT/US2019/044623, referenced previously.

The flow cytometry evaluation may include feeding the fluorescently-stained fluid sample to the flow cytometer in any convenient manner. A plurality of such fluorescently-stained fluid samples may be disposed in a multi-well plate and sequentially withdrawn from the multi-will plate and fed to a flow cytometer by an autosampler. Alternatively, fluorescently stained fluid samples may be fed manually to the flow cytometer.

The flow cytometer may be any flow cytometer configured to evaluate for virus-size particles through detection and analysis of fluorescent emission response of the fluorescent stain on the unassociated labeled particles of virus size. The flow cytometer may be of a type in which the fluorescently-stained fluid sample flows through the flow cell of the flow cytometer without hydrodynamically focusing the fluorescently-stained fluid sample with a sheath fluid. In preferred implementations, however, the flow cytometer is of a type in which the fluorescently-stained fluid sample is hydrodynamically focused with a sheath fluid introduced around the flowing fluid sample prior to introduction of the fluorescently-stained fluid sample into the flow cell of the flow cytometer. In the flow cell, the fluorescently-stained fluid sample, preferably in a hydrodynamically focused state, is subjected to one or more stimuli to stimulate a fluorescent emission response from each fluorescent stain on the unassociated labeled particles. The one or more stimuli to which the fluorescently-stained fluid sample is subjected in the flow cell may preferably include at least one excitation radiation. Such an excitation radiation may be of a wavelength range sufficient to stimulate the fluorescent emission response from at least one and optionally multiple ones of a plurality of fluorescent stains on the unassociated labeled particles. The one or more stimuli may include multiple different excitation radiations having different wavelength ranges for stimulating fluorescent emission responses from different ones of a plurality of fluorescent stains. In preferred flow cytometry processing, the flow rate of the fluorescently-stained fluid sample, and preferably in a hydrodynamically focused state, through the flow cell is maintained at a very low flow rate to enhance accurate detection of the unassociated labeled particles, and preferably such flow rate of the fluorescently-stained fluid sample through the flow cell is in a range having a lower limit of 300 nanoliters per minute, 600 nanoliters per minute or 800 nanoliters per minute and an upper limit of 6000 nanoliters per minute, 3000 nanoliters per minute or 2000 nanoliters per minute. When multiple fluorescent stains are used, the flow cytometry preferably comprises separately detecting for each of the plurality of different fluorescent emission signatures of the plurality of different fluorescent stains, and time correlating detection of at least one such fluorescent emission signature (e.g., of a first fluorescent stain) and detection of at least one other such fluorescent emission signature eta second fluorescent stain) to determine a detection event indicative of an occurrence of passage through the flow cell of an unassociated virus-size particle stained with each of the different fluorescent stains for which fluorescent emission signatures are time correlated (e.g., an unassociated non-enveloped viral particle including both the first fluorescent stain and the second fluorescent stain). Such a time correlation may also be used to identify an occurrence of an unassociated labeled particle passing through the flow cell that is stained with only one of a plurality of fluorescent stains and not with another one of the plurality of fluorescent stains, for example to identify an unassociated non-enveloped viral particle with an attached fluorescent stain bound to protein content (e.g., nonspecifically with a fluorogenic stain or specifically to an epitope with a fluorescent antibody slain) and not having attached to it another fluorescent stain for staining of nucleic acid content, indicative of a particle containing protein and not containing genetic material such as an unassociated non-enveloped virus-like particle. One preferred flow cytometer configured for flow cytometry evaluation of fluorescently-stained fluid samples is the Virus Colonel® 3100 flow cytometer.

A second aspect of this disclosure is directed to a kit for preparing a fluorescently-stained fluid sample for flow cytometry evaluation of biological material for quantification of unassociated non-enveloped viral particles of virus size and having a non-enveloped viral capsid. The kit comprises:

a plurality of sealed containers;
a fluorescent stain composition for fluorescent staining the unassociated non-enveloped viral particles to prepare unassociated labeled particles of virus size, each said unassociated labeled particle of virus size comprising a said unassociated non-enveloped viral particle stained with a fluorescent stain from the fluorescent stain composition, the fluorescent stain composition comprising at least one fluorescent stain and being contained in a first said sealed container,
an aqueous dilution liquid for preparing a pH-adjusted fluid sample for fluorescent staining biological material at in an acidic pH of up to pH 6.5 during preparation of the unassociated labeled particles of Vials size dispersed in an aqueous medium for flow cytometry evaluation of a fluorescently-stained fluid sample with the biological material, the aqueous dilution liquid having an acidic pH of no larger than pH 6.5 and being contained in a second said sealed container.

A number of feature refinements and additional features are applicable to this second aspect of the disclosure. These feature refinements and additional features may be used individually or in any combination within the subject matter of this aspect or any other aspect of this disclosure. As such, each of the following features may, but are not required to be used with an other feature or combination of features of this aspect or any other aspect of this disclosure.

The kit may be for preparing a fluorescently-stained fluid sample comprising unassociated labeled particles of virus size dispersed in aqueous liquid medium for flow cytometry according to the method of the first aspect.

The aqueous dilution liquid in the second sealed container may be provided with properties for use to prepare a fluorescently-stained fluid sample according to the method of the first aspect, and may have properties as described for any aqueous dilution liquid in relation to the method of the first aspect. The aqueous dilution liquid may be at an even more acidic pH, and the aqueous dilution liquid may have a pH of no larger than pH 6.4, no larger than pH 6.2, no larger than pH 6.0, no larger than 5.8, no larger than 5.6, no larger than pH 5.4, no larger than pH 5.2, no larger than 5.0, no larger than pH 4.8 or no larger than pH 4.5. The aqueous dilution liquid in the second sealed container may have a pH of not smaller than pH 2.5, not smaller than pH 3.0, not smaller than pH 3.5, not smaller than pH 4.0, not smaller than 4.5, not smaller than 4.8, not smaller than 5.0, or not smaller than 5.2, The aqueous dilution liquid in the second sealed container may be at an acidic pH within any acidic pH range as discussed above for the fluorescently-stained fluid sample. The aqueous dilution liquid in the second sealed container may be an aqueous sample dilution liquid for diluting a preliminary sample to desired dilution ratios for flow cytometry evaluation and/or may be an aqueous stain dilution liquid for diluting fluorescent stain to prepare an aqueous diluted stain formulation in a form for mixing with a fluid sample to fluorescently stain the fluid sample. Such a dilution ratio may be at least 5 or at least 10 relative to the preliminary sample being diluted. Such a preliminary sample may itself be a diluted sample prepared from a more concentrated preliminary sample, such as may be a case in preparation of a dilution series starting with a base sample stock. The aqueous dilution liquid in the second sealed container may be such an aqueous sample dilution liquid and the kit may include another sealed container, other than the first sealed container and the second sealed container, with the other sealed container containing an aqueous stain dilution liquid to prepare an aqueous diluted stain formulation. Such aqueous stain dilution liquid in such other sealed container may be at a higher pH than the aqueous sample dilution liquid in the second sealed container, for example at pH 7 or greater, which may be a pH near physiological pH (e.g., about pH 7.4), and preferably will be at a pH of no greater than pH 8.5 and more preferably no greater than pH 8.0. Alternatively, such aqueous stain dilution liquid in such other sealed container may be at an acidic pH, which may be any acidic pH as described above for the aqueous dilution liquid in the second sealed container, which may be at the same or different acidic pH than the acidic pH of the aqueous sample dilution liquid, and such aqueous stain dilution liquid and aqueous sample dilution liquid may have the same composition or may be different compositions. The kit may include a plurality of such second sealed containers each containing the aqueous dilution liquid.

In some implementations, the kit may include multiple different aqueous sample dilution liquids each having a different pH. For example a kit may have a first aqueous sample dilution liquid at an acidic pH, as discussed above, and a second aqueous sample dilution liquid, in another sealed container, other than the first and second sealed containers. The second aqueous sample dilution liquid may be at a higher pH, for example to male a pH adjustment after a first fluorescent staining step performed at an acidic pH and before a second fluorescent staining step performed at a higher pH. Such a first fluorescent staining step may involve fluorescent staining the biological material with one or more fluorogenic dyes, and preferably with at least a fluorogenic dye for nonspecific staining of nucleic acid content, and such a second fluorescent staining step may involve subsequently fluorescent staining the biological material with a fluorescent antibody stain at a higher pH. Such a higher pH of the second aqueous sample dilution liquid may be acidic, neutral or basic, although higher than the acidic pH of the first aqueous sample dilution liquid. Such a higher pH of the second aqueous sample dilution liquid may be at least 0.5 pH unit larger, at least 1.0 pH unit larger, at least 1.5 pH units larger, at least 2.0 pH units larger at least 2.5 pH anus larger or even at least 3.0 pH units larger than the acidic pH of the first aqueous sample dilution liquid. Such a higher pH of the second aqueous sample dilution liquid may be pH 5.5 or larger, pH 5.8 or larger, pH 6.0 or larger, pH 6.2 or larger or pH 6.5 or larger. In some embodiments such a higher pH may be larger than pH 6.5, may be at least pH 6.7, may be at least 6.9 or may be at least 7.0, although such a higher pH may often be no larger than pH 8.5, no larger than pH 8.0 or no larger than pH 7.5, and such higher pH may for example be at about a physiological pH (e.g., about pH 7.4). One situation when the fluorescently-stained fluid sample fed to the flow cytometer may be at such a higher pH than the acidic pH of the stained fluid sample composition from first fluorescent staining (e.g., with a fluorogenic dye) is when following such first fluorescent staining the biological material is then stained with one or more additional fluorescent stains (e.g., fluorescent antibody stain) that have a higher sensitivity to low pH than a fluorescent stain applied at the acidic pH.

The fluorescent stain composition in the first sealed container may contain one or a plurality of different fluorescent stains each having a different fluorescent emission signature, and the fluorescent stain composition may include any stain or combination of stains as discussed with respect to the method of the first aspect. The fluorescent stain composition may include one or a plurality of fluorogenic dyes, and in a preferred implementation the fluorescent stain composition may include at least a fluorogenic dye for nonspecific staining of nucleic acid content, and optionally together with a second fluorogenic dye for nonspecific staining of protein content or a fluorescent antibody stain for binding with an epitope of a non-enveloped viral capsid. The fluorescent stain composition may include one or a plurality of different fluorescent antibody stains each for binding with an epitope of a non-enveloped viral capsid. Any such fluorogenic dye or fluorescent antibody stain in the fluorescent stain composition may be or have properties as described with respect to the method of the first aspect or as described elsewhere in this disclosure. The fluorescent stain composition may be in the form of a dry powder dye composition including one or more fluorogenic dyes in a dry powder form. The fluorescent stain composition may be in the form of a liquid fluorescent stain composition, optionally in a form that may be directly added to a fluid sample containing the biological material for flow cytometry evaluation. When the fluorescent stain composition includes a fluorescent antibody stain, such fluorescent antibody stain may be for direct staining of a target unassociated non-enveloped viral particle or the fluorescent antibody stain may include a secondary antibody with attached fluorophore for indirect staining through binding to a primary antibody that binds to the unassociated non-enveloped viral particle. Such a liquid fluorescent stain composition may include as a fluorescent stain component a fluorescent antibody stain and/or fluorogenic dye. When the fluorescent antibody stain is for indirect staining, the kit may include the secondary antibody with the attached fluorophore and may also include the primary antibody, which primary antibody may be in a sealed container separate from the secondary antibody in the first sealed container or may be in a combined composition in the first sealed container. The aqueous dilution liquid may be or include an aqueous buffer solution, for example with any properties or buffering agents as discussed with respect to the method of the first aspect. The kit may include a plurality of such first sealed containers each containing the fluorescent stain composition.

The kit may include a reconstitution liquid medium that is a solvent for one or more fluorogenic dyes in the kit, such as one or more fluorogenic dyes in a dry powder dye composition, and wherein the reconstitution liquid medium includes an organic liquid component. Such reconstitution liquid medium may be used to provide each such fluorogenic dye in a solution in the reconstitution liquid medium prior to mixing with aqueous stain dilution liquid to prepare an aqueous diluted stain formulation that may be used to fluorescently stain a fluid sample containing the biological material to be evaluated by flow cytometry. Such a reconstitution liquid medium may be contained in a sealed container, other than the first sealed container and the second sealed container, or the reconstitution liquid medium may be in the first sealed container as part of the fluorescent stain composition. When the fluorescent stain composition includes the reconstitution liquid medium, fluorogenic dye in the fluorescent stain composition may be dissolved in the reconstitution liquid medium. The organic liquid component may be any of the organic liquid components, as discussed above with respect to the method of the first aspect, but in preferred implementations is dimethyl sulfoxide (DMSO). Preferably the organic liquid component comprises at least 34 percent by the moles of the reconstitution liquid medium. The reconstitution liquid medium may be the first liquid median discussed above with respect to the method of the first aspect.

The fluorescent stain composition in the first sealed container may be in the form of a liquid dye concentrate comprising a plurality of different fluorogenic dyes in a liquid medium, each different said fluorogenic dye having a different fluorescent emission signature for detection when bound to a said unassociated non-enveloped viral particle; and wherein the liquid dye concentrate comprises at least one member selected from the group consisting of:
 (i) the liquid medium of the liquid dye concentrate comprising a liquid mixture including water and liquid phase organic material, and preferably the liquid medium is aqueous, and more preferably the liquid medium comprises More than 50 percent by moles of water;
 (ii) disaccharide dissolved in the liquid medium of the liquid dye concentrate; and
 (iii) a combination including both (i) and (ii).

The liquid dye concentrate may have any feature or combination of features disclosed for the liquid dye concentrate in relation to the method of the first aspect.

The kit may include quantities of fluorescent stain composition and quantities of aqueous sample dilution liquid, and optionally quantities of other materials in the kit, to prepare multiple fluorescently-stained fluid samples for flow cytometry evaluation. In some preferred implementations, the kit contains sufficient quantities fir preparing at least 10 of the fluorescently-stained fluid samples for flow cytometry evaluation.

Each first sealed container containing fluorescent stain composition and each second sealed container containing aqueous dilution liquid may be packaged in a common packaging enclosure, optionally with other components, such as other sealed containers with other materials, also packaged in the common packaging enclosure. And such common packaging enclosure is preferably a hermetically sealed enclosure.

Numerous additional features and advantages of the present disclosure will become apparent to those skilled in the art upon consideration of the embodiment descriptions provided hereinbelow.

DETAILED DESCRIPTION

Figure 1:
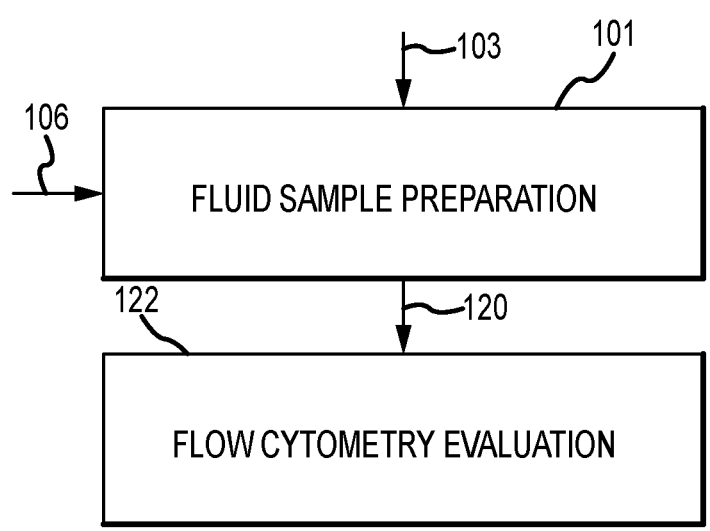
FIG. 1 illustrates a process diagram for an example embodiment a method of the disclosure.

Reference is made to FIG. 1 showing a generalized process block flow diagram illustrating one embodiment of a generalized method of this disclosure for flow cytometry evaluation for quantification of unassociated non-enveloped viral particles, which have a non-enveloped viral capsid. The processing illustrated in FIG. 1 includes fluid sample preparation 101 in which a sample feed 103 and a fluorescent stain feed 106 are processed to prepare a fluorescently-stained fluid sample 120, which is then subjected to flow cytometry evaluation 122. The sample feed 103 is a preliminary sample prior to staining and includes biological material to be evaluated to identify and quantify the presence of unassociated non-enveloped viral particles that are a target of the evaluation. The sample feed 103 may be supplied to the fluid sample preparation 101 in any convenient form as a starting point for processing in the fluid sample preparation 101. For example such sample feed 103 may be a crude sample harvested from a biological process in which the non-enveloped, or may be in a form that has already been subjected to some preparatory processing, for example to some purification processing, pH adjustment, dilution or other conditioning with reagents. Such purification processing could include for example centrifugation and/or filtration too remove particles larger than virus size that might interfere with or complicate the flow cytometry evaluation 122. As prepared during the fluid sample preparation 101, the fluorescently-stained fluid sample 120 includes unassociated labeled particles of virus size dispersed in aqueous liquid medium and may be at a pH in an acidic pH range, such as an acidic pH range discussed in more detail elsewhere herein, and with such unassociated labeled particles of virus size each including an unassociated non-enveloped viral particle stained with at least one fluorescent stain. Regardless of the particular state of the sample feed 103 as fed to the fluid sample preparation 101, processing during the fluid sample preparation 101 will include staining at least a portion of biological material of the sample feed 103 with at least one fluorescent stain provided in the fluorescent stain feed 106 and adjusting pH, if needed, to within the acidic pH range. Processing performed during the fluid sample preparation 101 may include any other pre-staining preparatory processing or post-staining processing to prepare the fluorescently-stained fluid sample 120 in a form and with properties, preferably including a pH in the acidic pH range, suitable for the flow cytometry evaluation 122.

During, the flow cytometry evaluation 122, the fluorescently-stained fluid sample 120 is introduced into and processed through a flow cytometer for flow cytometry evaluation for quantification of the targeted unassociated non-enveloped viral particles in the fluid sample. Quantification refers to counting particles, and preferably determining a concentration of the particles in they fluid sample and/or in a base sample stock from which the fluid sample was prepared. The flow cytometry evaluation includes flowing the fluid sample through an investigation zone of the flow cytometer and in the investigation zone subjecting the fluid sample to stimulation radiation to elicit fluorescent emission response from the fluorescent stain or stains of the unassociated labeled particles. Radiation (e.g., light) coming from the investigation zone is detected by one or more radiation detectors (e.g., light detectors) to identify the presence of such fluorescent emission response to identify occurrences of the unassociated labeled particles, which are counted, and which may be quantified in terms of particle concentration based on the volume of fluid sample processed through the investigation zone that corresponds with the number of the counted particles. When multiple fluorescent stains are used, the different fluorescent emission responses from the different fluorescent stains may be detected separately by separate detectors (e.g., photodetectors) each configured for detection of the specific fluorescent emission response of the targeted fluorescent stain. Detected fluorescent emission signatures may be processed by a data analysis system to identify detection events indicative of the unassociated labeled particles and to count identified occurrences of and determine a concentration for the unassociated labeled particles in the fluid sample. When multiple fluorescent stains are used, the excitation radiation may include a single excitation radiation source (e.g., a single laser or LED), for example when multiple fluorescent stains are suitably excited at similar wavelengths of excitation radiation. Alternatively, the excitation radiation may include multiple excitation radiation sources (e.g., multiple lasers and/or LEDs) that provide excitation radiation about different wavelengths each targeted to excitation of a different one of the fluorescent stains.

With respect to achieving the desired pH of the fluorescently-stained fluid sample 120 during the fluid sample preparation 101, pH adjustment may occur prior to and or during the fluid sample preparation 101. For example, the sample feed 103, including biological material of interest for investigation, may have been subjected to processing including pH adjustment to within the desired pH range prior to the fluid sample preparation 101, In that case, processing during the fluid sample preparation may include simply mixing one or more stain compositions, including fluorescent stain provided in the fluorescent stain feed 106, with the sample feed 103 to prepare the fluorescently-stained fluid sample at the desired pH within the acidic pH range. Alternatively, and commonly, the sample feed 103 will be in a form and with a pH that will involve more significant processing during the fluid sample preparation 101, including a step during which a pH adjustment is made into the desired acidic pH range. The fluorescent stain feed 106 may be provided in a variety of corals and may be provided in a single fluorescent stain feed composition or in multiple fluorescent stain feed compositions. Such a fluorescent stain feed may be a fluorescent stain composition as provided in a kit, for example in any kit as discussed herein, including any oldie kits illustrated in any of FIGS. 8-11. Such a fluorescent stain feed composition of the fluorescent stain feed 106, may in some implementations be used directly to stain a sample containing the biological material, or and in other implementations may be subjected to preparatory processing to prepare a modified fluorescent stain composition that is mixed with the sample to accomplish the fluorescent staining. When the fluorescently-stained fluid sample 120 is to be stained with multiple fluorescent stains, the fluorescent stain feed 106 will include the multiple fluorescent stains, however different ones of the fluorescent stains may be provided separately to the fluid sample preparation 101 in separate fluorescent stain teed compositions. Alternatively, multiple fluorescent stains may be provided in a single fluorescent stain feed composition.

Figure 2:
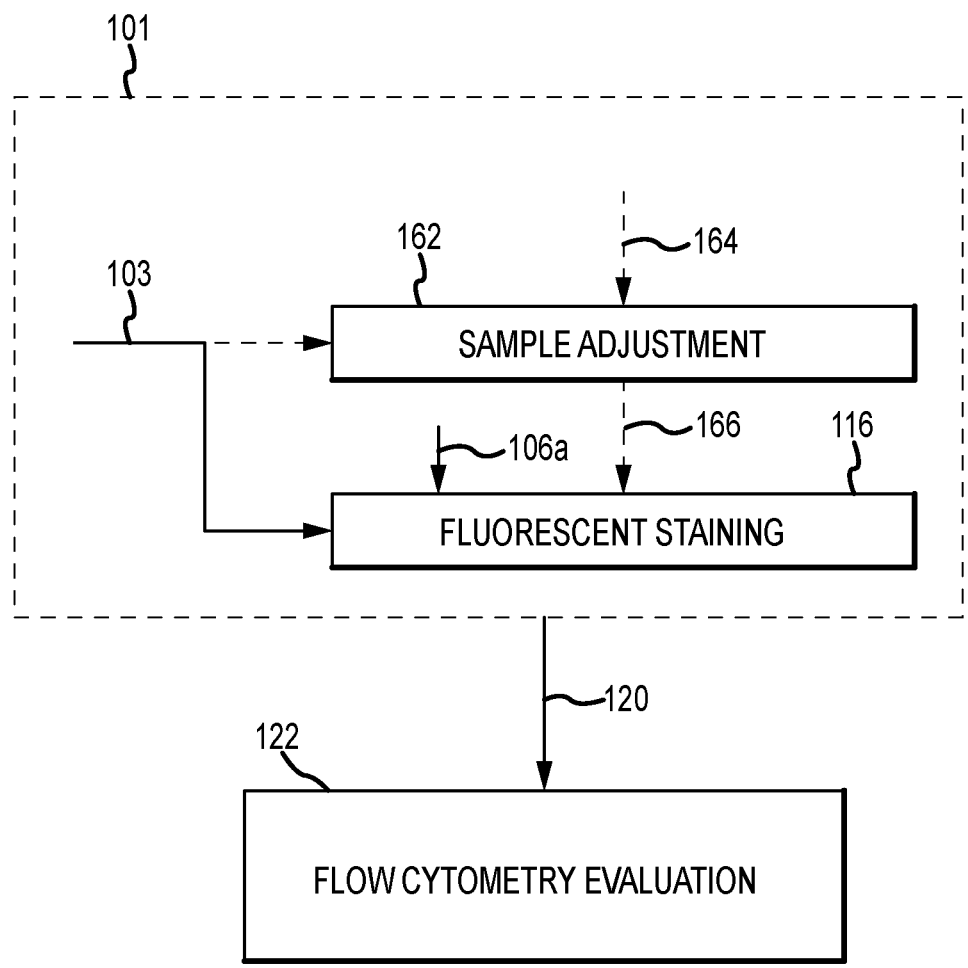
FIG. 2 illustrates another process diagram for another example embodiment of a method of the disclosure.

Reference is now made to FIG. 2 illustrating one example for processing within the fluid sample preparation 101 of the general processing scheme of FIG. 1. As shown in FIG. 2, the fluid sample preparation 101 includes a step of fluorescent staining 116, in which fluorescent stain from a fluorescent stain feed 106a is used to fluorescently stain biological material provided in the sample feed 103. FIG. 2 shows some alternative processing options. In one processing alternative, in which the sample feed 103 as provided to the fluid sample preparation 101 is already in a form and at a pH in an acidic pH range generally desired for the flow cytometry evaluation 122, the sample feed 103 may the provided directly to the fluorescent staining 116, where the fluorescent stain feed 106a may be mixed into the sample feed 103 to prepare the fluorescently-stained fluid sample 120 at the desired acidic pH, in alternative processing shown in FIG. 2. When the sample feed 103 is not in a fluid form and/or not at a pH suitable for the flow cytometry evaluation 122, the sample feed 103 may be subjected to a preliminary step of sample adjustment 162 prior to processing in the fluorescent staining 116. During the sample adjustment 162, the sample feed 103 may be diluted with an aqueous sample dilution liquid 164, and the aqueous sample dilution liquid 164 may be provided at a suitable acidic pH so that when mixed with the sample feed 103, a resulting diluted sample 166 will have fluid properties and be at a pH within the acidic pH range for the flow cytometry evaluation. In some implementations, the sample adjustment may include diluting a sample feed 103 to a desired dilution factor for the flow cytometry evaluation, and with the aqueous 164 at a suitably acidic pH. The diluted sample 166 may then be subjected to the fluorescent staining 116 using fluorescent stain from the fluorescent stain feed 106a to prepare the fluorescently-stained fluid sample 120. The processing as illustrated in FIG. 2 may preferably apply in situations when the fluorescent stain feed 106a is provided in the form of a liquid stain composition with one or more fluorescent stain components dispersed, and preferably dissolved, in a compatible liquid medium for the fluorescent stain components. Such a liquid stain composition may for example include one or more fluorescent antibody stains and/or one or more fluorogenic dyes. In one example, such a liquid stain composition may include both a fluorescent antibody stain specific for binding to an epitope of the capsid of a target non-enveloped viral particle and a fluorogenic dye that is nonspecific for staining nucleic acid content within the capsid of the viral particle. In one preferred variation, the fluorescent stain feed 106a may be in the form of a liquid dye concentrate comprising a plurality of different fluorogenic dyes (e.g., the first fluorogenic dye for nonspecific nucleic acid staining and the second fluorogenic dye for nonspecific protein staining) in a liquid medium, each different said fluorogenic dye having a different fluorescent emission signature for detection when bound to a said unassociated non-enveloped viral particle, and wherein the liquid dye concentrate comprises at least one member selected from the group consisting, of: (i) the liquid medium of the liquid dye concentrate comprising a liquid mixture including water and liquid phase organic material, and preferably the liquid medium is aqueous, and more preferably the liquid medium comprises more than 50 percent by moles of water; (ii) disaccharide dissolved in the liquid medium of the liquid dye concentrate; and (iii) a combination including both (i) and (ii). An advantage of providing the fluorescent stain feed 106a in the form of a liquid dye concentrate is that complications involving reconstitution of fluorogenic dyes from a dry mixture form may be avoided. The method may include unsealing a sealed container, such as provided in a kit, containing the liquid dye concentrate and removing the liquid dye concentrator a portion thereof from the unsealed container for direct use in the fluorescent staining 116 without any need for preparatory processing other than to measure the proper quantity of the liquid dye concentrate fear use in the fluorescent staining 116. As may be appreciated, in the processing example shown in FIG. 2, the fluorescent stain feed 106a may be provided to the fluorescent staining 116 as a single fluorescent stain composition or in multiple separate stain compositions each including at least one different fluorescent stain component.

Figure 3:
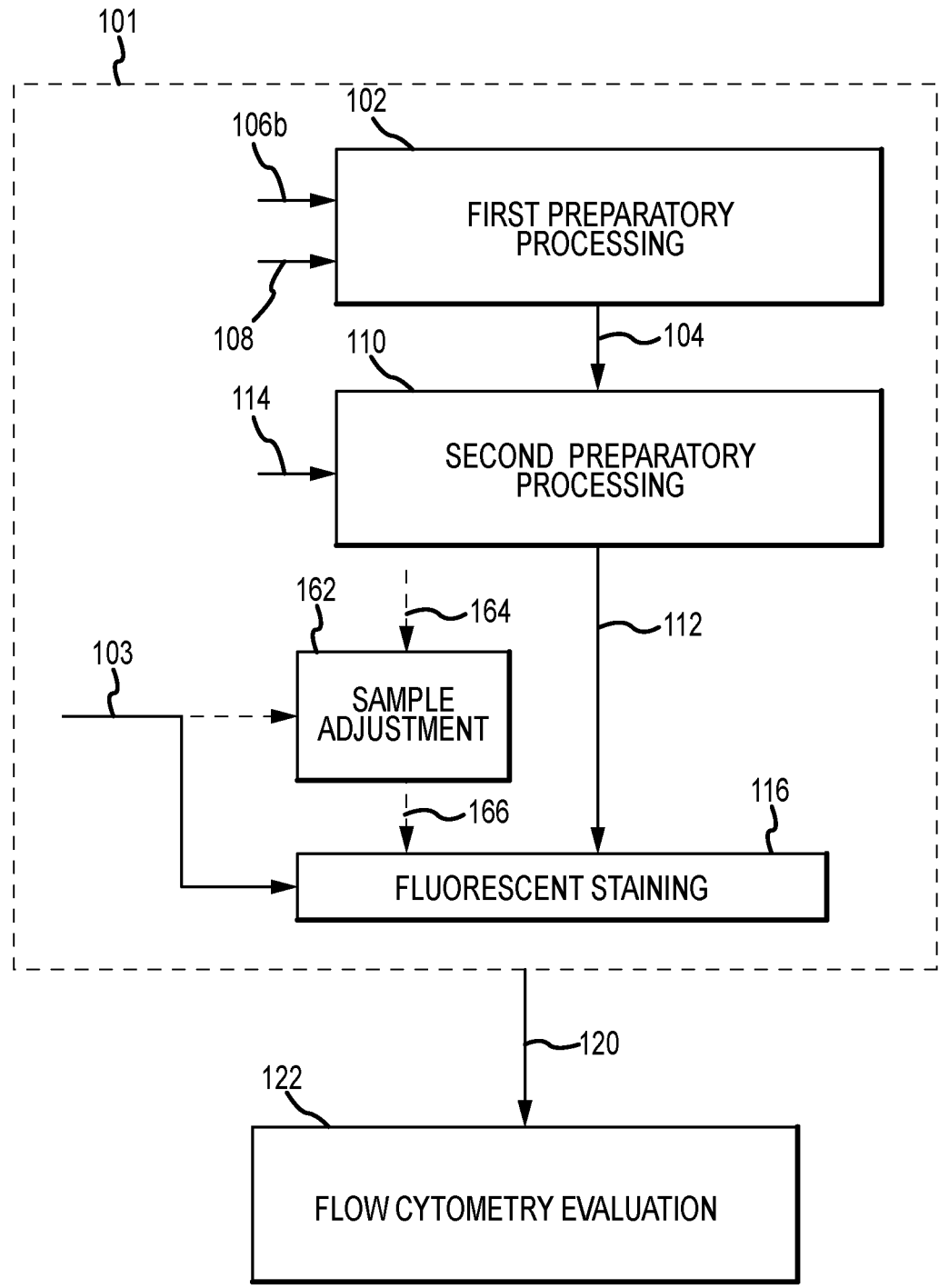
FIG. 3 illustrates another process diagram for another example embodiment of a method of the disclosure.

Reference is now made to FIG. 3 illustrating another example for processing within the fluid sample preparation 101 in which a fluorescent stain feed 106b includes fluorescent stain in a dry powder stain composition. As shown in FIG. 3, the fluid sample preparation 101 includes the fluorescent staining 116 as shown in FIG. 2. However, in the processing example shown in FIG. 3, fluorescent stain is provided in the form of dry powder stain composition in the fluorescent stain feed 106b, to a step of first preparatory processing 102 to prepare a concentrated stain formulation 104, which is then processed in a step of second preparatory processing 110 to prepare an aqueous diluted stain formulation 112 that is then used in the fluorescent staining 116. During the first preparatory processing 102, the dry powder stain composition of the fluorescent stain feed 106b is combined and mixed with a reconstitution liquid medium 108 to dissolve a fluorescent stain component from the dry powder stain composition into the reconstitution liquid medium 108. Dissolving the fluorescent stain component from powder form into the reconstitution liquid medium 108 may be aided by mechanical means, such as by stirring, shaking, vortex and or centrifuging the mixture. In one preferred implementation for the processing shown in FIG. 3, the dry powder stain composition includes at least one fluorogenic dye, for example in one preferred implementation such a dry powder stain composition includes a fluorogenic dye for nonspecific nucleic acid staining within the non-enveloped viral particle capsid, and in some other preferred implementations such a dry powder stain composition includes a dry powder mixture with at least two different fluorogenic dyes, for example a first fluorogenic dye for non-specific staining of nucleic acid content inside the capsid and a second fluorogenic dye for nonspecific staining of protein content of the capsid. When the dry powder stain composition of the fluorescent stain feed 106b includes a fluorogenic dye as a fluorescent stain component, the dry powder stain composition may be referred to as a dry powder dye composition, the concentrated stain formulation 104 may be referred to as a concentrated dye formulation and the aqueous diluted stain formulation 112 may be referred to as an aqueous diluted dye composition.

With continued reference to FIG. 3, the reconstitution liquid medium 108 is a solvent for at least one, and preferably all, fluorescent stain components in dry powder form in the fluorescent stain feed 106b. The reconstitution liquid medium 108 includes an organic liquid to help facilitate effective dissolution and dispersion of fluorescent stain. Such organic liquid may include any organic liquid component or mixture of organic liquid components. One useful organic liquid component is acetonitrile, however in preferred implementations the organic liquid includes DMSO, and preferably at the largest concentration of any organic liquid components in the reconstitution liquid medium 108, for example as discussed above. The concentrated stain formulation 104 resulting from the first preparatory processing 102 includes the fluorescent stain components (e.g., fluorogenic dyes) dissolved in the reconstitution liquid medium 108, In the example processing shown in FIG. 3, the reconstitution liquid medium 108 has been pre-prepared to a desired composition, however in alternative processing when the reconstitution liquid medium 108 is to include multiple liquid components, such a reconstitution liquid medium may be prepared in situ during the first preparatory processing 102 through the mixing together of multiple such components mixing an organic liquid component with aqueous buffer solution and/or other organic solvent components) before or after mixing with the dry powder stain composition of the fluorescent stain feed 106b.

With continued reference to FIG. 3, the concentrated dye formulation 104 is processed in the second preparatory processing 110 to prepare the aqueous diluted stain formulation 112, which is an aqueous composition including the fluorescent stain components fluorogenic dyes) from the concentrated stain formulation 104 dissolved in an aqueous liquid medium. Importantly, during the second preparatory processing 110, the fluorescent stain components in the concentrated dye formulation 104 remain in solution for the duration of the second preparatory processing 110. In other words, during the second preparatory processing 110, such fluorescent stain components are not precipitated, even temporarily, during the second preparatory processing 110, and the liquid medium in which the fluorescent stain components are dissolved is converted from a first liquid medium in the concentrated stain formulation 104, and preferably an organic liquid medium, to an aqueous diluted liquid medium in the aqueous diluted stain formulation 112 while the fluorescent stain components remain in a dissolved state. As shown in FIG. 3, an aqueous stain dilution liquid 114 (e.g., aqueous buffer solution) is provided to the second preparatory processing 110 and is mixed with the concentrated stain formulation 104 to dilute the reconstitution liquid medium 108 with the aqueous stain dilution liquid 114 to an extent to which after the second preparatory processing 110 the liquid medium in which the fluorescent stain components are dissolved is assured to be aqueous in nature, in other words is comprised of at least a majority by moles of water, and preferably with a weight ratio of water to any and all organic liquid components of at least 10:1 or such larger weight ratio, for example as discussed above for some implementations when the aqueous diluted dye formulation 112 is to include a relatively large weight ratio water to DMSO, and otherwise with a smaller weight ratio of water to DMSO for some other implementations when the aqueous diluted dye formulation 112 is to include a larger concentration of DMSO, as discussed above. Mixing of the aqueous stain dilution liquid 114 with the concentrated stain formulation 104 preferably follows a suitable retention, or incubation, time following mixing together the dry powder stain composition of the stain feed 106b and the reconstitution liquid medium 108. In the processing shown in FIG. 3, the aqueous stain dilution liquid 114 is shown as a single addition, however, the aqueous stain dilution liquid 114 may in alternative embodiments include multiple additions of different amounts of the aqueous it dilution liquid 114, which may or may not each have the same composition. When the aqueous diluted stain formulation 112 is to include a larger concentration of DMSO, as discussed above, DMSO in addition to that included in the first liquid medium 108 may be provided, for example, as a minor molar component in the aqueous liquid diluent 114.

With continued reference to FIG. 3, during the fluorescent staining 116, at least a portion of the aqueous diluted stain formulation 112 is mixed with and used to fluorescently stain biological material provided in the sample feed 103. Depending upon the form and properties of the sample feed 103, the sample feed 103 may be provided directly to the fluorescent staining 116, or may be subjected to a preliminary step of sample adjustment 162 using aqueous sample dilution liquid 164 to prepare the diluted sample 166 at a desired dilution factor and/or desired acidic pH in a like manner as described with respect to similar processing shown in FIG. 2, in the processing of FIG. 3, adjustment of pH may occur during the second preparatory processing 110 by providing the aqueous stain dilution liquid 114 at an appropriate acidic pH such that the aqueous diluted stain formulation 112 has an acidic pH in a desired range for the fluorescently-stain fluid sample 120. Alternatively, or additionally, pH adjustment may occur during the sample adjustment 162 using the aqueous sample dilution liquid 164 which may conveniently be provided at an appropriate acidic pH to provide the diluted sample 166 to the fluorescent staining 116 already adjusted to within an appropriate addle pH range for the fluorescently-stained fluid sample 120. In some implementations of the processing of FIG. 3 when the sample feed 103 is subjected to the sample adjustment 162, the aqueous stain dilution liquid 114 and the aqueous sample dilution liquid 164 may both be provided at the same or similar acidic pH, and in some implementations the aqueous stain dilution liquid 114 and the aqueous sample dilution liquid 164 may be the same or essentially the same aqueous composition at the same or essentially the same acidic pH for preparation of the fluorescently-stained fluid sample 120 at a pH in the desired acidic pH range.

With continued reference to FIG. 3, when the stained fluid sample 120 is prepared containing dissolved disaccharide, some or all of the disaccharide may be included in the aqueous stain dilution liquid 114 used in the second preparatory processing 110 and/or in the sample feed 103 and/or or the aqueous sample dilution liquid 164 to prepare the diluted sample 166.

Figure 4:
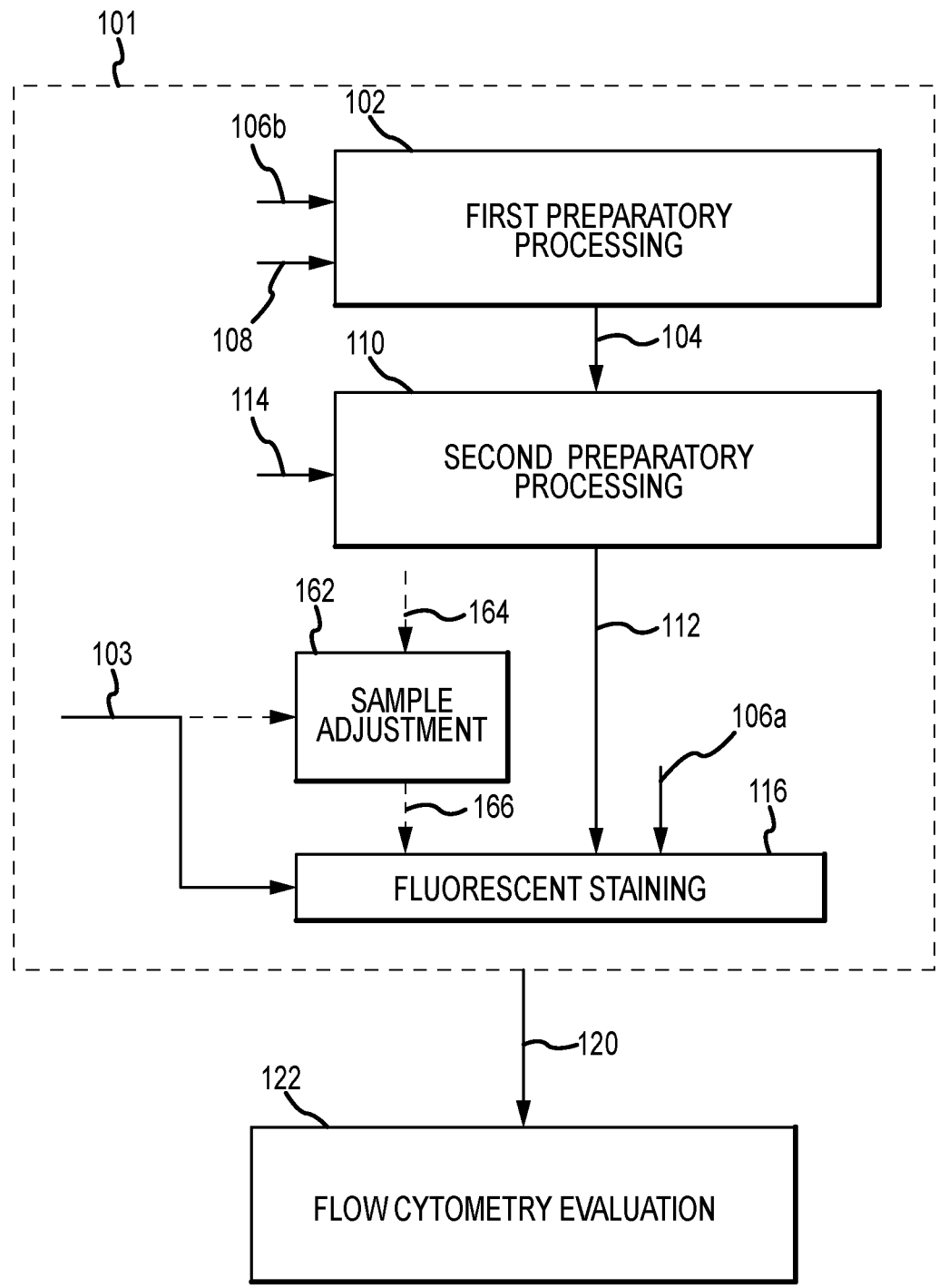
FIG. 4 illustrates another process diagram for another example embodiment example implementation of a method of the disclosure.

Reference is now made to FIG. 4 illustrating another example for processing within the fluid sample preparation 101 of the general processing scheme of FIG. 2, and including use of both a fluorescent stain feed 106a as described with reference to FIG. 2, for example in the form of a liquid stain composition, and a fluorescent stain feed 106b as described with reference to FIG. 3, for example in the form of a dry powder stain composition. The only difference illustrated in FIG. 4 relative to the processing of FIG. 3 is that in the processing of FIG. 4, the stain feed 106a is provided to the fluorescent staining 116 to provide one or more fluorescent stain components in addition to what is provided in the aqueous diluted stain formulation 112. Such a stain feed 106b as shown in FIG. 4 may be for example as described with respect to FIG. 3 and the stain feed 106a as shown in FIG. 4 may be for example as described with respect to FIG. 2. For example, the stain feed 106b provided to the first preparatory processing 102 may include one or more fluorogenic dyes in dry powder form and the other stain feed 106a provided to the fluorescent staining 116 may include one or more fluorescent antibody stains and/or one or more fluorogenic dyes in a liquid stain composition.

Figure 5:
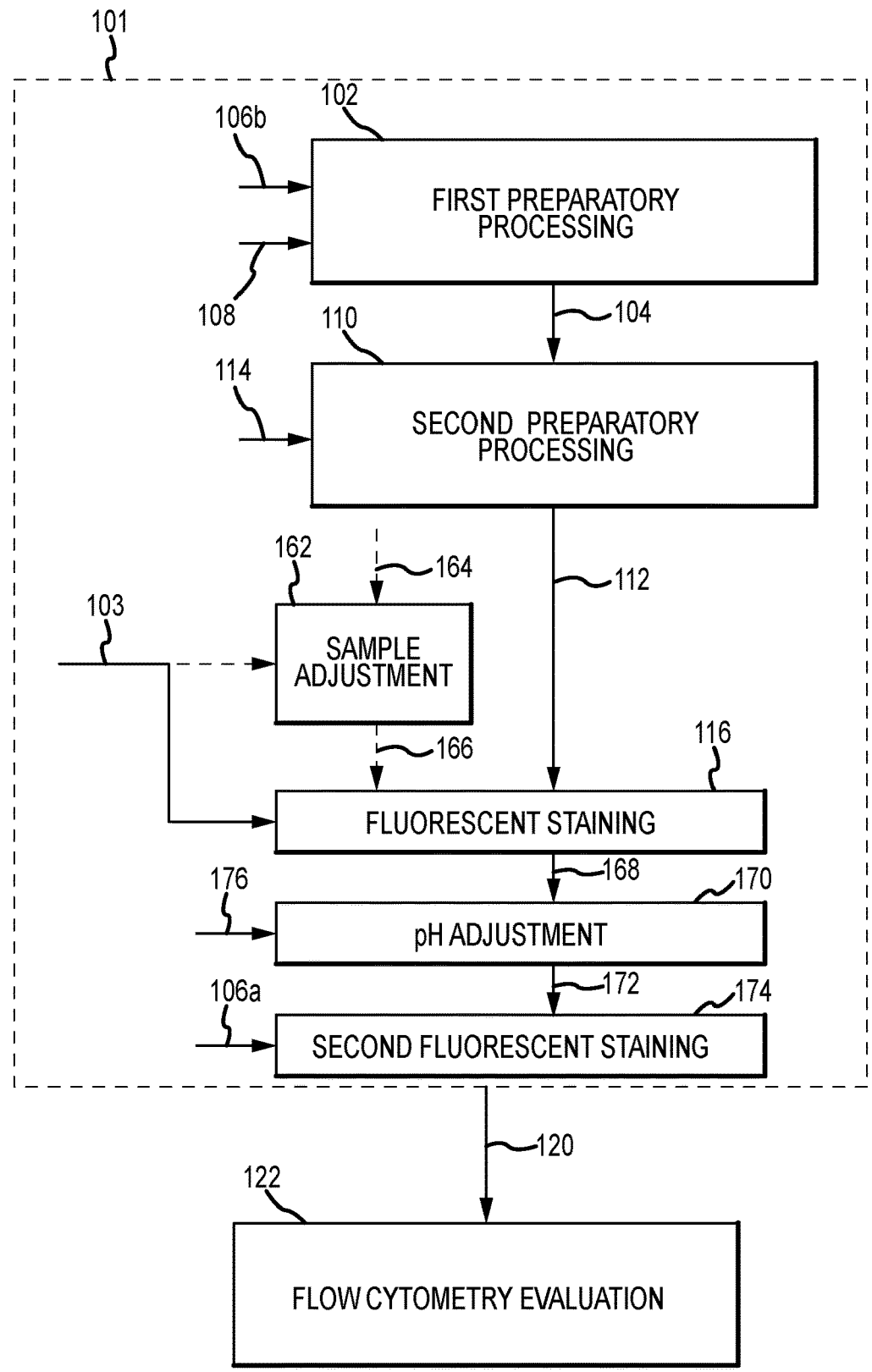
FIG. 5 illustrates another process diagram for another example embodiment an example implementation of a method of the disclosure.

Reference is now made to FIG. 5 illustrating yet another example for processing within the fluid sample preparation 101 of the general processing scheme of FIG. 2, and including both a fluorescent stain feed 106a as described with reference to FIG. 2, for example in the form of a liquid stain composition, and a fluorescent stain feed 106b as described with reference to FIG. 3, for example in the form of a dry powder stain composition. The only difference illustrated in FIG. 5 relative to the processing of FIG. 4 is that in the processing of FIG. 3, the fluorescent staining 116 is a first fluorescent staining and the processing includes second fluorescent staining 174 after the first fluorescent staining 116, and with an intermediate step of pH adjustment 170 between the first fluorescent staining 116 and the second fluorescent staining 174, and in the processing of FIG. 5 the fluorescent stain feed 106a is introduced into the second fluorescent staining 174. In the processing of FIG. 5, the first fluorescent staining 116 is performed within an acidic pH range to prepare a first stained fluid sample composition 168 at an acidic pH within the acidic pH range. During the pH adjustment 170, the pH of the first stained fluid sample composition 168 is raised to prepare a pH adjusted stained fluid sample composition 172 at a higher pH than the acidic pH of the first stained fluid sample composition 168. As illustrated in FIG. 5, an aqueous sample dilution liquid in the form of an aqueous pH adjustment liquid 176 is fed to the pH adjustment 170. The aqueous pH adjustment liquid 176 has a higher pH than the acidic pH of the first stained fluid sample composition 168 to raise the pH of the first stained fluid sample composition 168 to prepare the pH adjusted stained fluid sample composition 172. The aqueous pH adjustment liquid 176 may have a pH, and may be added to the first stained fluid sample composition 168 at a volume ratio, to provide a desired level of pH adjustment to prepare the pH adjusted stained fluid sample composition 172 at the desired higher pH. Such an aqueous pH adjustment liquid 176 may have a pH as described elsewhere for a second aqueous sample dilution liquid that may be provided in a kit according to a kit aspect of this disclosure. The pH adjusted stained fluid sample composition 172 is then processed in the second fluorescent staining 174 where biological material in the pH adjusted stained fluid sample composition 172 is stained with fluorescent antibody stain provided in the fluorescent stain feed 106a, to prepare a second stained fluid sample composition including both fluorescent antibody stain from the fluorescent stain feed 106a and fluorogenic dye from the fluorescent stain feed 106b. Such a second stained fluid sample composition may be used directly as the fluorescently-stained fluid sample 120 that is subjected to the flow cytometry 122, or the second stained fluid sample composition may be further processed to adjust properties to prepare the fluorescently-stained fluid sample 120 that is subjected to flow cytometry evaluation 122. The pH adjusted stained fluid sample composition 172 and the second stained fluid sample composition each has a higher pH than the first stained fluid sample composition 168. Each of the second stained fluid sample composition and the pH adjusted stained fluid sample composition 172 may each have a pH that is at least 0.5 pH unit, or more, larger than the acidic pH of the first stained fluid sample composition 168. The pH of the pH adjusted stained fluid sample composition 172 and the second stained fluid sample composition resulting from the second fluorescent staining 174 may be at the same pH, or may be at a different pH, for example as a consequence of pH changes occurring, during the second fluorescent staining 174. The second stained fluid sample composition and the fluorescently-stained fluid sample 120 may be at the same pH or each may have a different pH, for example as a consequence of further processing following the second fluorescent staining 174 to prepare the fluorescently-stained fluid sample 120 that is then subjected to the flow cytometry evaluation 122. Each of the pH adjusted stained fluid sample composition 172, the second stained fluid sample composition resulting from the second fluorescent staining 174 and/or the fluorescently-stained fluid sample 120 may be at a higher pH than the acidic pH of the first stained fluid sample composition 168, and such a higher pH may be any such higher pH as described previously. For example such a higher pH may be at least 0.5 PH unit larger, at least 1.0 pH unit larger, at least 1.5 pH units larger, at least 2.0 pH units larger or even at least 2.5 pH units larger than the acidic pH of the first stained fluid sample composition 168, and such a higher pH may be pH 5.5 or larger, pH 5.8 or larger, pH 6.0 or larger, pH 6.2 or larger, or pH 6.5 or larger. As described previously, in some embodiments such a higher pH may be larger than pH 6.5, may be at least pH 6.7, may be at least pH 6.9, or may be at least pH 7.0, although such a higher pH may often be not larger than pH 8.5, not larger than pH 8.0, not larger than pH 7.5 or not larger than pH 7.2.

As alternatives to the processing shown in any of FIGS. 3-5, the fluorescent stain feed 106*b* may be provided in the form of a liquid dye concentrate and may be added directly to the fluorescent staining 116, and without need for performing the first preparatory processing 102 or the second preparatory processing 110.

Consumable materials for use in the processing of any of FIGS. 1-5 may be provided in a kit, for example a kit as illustrated in any of FIGS. 8-11, discussed below. For example, a fluorescent stain feed 106, an aqueous sample dilution liquid 164, a reconstitution liquid medium 108, an aqueous stain dilution liquid diluent 114 and/or an aqueous pH adjustment liquid 176 may be provided in such a kit. When processing includes the use of both an aqueous stain dilution liquid 114 and an aqueous sample dilution liquid 164, the aqueous stain dilution liquid 114 and aqueous sample dilution liquid 164 may be provided in a kit in separate containers, or when the aqueous stain dilution liquid 114 and the aqueous sample dilution liquid 164 have the same composition, both may be provided in a single aqueous liquid formulation contained in a single container, and such a single aqueous liquid formulation may be used both as the aqueous stain dilution liquid 114 and the aqueous sample dilution liquid 164.

Figure 6:
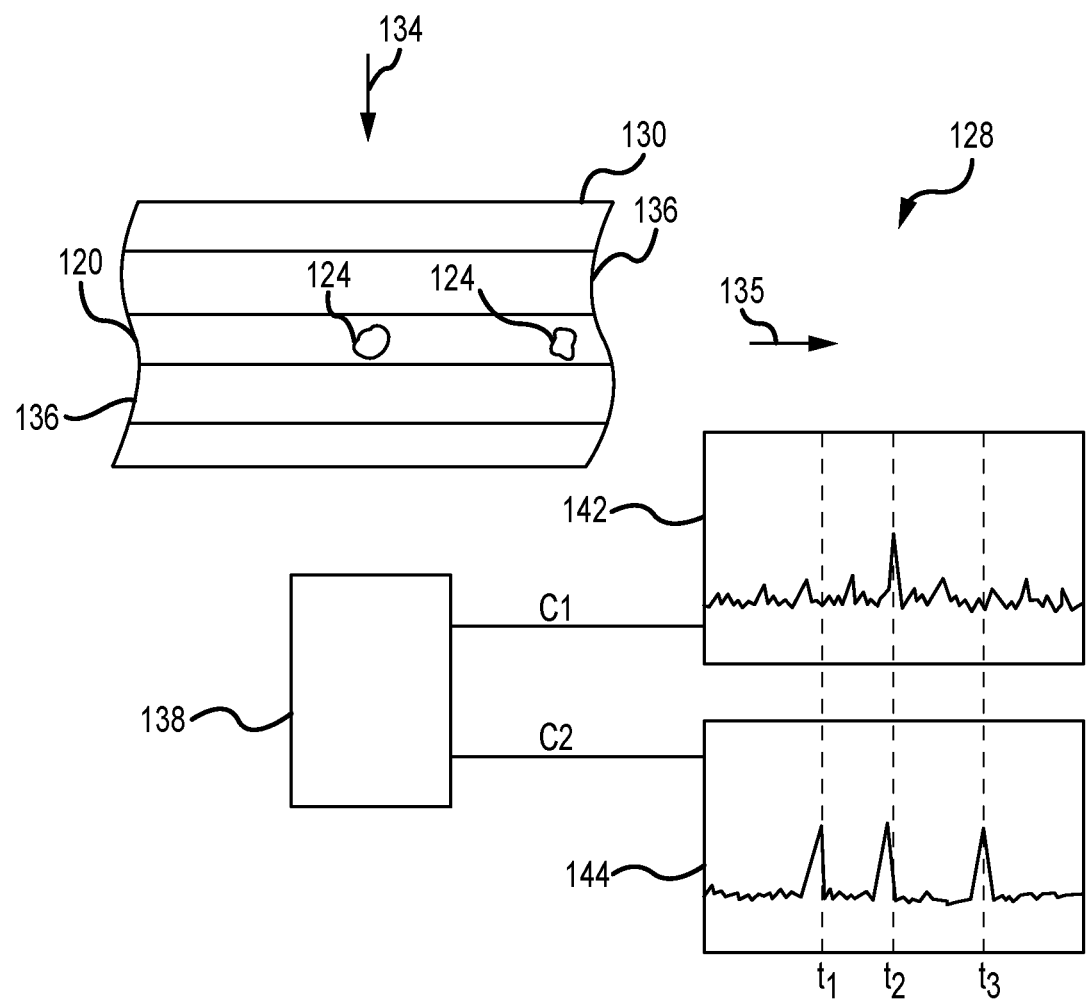
FIG. 6 illustrates an example embodiment of operation of a flow cytometer for performing a flow cytometry evaluation on a fluorescently-stained fluid sample as part of a method of this disclosure.

Reference is now made to FIG. 6, illustrating one example of flow cytometry processing, which may be used during the flow cytometry evaluation 122 of the fluorescently-stained fluid sample 120 according to any oldie processing examples illustrated in any of FIGS. 1-5. FIG. 6 shows partial componentry of a flow cytometer 128 including a flow cell 130 and a light detection and analysis system 138. As shown in FIG. 6, a flow of such a fluorescently-stained fluid sample 120 through and investigation zone of the flow cell 130 is subjected in the investigation zone to excitation radiation 134 from a light source (not shown) of the flow cytometer 128. Such a light source may be, for example, a laser, LED or other light source. As illustrated in FIG. 6, the fluorescently-stained fluid sample 120 includes virus-size particles 124 (e.g., unassociated non-enveloped viral particles), and the fluorescently-stained fluid sample 120 is shown as flowing through the flow cell 130 of the flow cytometer 128 in the direction of the flow arrow 135. In the example illustrated in FIG. 6, the fluorescently-stained fluid sample 120 has been hydrodynamically focused with a sheath fluid 136 prior to introduction into the flow cell 130. As illustrated in FIG. 6, the sheath fluid 136 is shown as a distinct fluid relative to the stained fluid sample 120. As may be appreciated, differentiation between such a sheath fluid 136 and fluorescently-stained fluid sample 120 may not be as distinct as illustrated in FIG. 6. The light detector analysis system 138 in FIG. 2 is illustrated to include two photodetectors for separately detecting radiation wavelength ranges associated with different fluorescent emission signatures of two different fluorescent stains that may be used to stain different features of target unassociated non-enveloped viral particles.

The illustrated example of FIG. 6 shows a first time series plot 142 with an example output (C1) of a first photodetector detecting for fluorescent emission response from presence of a first fluorescent stain on an unassociated virus-size particle 124 and a second time series plot 144 with an example output (C2) of a second photodetector detecting for a different fluorescent emission response from presence of a second fluorescent stain on such a virus-size particle 124, The time series plots 142 and 144 are illustrated as plots of voltage from the respective photodetector versus time, and with voltage peaks at t1, t2 and t3 indicating detection of such an unassociated virus-size particle 124 stained with a fluorescent stain. In this example a first fluorescent stain may be a fluorogenic dye for nonspecific nucleic acid staining and a second fluorescent stain may be a fluorogenic dye for nonspecific protein staining or alternatively the second fluorescent stain may be a fluorescent antibody stain for binding to an epitope of a viral capsid. In FIG. 6, the second time series plot 144 is illustrated with three voltage peaks at times t1, t2 and t3 indicative of passage through the flow cell of three virus-size particles 124 each labeled for example with such a second fluorescent stain. The first time series plot 142 is illustrated in FIG. 6 with a voltage peak at time t2 indicative of passage through the flow cell 130 of a vines-size particle 124 labeled for example with the first fluorescent stain.

In one example of the processing of FIG. 6 where the first fluorescent stain is a first fluorogenic dye for nonspecific staining of nucleic acid content and the second fluorescent stain is a second fluorogenic dye for nonspecific staining of protein content, the coincidence at time t2 of voltage peaks on both the first time series plot 142 and the second time series plot 144 indicates passage through the flow cell 130 of an unassociated virus-size particle 124 labeled with both the first fluorescent stain and the second fluorescent stain, such as in the case of an intact virus of a non-enveloped virus containing a non-enveloped viral capsid fluorescently labeled by the nonspecific protein stain and genome inside the capsid fluorescently labeled by the nonspecific nucleic acid stain. Conversely, in this example the occurrence of the voltage peaks at t1 and t3 on the second time series plot 144 with no corresponding coincidental occurrences of voltage peaks on the first time series plot 142 indicates passage through the flow cell 130 of virus-size particles 124 including fluorescently labeled, protein content and not including fluorescently labeled nucleic acid content, such as may be the case for a virus-size particle having a non-enveloped viral capsid but not containing genome inside the capsid, such as may be the case for virus-like particles or other particles containing protein content and not containing genome.

In another example where the first fluorescent stain is a fluorogenic dye for nonspecific staining of nucleic acid content and the second fluorescent stain is a fluorescent an stain for binding to epitope of the viral capsid, the coincidence at time t2 of a voltage peaks on both the first time series plot 142 and the second time series plot 144 indicates passage through the flow cell 130 of a virus-size particle 124 labeled with both the first fluorescent stain in the second fluorescent stain such as in the case of an intact virus of a non-enveloped virus containing a non-enveloped viral capsid with the epitope indicated by labeling with the fluorescent antibody stain and genome inside the capsid indicated by labeling with the nonspecific nucleic acid stain. Conversely the occurrence of the voltage peaks at t1 and t3 on the second time series plot 144 with no corresponding coincidental occurrences of voltage peaks on the first time series plot 142 indicates passage through the flow cell 130 of virus-size particles 124 including a non-enveloped viral capsid with the epitope but not containing genome inside the capsid, such as may be the Case for virus-like particles corresponding to a virus with which the epitope is associated.

Figure 7:
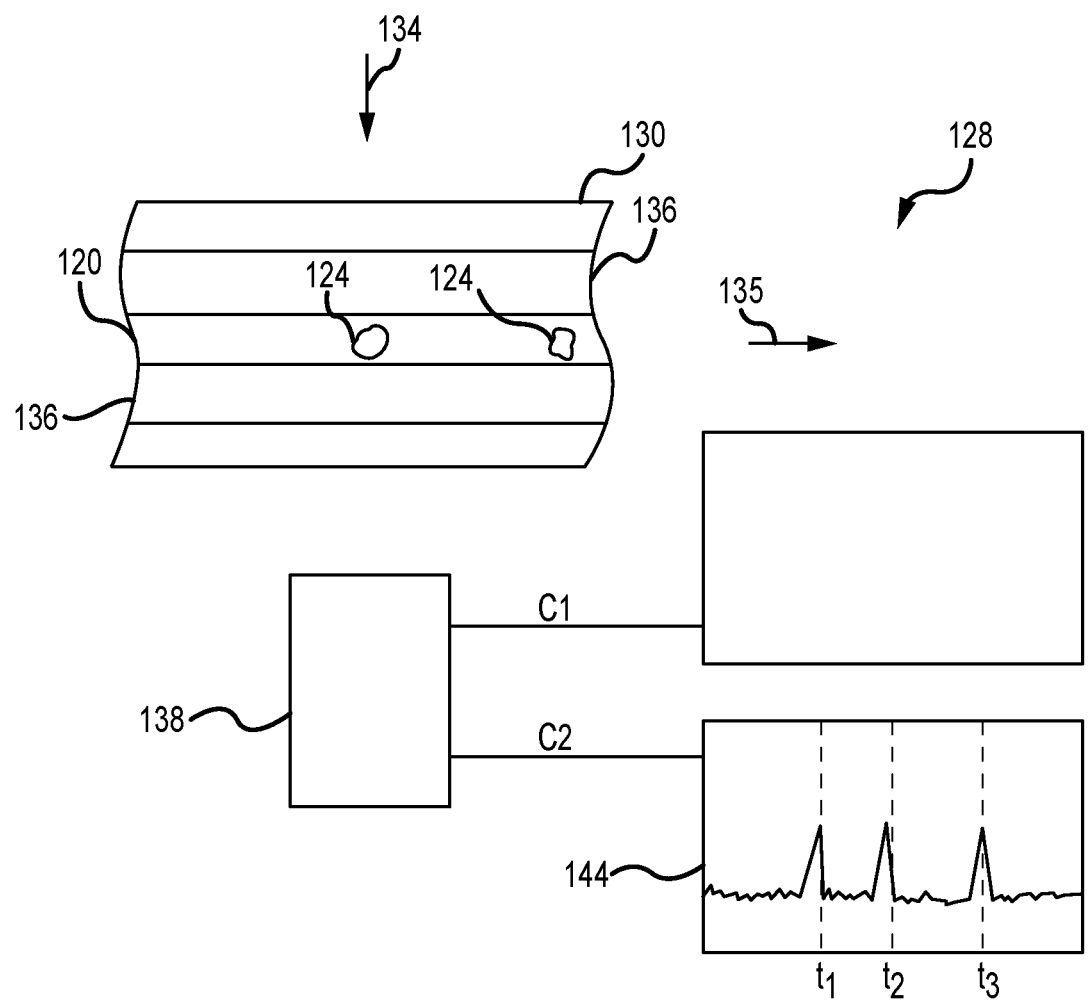
FIG. 7 illustrates another example embodiment of operation of a flow cytometer for performing a flow cytometry evaluation on a fluorescently-stained fluid sample as part of a method of this disclosure.

Reference is now made to FIG. 7 illustrating another example of flow cytometry processing which may be used during the flow cytometry evaluation 122 of the fluorescently-stained fluid sample 122 according to any of the processing embodiments illustrated in any of FIGS. 1-5, and using the same flow cytometer 128 illustrated in FIG. 6. In the example illustrated in FIG. 7, only the time series plot 144 is shown for the output C2 of the second photodetector and no time series plot is shown for the first photodetector of the light detection and analysis system 138, The example illustrated in FIG. 7 may be the case for example when the fluorescently-stained fluid sample 120 includes only a single fluorescent stain, the fluorescent emission signature of which is detected by the second photodetector. Such a single fluorescent stain may, for example, be a fluorescent antibody stain for binding with an epitope of a targeted non-enveloped viral capsid, in which case the voltage peaks at t1, t2 and t3 indicate passage through the flow cell of virus size particles 124 including such a non-enveloped viral capsid with the epitope, and without distinguishing whether or not any of the virus-size particles 124 includes genome inside the capsid. In the example illustrated in FIG. 7, the virus-size particles 124 associated with the voltage peaks at t2 and t3 may be associated with passage through the flow cell of intact virions or virus-like particles.

As illustrated in FIGS. 6 and 7, the light detector and analysis system 138 of the example flow cytometer 128 includes photodetectors for detecting fluorescent emission signatures from two fluorescent stains. However, as may be appreciated, in alternative embodiments the light detector analysis system 138 may include photodetectors for detecting fluorescent emission signatures for more than two different fluorescent stains. Also, although the flow cytometer 128 is illustrated in FIGS. 6 and 7 as including a single light source providing a single excitation radiation 134 for stimulation of multiple different fluorescent emission responses from different fluorescent stains, such a flow cytometer 128 may include multiple different light sources providing different portions of excitation radiation in different wavelength ranges where the fluorescent emission responses from different fluorescent stains are stimulated by different excitation radiation wavelength ranges. Moreover, although processing in FIGS. 6 and 7 is shown using a hydrodynamically focused fluorescently-stained fluid sample 120, such a fluorescently-stained fluid sample 120 may alternatively be processed through a flow cytometer in which samples are not hydrodynamically focused, although hydrodynamically focused systems are preferred with the present disclosure. In a preferred flow cytometry evaluation, a flow rate of the hydrodynamically focused fluorescently-stained fluid sample 120 through the flow cell 130 may be very low, preferably in a range having a lower limit of 300 nanoliters per minute, 600 nanoliters per minute or 800 nanoliters per minute and an upper limit of 6000 nanoliters per minute, 3000 nanoliters per minute or 2000 nanoliters per minute, with one preferred range being from 600 nanoliters per minute to 3000 nanoliters per minute and with one even more preferred range being from 600 nanoliters per minute to 2000 nanoliters per minute.

Figure 8:
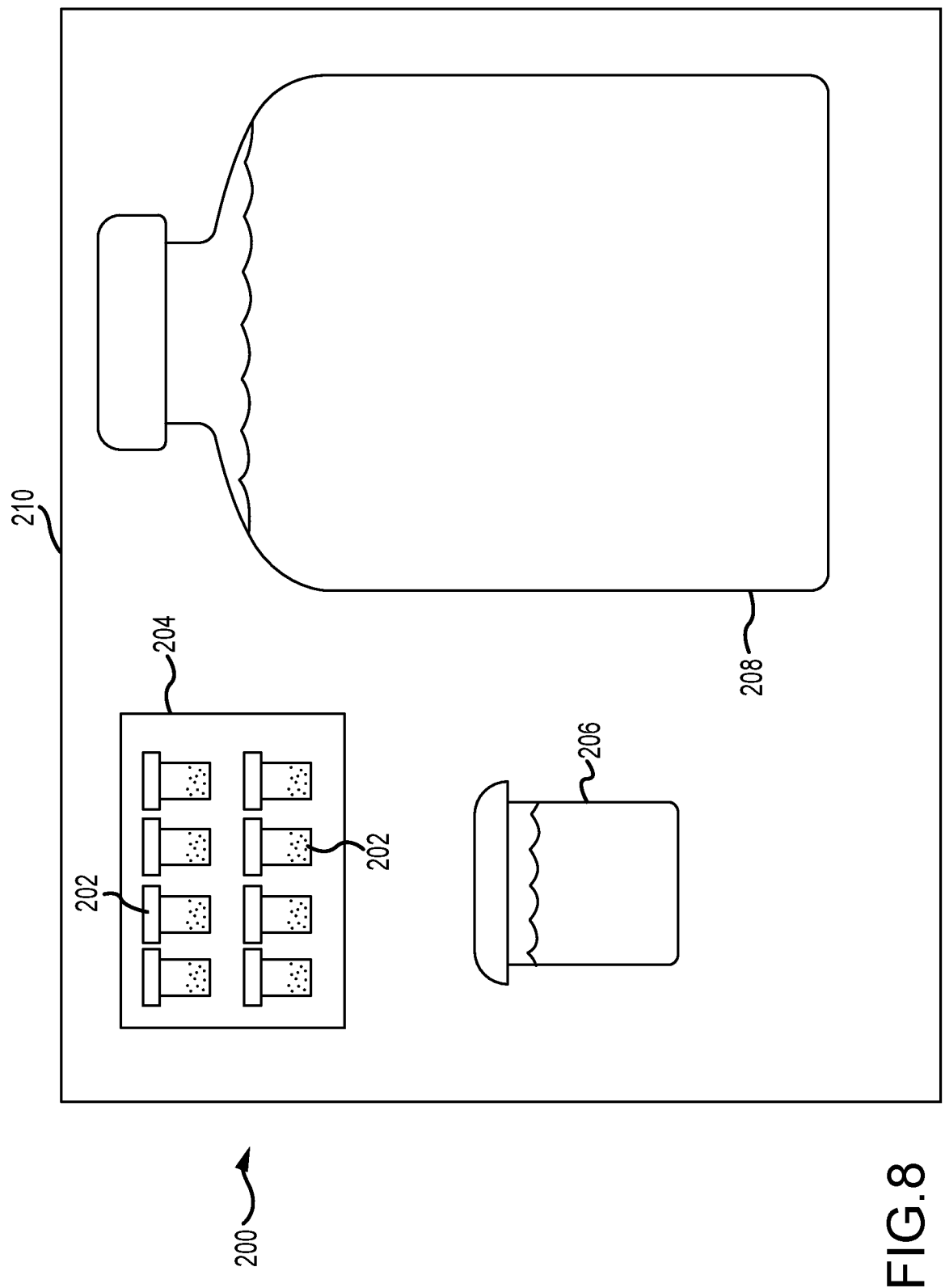
FIG. 8 illustrates an example embodiment of a kit of this disclosure for fluorescent staining unassociated non-enveloped viral particles for flow cytometry evaluation.

Reference is now made to FIGS. 8-11 illustrating some example embodiments of kits of the disclosure, With reference first to FIG. 8, an example kit 200 is illustrated including a plurality of first sealed containers in the form of dry powder stain composition containers 202 each containing a dry powder stain composition with a dry powder including, at least one, and in some preferred implementations including a mixture of a plurality of different fluorogenic dyes each having a different fluorescent emission signature. Each such fluorogenic dye may contain a least one aromatic group susceptible to pi stacking interactions in aqueous liquid media, Each dry powder stain composition container 202 may include a quantity of the dry powder stain composition to prepare an aqueous diluted dye formulation to be processed contemporaneously for flow cytometry evaluation, such as in the example processing illustrated in FIGS. 3-5. The dry powder stain composition and fluorogenic dyes in the dry powder stain composition may have any or any combination of features as described elsewhere herein. As shown in FIG. 8, the plurality of dry powder stain composition containers 202 within the kit 200 are for convenience of manufacture and packaging contained, within a bag 204, which is preferably opaque. The kit 200 includes a second sealed container in the form of a dilution liquid container 208 including aqueous dilution liquid at a pH within an acidic pH range, such as described elsewhere herein, for use to adjust pH to prepare a fluorescently-stained fluid sample at a suitable acidic pH within an acidic pH range, for example as disclosed elsewhere herein. Such aqueous dilution liquid may be used, for example, as the aqueous sample dilution liquid 164 in the processing illustrated in any of FIGS. 2-5 and/or the aqueous stain dilution liquid 114 in the processing illustrated in any of FIGS. 2-5. The example kit 200 illustrated in FIG. 8 also includes a third sealed container in the form of a reconstitution liquid container 206 containing a reconstitution liquid medium, for example for use as the reconstitution liquid medium 108 in the second preparatory processing 110 in the processing illustrated in FIGS. 3-5.

Figure 9:
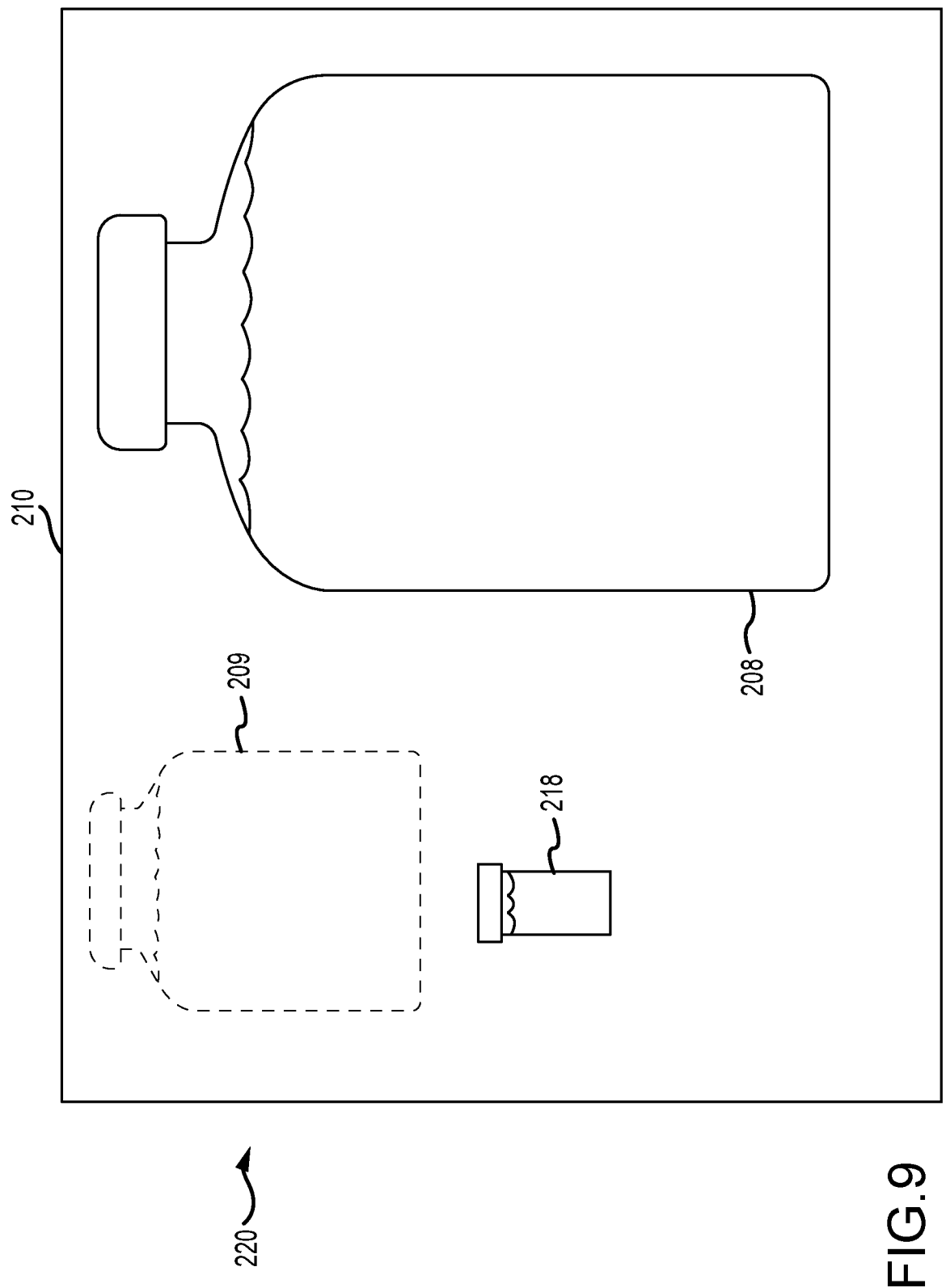
FIG. 9 illustrates another example embodiment of a kit of this disclosure for fluorescent staining unassociated non-enveloped viral particles for flow cytometry evaluation.
Figure 10:
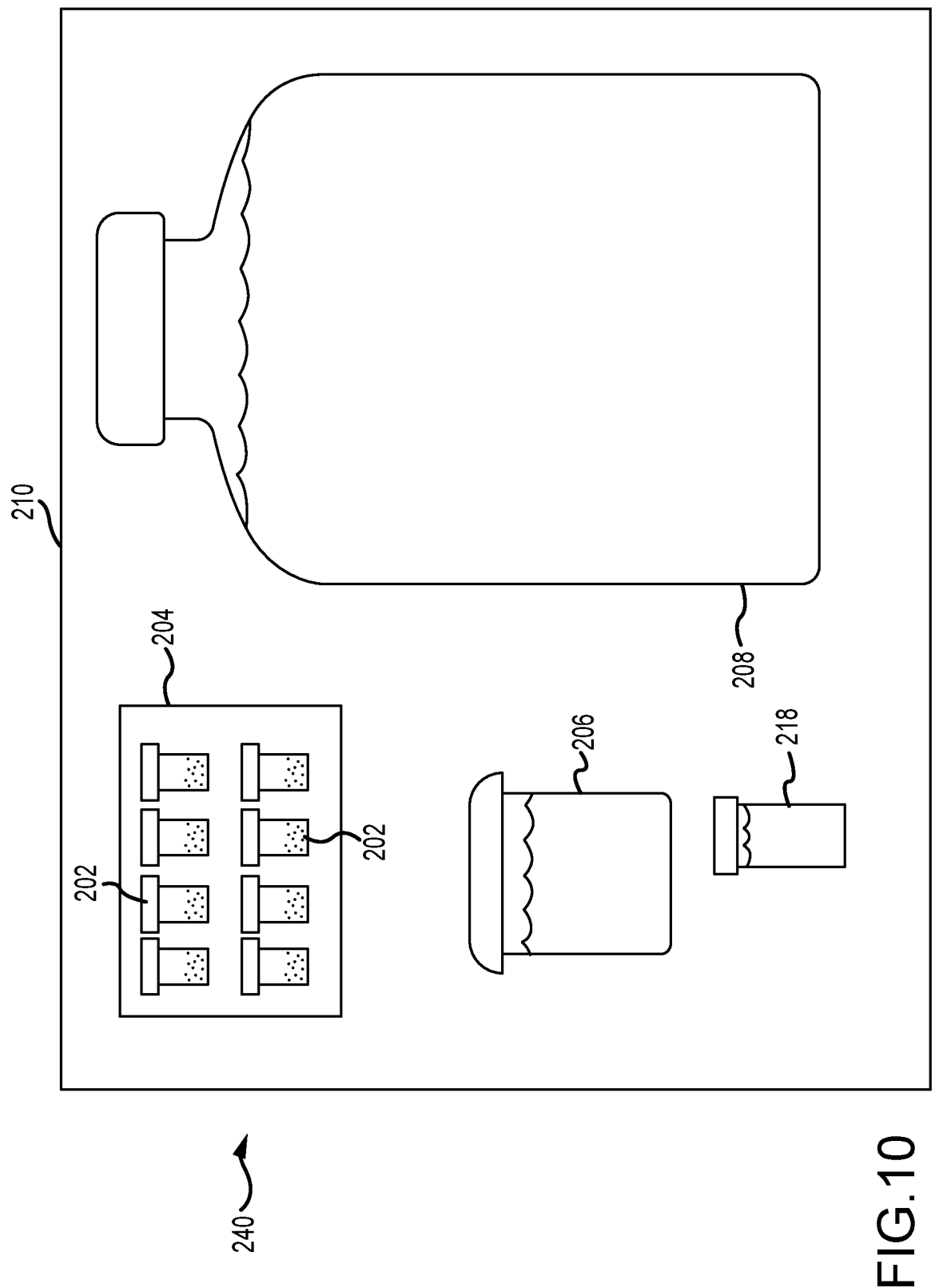
FIG. 10 illustrates another example embodiment of a kit of this disclosure for fluoresce staining unassociated non-enveloped viral particles for flow cytometry evaluation.

Reference is now made to FIG. 9, which illustrates another example kit 220 including a first sealed container in the form of a liquid stain composition container 218 containing a liquid stain composition. In one variation, the liquid stain composition may include at least one, and optionally a plurality of, fluorescent antibody stains. As another option, the liquid stain composition in the container 218 may include a fluorescent antibody stain and a fluorogenic dye, such as for nonspecific staining of nucleic acid content. As yet another option, the liquid stain composition in the container 218 may be a liquid dye concentrate comprising a plurality of different fluorogenic dyes (e.g., the first fluorogenic dye for non-specific nucleic acid staining and the second fluorogenic dye for non-specific protein stain) in a liquid medium, with each of the different fluorogenic dyes having a different fluorescent emission signature for detection when bound to an unassociated non-enveloped viral particle, and wherein the liquid dye concentrate comprises at least one member selected from the group consisting of (i) the liquid medium of the liquid dye concentrate comprising a liquid mixture including water and liquid phase organic material, and preferably the liquid medium is aqueous, and more preferably the liquid medium comprises more than 50 percent by moles of water; iii) disaccharide dissolved in the liquid medium of the liquid dye concentrate; and (iii) a combination including both (i) and (ii). The kit 220 includes a second sealed container in the form of the dilution liquid container 208 including aqueous dilution liquid at a pH within an acidic pH range, such as described with respect to FIG. 8, for use to adjust pH to prepare a fluorescently-stained fluid sample at a suitable acidic pH within an acidic pH range for flow cytometry evaluation. Such an aqueous dilution liquid may be used, for example, as the aqueous sample dilution liquid 164 in the processing illustrated in any of FIGS. 2-5, and/or as the aqueous stain dilution liquid 114 in the processing illustrated in any of FIGS. 3-5. As shown in FIG. 9, the kit 220 optionally includes another sealed container 209, illustrated in dashed lines indicating an optional feature. The other sealed container 209 may include a second aqueous dilution liquid at a different pH than the acidic range of the aqueous dilution liquid in the dilution liquid container 208, and preferably the second aqueous dilution liquid is at a higher pH than the acidic pH range. The second aqueous dilution liquid may, for example, be used as an aqueous pH adjustment liquid to dilute and increase the pH of a preliminary stained fluid sample including biological material following a first fluorescent staining, step at an acidic pH and prior to a second fluorescent staining step of a higher pH. Alternatively, the second aqueous dilution liquid may be an aqueous sample dilution liquid initially used to prepare diluted fluid sample of a higher pH, for example in a dilution series, which may be adjusted to an acidic pH for fluorescent staining at an acidic pH using the aqueous dilution liquid in the dilution liquid container 208. Reference is now made to FIG. 10, which illustrates another example kit 240 including both the dry powder stain composition containers 202 each containing a dry powder stain composition, such as described with respect to FIG. 8, and the liquid stain composition container 218 including a liquid stain composition, such as described with respect to FIG. 9. The kit 240 also includes the reconstitution liquid container 206 containing a reconstitution liquid medium, such as described with respect to FIG. 8. The kit 240 further includes a second sealed container in the form of the aqueous dilution liquid container 208 that contains aqueous dilution liquid at a pH within an acidic pH range, such as described with respect to FIGS. 8 and 9, such as may be used as an aqueous sample dilution liquid and/or an aqueous stain dilution liquid, for example as the aqueous sample dilution liquid 164 in the processing illustrated in any of FIGS. 2-5 and/or as the aqueous stain dilution liquid 114 in the processing illustrated in any of FIGS. 3-5. As an alternative kit embodiment to any of example kits 200, 220, or 240 shown in FIGS. 8-10, any such kit may include multiple ones of the dilution liquid container 208 with one such dilution liquid container 208 containing an aqueous stain dilution liquid and another such dilution liquid container 208 containing an aqueous sample dilution liquid, such as when aqueous dilution liquid for use to dilute a dry powder stain composition is of a different composition than aqueous dilution liquid for use to dilute a sample directly without also fluorescent staining the sample. In such an alternative kit embodiment, such an aqueous stain dilution liquid may or may not have a pH in an acidic pH range.

Figure 11:
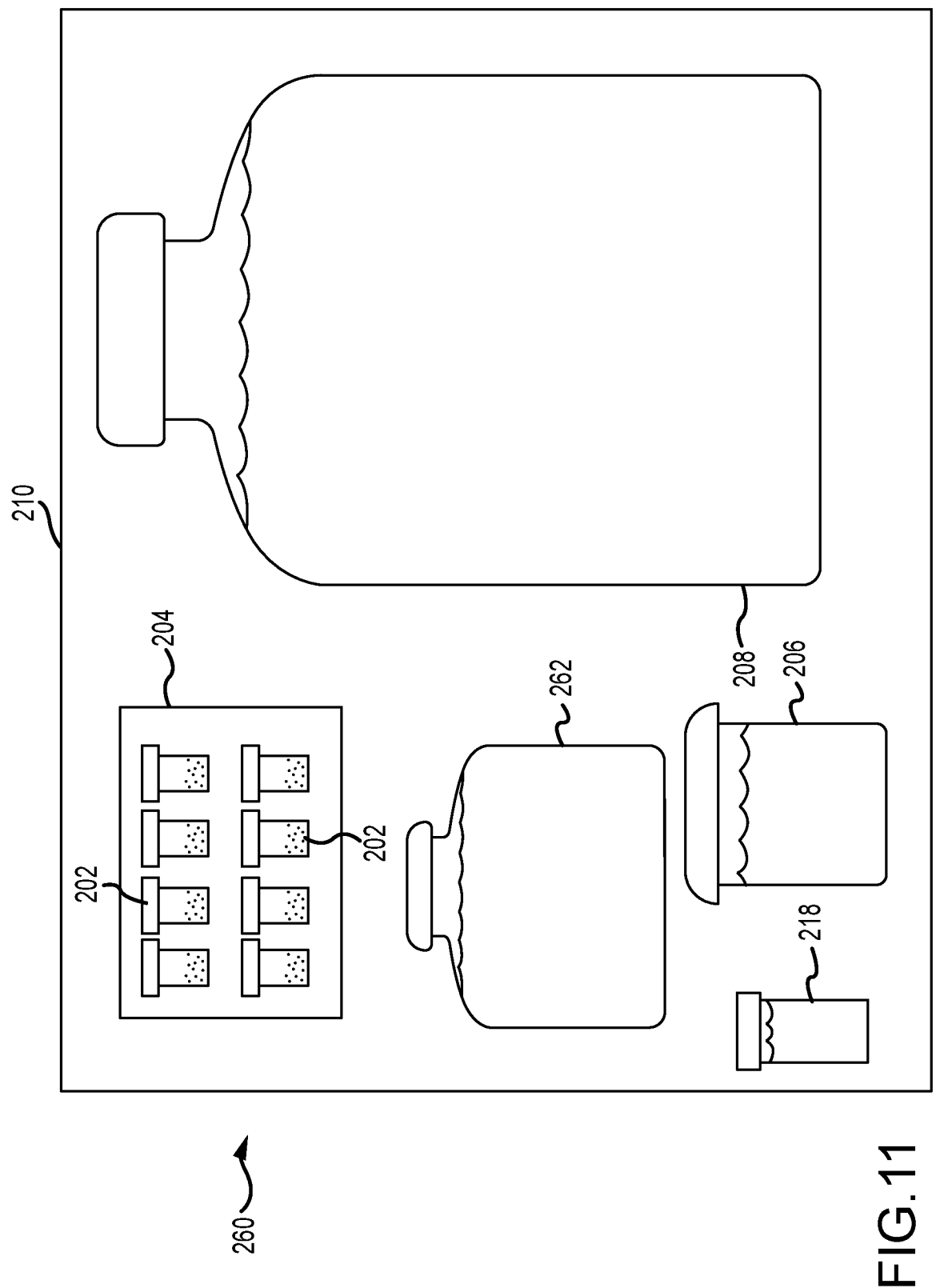
FIG. 11 illustrates another example embodiment of a kit of tins disclosure for fluorescent staining unassociated non-enveloped viral particles for flow cytometry evaluation.

Reference is now made to FIG. 11, which illustrates another example kit 260 including all of the components of the kit 240 of FIG. 10, and also including another sealed container to the form of a second aqueous dilution liquid container 262 that contains a second aqueous dilution liquid that has a higher pH than an acidic pH of the aqueous sample dilution liquid contained in the aqueous dilution liquid container 208. The second aqueous sample dilution liquid may, for example, be used as an aqueous pH adjustment liquid to dilute and increase the pH of a preliminary stained fluid sample including biological material following a first fluorescent staining step and prior to a second fluorescent staining step. The second aqueous dilution liquid may for example be used as the aqueous pH adjustment liquid 176 in the processing illustrated in FIG. 5 and/or as the aqueous stain dilution liquid 114 in the processing illustrated in any of FIGS. 2-5.

The kits 200, 220, 240 and 260 illustrated in FIGS. 8-11 each includes the components of the kit within a common packaging enclosure 210, for example a common packaging box or bag. In alternative implementations, the any such kit may include within the coalition packaging enclosure one or more components in addition to those illustrated in FIGS. 8-11. For example, when the stained fluid sample to be prepared by any such kit 200, 220, 240 or 260 is to include dissolved disaccharide, some or all of such disaccharide may be included in the aqueous dilution liquid in a dilution liquid container 208 and/or a in a second aqueous dilution liquid container 262 and/or in the liquid stain composition in the container 118 and/or in the second aqueous liquid in the other sealed container 209.

EXAMPLES

Equipment and Reagents; The following representative equipment and reagents were used in the examples presented below:

VC3100: Virus Counter® 3100 flow cytometer (Sartorius Stedim), operated generally in accordance with the manufacturer's Operation Manual.

Combo Dye® concentrate: A dry powder dye composition (Sartorius Stedim product no. VIR-92101), with a dry powder mixture of a first fluorogenic dye of POPO™-3 iodide (Thermo Fischer Scientific) for nucleic acid stamina and a second fluorogenic dye of SYPRO™ Red (Thermo Fischer Scientific) for protein staining.

Organic liquid medium: Acetonitrile or DMSO, for use in preparing stain formulations from Combo Dye® Concentrate.

POPO™-3 formulation: A liquid formulation product with fluorogenic dye POPO™-3 iodide at 1 mM concentration in dimethyl formamide (DMF) (Thermo Fischer Scientific Catalog NO. P3584).

Sample dilution buffer (SBD): Buffer solution used to prepare diluted fluid samples prior to staining. Representative Sample Dilution Buffer compositions used in the examples are summarized below:

PBS-7.4: A representative phosphate-based buffer solution (generally corresponding to Sartorius Stedim product no. VIR-92298), with 100 mM sodium chloride and either 0.05 or 0.09% (w/v) sodium azide, at approximately pH 7.4, was generally prepared as follows: Start with 18 MΩ water at a volume of 90% of final desired volume, add calculated amounts of sodium phosphate dibasic, sodium phosphate monobasic dihydrate, and sodium chloride and by stirring, then add 5% sodium azide solution to provide the final desired concentration of sodium azide in the final composition, then correct pH using hydrochloric acid or sodium hydroxide as needed, then bring then add additional 18 MΩ water to bring to final volume, Phosphates are added in an amount to provide 20 mM concentration relative to final composition volume.

PBS-8.2: A representative phosphate-based buffer solution with 100 mM sodium chloride and 0.09% (w/v) sodium azide, at approximately pH 8.2, was generally prepared as follows: Start with 18 MΩ water at a volume, of 90% of final desired volume, add 1.0 calculated amounts of sodium phosphate dibasic, sodium phosphate monobasic dihydrate, and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. Phosphates are added in an amount to provide 20 mM concentration relative to final composition volume. An alternative representative phosphate-based buffer solution with 100 mM sodium chloride and 0.05 (w/v) sodium azide, at approximately pH 8.2, was generally prepared as follows: Start with 18 MΩ water at a volume of 70% of final desired volume, add calculated amounts of 0.2 M sodium monophosphate and 0.2 sodium diphosphate to a final concentration of 20 mM total phosphate; add 1 M sodium chloride solution to provide 100 mM NaCl final concentration; then add 5% sodium azide solution to provide 0.05% (w/v) sodium azide in the final composition; then add hydroxide as needed, and then add additional 18 MΩ water to bring to final volume.

PBS-7.8: A representative phosphate-based buffer solution with 100 mM sodium chloride and 0.09% (w/v) sodium azide, at approximately 7.8, was generally prepared as follows: Start with 1.8 MΩ water at a volume of 90% of final desired volume, add calculated amounts of sodium phosphate dibasic, sodium phosphate monobasic dihydrate, and sodium chloride and dissolve by stirring, then add 5% sodium azide solution to provide 0.09% (w/v) sodium nude in the final composition, then correct pH using hydrochloric acid or sodium hydroxide as needed, then bring then add additional 18 MΩ water to bring to final volume. Phosphates are added in an amount to provide 20 mM concentration relative to final composition volume.

PBS-7.0: A representative phosphate-based buffer solution with 100 mM sodium chloride and 0.09% (w/v) sodium azide, at approximately pH 7.0, was generally prepared as follows: Start with 18 MΩ water at a volume of 90% of final desired volume, add calculated amounts of sodium phosphate dibasic, sodium phosphate monobasic dihydrate, and sodium chloride and dissolve by stirring, then add 5% sodium azide solution to provide 0.09% (w/v) sodium azide in the final composition, then correct pH using hydrochloric acid or sodium hydroxide as needed, then bring, then add additional 18 MΩ water to bring to final volume. Phosphates are added in an amount to provide 20 mM concentration relative to final composition volume. An alternative representative phosphate-based buffer solution with 100 mM sodium chloride and 0.05 (w/v) sodium azide, at approximately pH 8.2, was generally prepared as follows: Start with 18 MΩ water at a volume of 70% of final desired volume, add calculated amounts of 0.2 M sodium monophosphate and 0.2 sodium diphosphate to a final concentration of 20 mM total phosphate; add 1 M sodium chloride solution to provide 100 mM NaCl final concentration; then add 5% sodium azide solution to provide 0.05% (w/v) sodium azide in the final composition; then add hydroxide as needed; and then add additional 18 MΩ water to bring to final volume.

PBS-6.6: A representative phosphate-based buffer solution with 100 mM sodium chloride and 0.09% (w/v) sodium azide, at approximately pH 6.6, was generally prepared as follows: Start with 18 MΩ water at a volume of 90% of final desired volume, add calculated amounts of sodium phosphate dibasic, sodium phosphate monobasic dihydrate, and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. Phosphates are added in an amount to provide 20 mM concentration relative to final composition volume. An alternative representative phosphate-based buffer solution with 100 mM sodium chloride and 0.05% (w/v) sodium azide, at approximately pH 8.2, was generally prepared as follows: Start with 18 MΩ water at a volume of 70% of final desired volume, add calculated amounts 0.2 M sodium monophosphate and 0.2 sodium diphosphate to a final concentration of 20 mM total phosphate; add 1 M sodium chloride solution to provide 100 mM NaCl final concentration; then add 5% sodium azide solution to provide 0.05% (w/v) sodium azide in the final composition; then add hydroxide as needed; then add additional 18 MΩ water to bring to final volume.

PBS-6.2: A representative phosphate-based buffer solution, with sodium phosphate dibasic and sodium phosphate monobasic dihydrate, at approximately pH 6.2, was generally prepared as follows: Start with 18 MΩ water at a volume of 90% of final desired volume, add calculated amounts of sodium phosphate dibasic, sodium phosphate monobasic dihydrate, and sodium chloride and dissolve b stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. Phosphates are added in an amount to provide 20 mM concentration relative to final composition volume. An alternative representative phosphate-based buffer solution with 100 mM sodium chloride and 0.05% (w/v) sodium azide, at approximately pH 8.2, was generally prepared as follows: Start with 18 MΩ water at a volume of 70% of final desired volume, add calculated amounts of 0.2 M sodium monophosphate and 0.2 sodium diphosphate to a final concentration of 20 mM total phosphate; add 1 M sodium chloride solution to provide 100 mM NaCl final concentration; then add 5% sodium azide solution to provide 0.05% (w/v) sodium azide in the final composition; then add hydroxide as needed; and then add additional 18 MΩ water to bring to final volume.

PBS-6.0: A representative phosphate-based buffer solution with 100 mM sodium chloride and 0.05% (w/v) sodium azide, at approximately pH 8.2, was generally prepared as follows: Start with 18 MΩ water at a volume of 70% of final desired volume, add calculated amounts of 0.2 M sodium monophosphate and 0.2 sodium diphosphate to a final concentration of 20 mM total phosphate. Add 1 M sodium chloride solution to provide 100 mM NaCl final concentration. Then add 5% sodium azide solution to provide 0.05% (w/v) sodium azide in the final composition, then add hydroxide as needed, and then add additional 1.8 MΩ water to bring to final volume.

PBS-5.8: A representative phosphate-based buffer solution with 100 mM sodium chloride and 0.05 (w/v) sodium azide, at approximately pH 8.2, was generally prepared as follows: Start with 18 MΩ water at a volume of 70% of final desired volume, add calculated amounts of 0.2 M sodium monophosphate and 0.2 sodium diphosphate to a final concentration of 20 mM total phosphate. Add 1 M sodium chloride solution to provide 100 mM NaCl final concentration. Then add 5% sodium azide solution to provide 0.05% (w/v) sodium azide in the final composition, then add hydroxide as needed, and then add additional 18 MΩ water to bring to final volume.

EPPS-8.0: A representative buffer solution based on 4-(2-Hydroxyethyl)-1-piperazinepropanesulfonic acid (EPPS) buffering system, with 100 mM sodium chloride and 0.09% (w/v) sodium azide, at approximately pH 8.0, was generally prepared as follows: Start with 18 MΩ water at a volume of 90% of final desired volume, add calculated as counts of EPPS and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. EPPS is added in an amount to provide 20 mM concentration relative to final composition volume.

HEPES-7.5: A representative butter solution based on [N-(2-Hydroxyethyl)piperazine-N'-(2-ethanesulfonic acid)] (HEPES) buffering system, with 100 mM sodium chloride and 0.09% (w/v) sodium azide, at approximately pH 7.5, was generally prepared as follows: Start with 18 MΩ water at a volume of 90% of final desired volume, add calculated amounts of HEPES and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. HEPES is added in an amount to provide 20 mM concentration relative to final composition volume.

MOPS-7.0: A representative MOPS (3-(N-morpholino) propanesulfonic acid)-based buffer solution, with 100 mM sodium chloride and 0.09% (w/v) sodium azide, at approximately pH 7.0, was generally prepared as follows: Start with 18 MΩ water at a volume of 90% of final desired volume, add calculated amounts of MOPS and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. MOPS is added in an amount to provide 20 mM concentration relative to final composition volume.

ACES-6.5: A representative buffer solution based on N-(2-Acetamido)-2-aminoethanesulfonic acid (ACES) buffering system, with 100 mM sodium chloride and 0.09% (w/v) sodium azide, at approximately PH 6.5, was generally prepared as follows: Start with 18 MΩ water at a volume of 90% of final desired volume, add calculated amounts of ACES and sodium chloride and dissolve by stirring, then add 5% sodium azide solution to provide 0.09% (w/v) sodium azide in the final composition, then correct pH using hydrochloric, acid or sodium hydroxide as needed, then add additional 18 MΩ water to bring to final volume. ACES is added in an amount to provide 20 mM concentration relative to final composition volume.

MES-6.0: A representative buffer solution based on 2-(N-morpholino)ethanesulfonic acid (MES) buffering system, with 100 MΩ sodium chloride and 0.09% (w/v) sodium azide, at approximately pH 6.0, was generally prepared as follows: Start with 18 MΩ water at a volume of 90% of final desired volume, add calculated amounts of MES and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. MES is added in an amount to provide 50 mM relative to final composition volume.

MES-5.5: A representative buffer solution based on 2-(N-morpholino)ethanesulfonic acid (MES) buffering system, with 100 mM sodium chloride and 0.09% (w/v) sodium azide, at approximately pH 5.5, was generally prepared as follows: Start with 18 MΩ water at a volume of 90% of final desired volume, add calculated amounts of MES and sodium chloride and dissolve by stirring, then add 5% sodium azide solution to provide 0.09% (w/v) sodium azide in the final composition, then correct pH using, hydrochloric acid or sodium hydroxide as needed, then bring then add additional 18 MΩ water to bring to final volume. MES is added in an amount to provide 50 mM relative to final composition volume. Alternative representative MES-based buffer solutions at about pH 5.5 were also prepared and tested using different concentrations of sodium chloride or different concentration of MES to test for salt and buffering agent concentration sensitivity, as noted in some of the examples below.

ACT-5: A representative acetate-based buffer solution, with 100 mM sodium chloride and 0.09% (w/v) sodium azide, at approximately pH 5.0, was generally prepared as follows: Start with 18 MΩ water at a volume of 90% of final desired volume, add calculated amounts of acetic acid and sodium acetate and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. Acetate is added in an amount to provide 50 mM relative to final composition volume.

ACT-4: A representative acetate-based buffer solution, with 100 mM sodium chloride and 0.09% (w/v) sodium azide, at approximately pH 4.0, was generally prepared as follows: Start with 18 MΩ water at a volume of 90% of final desired volume, add calculated amounts of acetic acid and sodium acetate and sodium chloride and dissolve by stirring, then add 5% sodium azide solution to provide 0.09% (w/v) sodium azide an the final composition, then correct pH using hydrochloric acid or sodium hydroxide as needed, add additional 18 MΩ water to bring to final volume. Acetate is added in an amount to provide 50 mM relative to final composition volume.

CIT-3: A representative citrate buffer solution, with 100 mM sodium chloride and 0.09% (w/v) sodium azide, at approximately pH 3.0, was generally prepared as follows: Start with 18 MΩ water at a volume of 90% of final desired volume, add calculated amounts of citric acid, sodium citrate, and sodium chloride and dissolve by stirring, then add 5% sodium azide solution to provide 0.09% (w/v) sodium azide in the final composition, then correct pH using hydrochloric acid or sodium hydroxide as needed, then bring then add additional 18 MΩ water to bring to final volume. Acetate is added in an amount to provide 50 mM relative to final composition volume.

Combo Dye® buffer: Generally, a sodium phosphate buffer solution (Sartorius Stedim product no. VIR-92305), with 100 mM sodium chloride, 0.05% (w/v) sodium azide and Tris-EDTA, at approximately pH 7.4, used in preparing stain formulations from Combo Dye® concentrate; and generally prepared as follows: Combine PBS-7.4 and 100× TE buffer (Sigma T9285) at a volume ratio of 100:1 of PBS-7.4 to 100× TE.

Antibody stain reagent: Fluorescent antibody stain concentrate formulation having an antibody for binding with epitope of a targeted non-enveloped viral capsid and including a fluorescent label for operation with the Virus Counter® 3100 Flow Cytometer. The ViroTag™ affinity reagents are formulated to be added in 5 microliter aliquots to unstained fluid samples of 195 microliters to prepare stained fluid samples of 200 microliters for flow cytometry evaluation. The following ViroTag™ Affinity Reagents are used in various examples presented below:

ADVX: For evaluation of Adenovirus serotypes 2 through 6, and including 3H8 monoclonal antibody (Hytest) labeled with fluorophore CF532 (Biotium), formulated to provide a total concentration of antibody stain in the stained fluid sample of about micrograms per milliliter, EV 71: For evaluation of Enterovirus 71, and including 11GH5H monoclonal antibody (Quidel) labeled with fluorophore CF532 (Biotium), formulated to provide a total concentration of antibody stain in the stained fluid sample of about 2.5 micrograms per milliliter.

AAV2/3: For evaluation of Adeno-associated virus serotypes 2 and 3, and including, A20 monoclonal antibody (Progen) labeled with fluorophore CF532 (Biotium), formulated to provide a total concentration of antibody stain in the stained fluid sample of about 0.5 micrograms per milliliter.

AAV8/9: For evaluation of Adeno associated virus serotypes 8 and 9, and including Adk8/9 monoclonal antibody (Progen) labeled with fluorophore CF532 (Biotium), formulated to provide a total concentration of antibody stain in the stained fluid sample of about 0.5 micrograms per milliliter.

Test Procedures:

For tests using fluorescent antibody stains, a representative test protocol was generally as follows. Unstained fluid samples of 195 microliters in volume for one dilution factor or a series with multiple dilution factors were prepared containing virions non-enveloped virus for evaluation and at dilution factors and desired pit for testing using the sample dilution buffers. To the unstained fluid sample was added 5 microliters of a ViroTag™ affinity reagent for fluorescent staining the viral capsid of the non-enveloped virions and to prepare a stained fluid sample of 200 microliters in volume, which was then subjected to flow cytometry evaluation using the VC3100 flow cytometer. After staining, samples were allowed to sit for an incubation time of about 30 minutes while protected from light before being subjected to flow cytometry.

For tests using nonspecific fluorogenic dyes for nucleic acid and protein content using Combo Dye® concentrate, a representative test protocol was generally as follows. Unstained fluid samples of 100 microliters in volume were prepared containing virions of non-enveloped virus for evaluation and at dilution factors and desired pH for testing using the sample dilution buffers. To the unstained fluid sample was added 50 microliters of pre-prepared aqueous dye formulation including the fluorogenic dyes was added for fluorescent staining and to prepare a stained fluid sample of 150 microliter in volume, which was then subjected to flow cytometry evaluation using the VC3100 flow cytometer. A representative procedure for preparing the aqueous dye formulation was generally as follows: To a vial containing 2.8 micrograms of the dry powder Combo Dye® concentrate was added 5 microliters of the organic liquid medium. The mixture in the vial was then spun down briefly to assist dissolution of the dry powder mixture of the fluorogenic dyes into the first liquid medium. The organic liquid was acetonitrile except as specifically stated otherwise in the examples below. The mixture was allowed to sit for an incubation time of either 5 minutes in the case of acetonitrile or 10 minutes in the case of DMSO, following which the mixture was diluted through addition of 500 microliters of Combo Dye® buffer and that diluted mixture was briefly vortexed to prepare the aqueous dye formulation used to stain the fluid samples for flow cytometry evaluation. As will be appreciated, each such batch of prepared aqueous dye formulation is sufficient to stain 10 fluid samples of 100 microliters in volume for flow cytometry evaluation. Fluid samples were generally stained within 4 hours of preparing the aqueous dye formulation. After staining, samples were allowed to sit for a time of about 30 minutes while protected from light before being subjected to flow cytometry.

For tests using POPO™-3 alone as a fluorogenic dye for staining nucleic acid content, a representative test protocol was generally as follows. Three microliters of stock POPO-3 were diluted in 22 microliters of acetonitrile. Five microliters of this solution were diluted in 45 microliters of Combo Dye® buffer. Samples were stained with either 3 microliters or 6 microliters of the diluted POPO-3 stain formulation in 195 microliters of samples and were incubated for at least 30 minutes at room temperature, protected from light before analysis.

For each virus evaluation test, a stock solution of the sample containing virions of the virus to be evaluated was prepared and from that stock solution unstained fluid samples were prepared at the desired pH for testing at different dilution factors, and each fluid sample in a dilution series is stained as summarized above, so that all stained fluid samples include the same quantity of fluorescent stain, regardless of the concentration of the virions. The pH of the stock solutions is not measured, but are often expected to be around physiological pH or somewhat higher. When diluted with much larger proportions of the aqueous dilution liquid to prepare diluted fluid samples prior to staining, the diluted fluid samples are assumed to be at approximately the PH of the aqueous dilution liquid. For each dilution series, a blank sample was prepared at the same pH and including the fluorescent stain at the same concentration hut not including virions. Each stained fluid sample and blank sample were subjected to flow cytometry evaluation. Raw flow cytometry results of virus particle concentration for the virus-containing stained fluid samples were corrected by subtraction of particle concentration results of blank samples. For some tests, multiple replicate samples (typically 3) were prepared at each dilution factor and for the blank sample, in which case raw flow cytometry particle concentration results were averaged for the multiple replicate samples to obtain an average raw virus particle concentration, which was corrected by the average particle concentration results of the blank sample replicates. References in the examples below to a titer value are to a concentration of the non-enveloped virions in the original, undiluted stock solution from which the diluted fluid samples were prepared, rather than to the concentration as directly measured by flow cytometry on the diluted fluid samples. As may be appreciated, an estimated titer value may be calculated from the determined virion particle concentration on a diluted fluid sample by multiplying the concentration for the diluted fluid sample by the corresponding dilution factor for that diluted fluid sample. Ideally, a log-log plot of particle concentration results vs. dilution factor for a dilution series should be linear, although in actual practice results are not ideal, and in particular at very large viral particle concentrations (e.g., above $1 \times 10^9$ particles/mL) and at very low particle concentrations (e.g., near or below $5 \times 10^5$ particles/mL) results tend to suffer and greater departure of plotted results from linearity tends to occur. An entire dilution series may be plotted as the logarithm value of determined particle concentrations vs. logarithm value of the dilution factor and evaluated by linear regression analysis to determine a linear fit of the data across the dilution series. All virus particle concentration data presented for the examples below are for corrected concentrations unless otherwise noted. Identified anomalous concentration results and concentration results below the instrument quantification limit of about $5 \times 10^5$ particles per milliliter were generally excluded from analysis. All titer values shown for the examples below for a dilution series test is an average of titer values for all reported corrected virus particle concentrations for all dilution factors for the dilution series test.

pHs, as summarized in Table 1, and were subjected to flow cytometry valuation for quantification of Adenovirus 5 particles.

TABLE 1

Example 1 - Stained Fluid Samples Prepared and Tested

| Test Series | Virus Particles | Fluorescent Stain | Sample Dilution Butler System | Stained Fluid Sample Approximate pH | Dilution Factors Prepared & Tested |
|---|---|---|---|---|---|
| 1-1 | Adenovirus 5 | Fluorogenic Dyes (Combo Dye ®) | PBS | 7.4 | 50/150/450/1350 |
| 1-2 | Adenovirus 5 | Fluorogenic Dyes (Combo Dye ®) | ACES | 6.5 | 50/150/450/1350 |
| 1-3 | Adenovirus 5 | Fluorogenic Dyes (Combo Dye ®) | MBS | 6.0 | 50/150/450/1350 |
| 1-4 | Adenovirus 5 | Fluorogenic Dyes (Combo Dye ®) | MES | 5.5 | 50/150/450/1350 |

Results are summarized in Table 2. As shown in Table 2, average titer concentrations generally increase with decreasing pH of sample staining, and with most effective staining with the fluorogenic dyes indicated for fluid samples stained at pH 5.5

TABLE 2

Example 1 - Corrected Flow Cytometry Results

| Test Series | Adenovirus 5 Concentration (virus particles/mL) | | | | Titer (virus particles/mL) |
|---|---|---|---|---|---|
| | Dilution Factor 50 | Dilution Factor 150 | Dilution Factor 450 | Dilution Factor 1350 | |
| 1-1 (pH 7.4) | $3.19 \times 10^7$ | $1.50 \times 10^7$ | $6.14 \times 10^6$ | $2.26 \times 10^6$ | $2.42 \times 10^9$ |
| 1-2 (pH 6.5) | $5.03 \times 10^7$ | $1.79 \times 10^7$ | $7.32 \times 10^6$ | $2.29 \times 10^6$ | $2.90 \times 10^9$ |
| 1-3 (pH 6.0) | $6.30 \times 10^7$ | $2.49 \times 10^7$ | $8.91 \times 10^6$ | $2.43 \times 10^5$ | $3.44 \times 10^9$ |
| 1-4 (pH 5.5) | $7.13 \times 10^7$ | $2.68 \times 10^7$ | $8.30 \times 10^6$ | $1.98 \times 10^6$ | $3.50 \times 10^9$ |

Example 1

Adenovirus 5 Stained with Fluorogenic Dyes for Nucleic Acid and Protein at Various Acidic pHs vs Physiological pH Fluid sample dilution series and corresponding blank samples with Adenovirus 5 were prepared and stained with fluorogenic dyes from Combo Dye® concentrate at different Example 2

Adenovirus 5 Stained with Antibody Stain at Various Acidic pHs vs Physiological pH Fluid sample dilution series and corresponding blank samples with Adenovirus 5 were prepared and stained with fluorescent antibody stain at different pHs, as summarized in Table 3, and were subjected to flow cytometry evaluation for quantification of Adenovirus 5 particles.

TABLE 3

| | Example 2 - Stained Fluid Samples Prepared and Tested | | | | |
|---|---|---|---|---|---|
| Test Series | Virus Particles | Fluorescent Stain | Sample Dilution Buffer System | Stained Fluid Sample Approximate pH | Dilution Factors Prepared & Tested |
| 2-1 | Adenovirus 5 | Fluorescent Antibody Stain (ADVX) | PBS | 7.4 | 50/150/450/1350 |
| 2-2 | Adenovirus 5 | Fluorescent Antibody Stain (ADVX) | ACES | 6.5 | 50/150/450/1350 |
| 2-3 | Adenovirus 5 | Fluorescent Antibody Stain (ADVX) | MBS | 6.0 | 50/150/450/1350 |
| 2-4 | Adenovirus 5 | Fluorescent Antibody Stain (ADVX) | MBS | 5.5 | 50/150/450/1350 |

Results are summarized in Table 4. Similar to the results for tests using fluorogenic dyes, shown in Example 1, average titer concentrations shown in Table 4 indicate staining with the fluorescent antibody stain was generally more effective as the pH of staining was reduced, with most effective staining indicated for fluid samples stained at pH 5.5.

TABLE 4

| | Example 2 - Corrected Flow Cytometry Results | | | | |
|---|---|---|---|---|---|
| | Adenovirus 5 Concentration (virus particles/mL) | | | | |
| Test Series | Dilution Factor 50 | Dilution Factor 150 | Dilution Factor 450 | Dilution Factor 1350 | Titer (virus particles/mL) |
| 2-1 (pH 7.4) | $6.07 \times 10^6$ | $3.97 \times 10^6$ | $1.20 \times 10^6$ | N/A* | $4.79 \times 10^8$ |
| 2-2 (pH 6.5) | $1.17 \times 10^7$ | $4.32 \times 10^6$ | $1.31 \times 10^6$ | N/A* | $6.03 \times 10^8$ |
| 2-3 (pH 6.0) | $1.56 \times 10^7$ | $6.15 \times 10^6$ | $1.81 \times 10^6$ | N/A* | $8.41 \times 10^8$ |
| 2-4 (pH 5.5) | $3.85 \times 10^7$ | $2.61 \times 10^7$ | $1.01 \times 10^7$ | $2.20 \times 10^6$ | $3.34 \times 10^9$ |

*Results excluded as anomalous or because uncorrected counts below instrument quantification limit of $5 \times 10^5$ particles/mL.

Example 3

Adenovirus 2 (Ad2) and Adenovirus 6 (Ad6) Stained with Antibody Stain at Acidic pH vs Physiological pH Fluid sample dilution series and corresponding blank samples with either Adenovirus 2 or Adenovirus 6 were prepared at different pHs, as summarized in Table 5, and were subjected to flow cytometry evaluation,

TABLE 5

| | Example 3 - Stained Fluid Samples Prepared and Tested | | | | |
|---|---|---|---|---|---|
| Test Series | Virus Particles | Fluorescent Stain | Sample Dilution Buffer System | Stained Fluid Sample Approximate pH | Dilution Factors Prepared & Tested |
| 3-1 | Adenovirus 2 | Fluorescent Antibody Stain (ADVX) | PBS | 7.4 | 10/100/1000/10,000 |
| 3-2 | Adenovirus 2 | Fluorescent Antibody Stain (ADVX) | WES | 5.5 | 10/100/1000/10,000 |
| 3-3 | Adenovirus 6 | Fluorescent Antibody Stain (ADVX) | PBS | 7.4 | 10/100/1000/10,000 |
| 3-4 | Adenovirus 6 | Fluorescent Antibody Stain (ADVX) | MES | 5.5 | 10/100/1000/10,000 |

Results are summarized n Table 6, both of Adenovirus 2 and Adenovirus 6 tests, flow cytometry results summarized in Table 6 indicate more effective staining with the fluorescent antibody staining conducted at pH 5.5 compared to staining conducted at pH 7.4.

TABLE 6

Example 3 - Corrected Flow Cytometry Results

Adenovirus 2 or 6 Concentration (virus particles/mL)

| Test Series | Dilution Factor 10 | Dilution Factor 100 | Dilution Factor 1000 | Dilution Factor 10,000 | Titer (virus particles/mL) |
|---|---|---|---|---|---|
| 3-1 (Ad2, pH 7.4) | $7.52 \times 10^5$ | N/A* | N/A* | NA* | $7.52 \times 10^6$ |
| 3-2 (Ad2 pH 5.5) | $2.04 \times 10^8$ | $4.42 \times 10^7$ | NA* | N/A* | $3.23 \times 10^9$ |
| 3-3 (Ad6, pH 7.4) | $5.31 \times 10^6$ | $7.93 \times 10^5$ | N/A* | N/A* | $6.62 \times 10^7$ |
| 3-4 (Ad6, pH 5.5) | $1.25 \times 10^8$ | $4.83 \times 10^7$ | $5.27 \times 10^6$ | N/A* | $3.79 \times 10^9$ |

*Results excluded as anomalous or because uncorrected counts below instrument quantification limit of $5 \times 10^5$ particles/mL.

Example 4

Enterovirus 71 (EV-71) Stained with Fluorogenic Dyes for Nucleic Add and Protein from Combo Dye® Concentrate at Various Acidic pHs vs Physiological pH Fluid sample dilution series and corresponding blank samples with Enterovirus 71 were prepared and stained with fluorogenic dyes from Combo Dye® concentrate the different pHs, as summarized in Table 7, and were subjected to flow cytometry evaluation for quantification of Enterovirus 71 particles.

Results are summarized in Table 8, As shown in Table 8, flow cytometry results indicate that staining with the fluorogenic dyes at the different pHs did not result in materially different flow cytometry performance.

TABLE 8

Example 4 - Corrected Flow Cytometry Results

Enterovirus 71 Concentration (virus particles/mL)

| Test Series | Dilution Factor 100 | Dilution Factor 1000 | Dilution Factor 10,000 | Titer (virus particles/mL) |
|---|---|---|---|---|
| 4-1 (pH 7.4) | $8.22 \times 10^7$ | $1.81 \times 10^7$ | $1.25 \times 10^6$ | $1.30 \times 10^{10}$ |
| 4-2 (pH 6.2) | $9.92 \times 10^7$ | $1.39 \times 10^7$ | $1.16 \times 10^6$ | $1.18 \times 10^{10}$ |
| 4-3 (pH 5.5) | $1.25 \times 10^8$ | $1.32 \times 10^7$ | $9.83 \times 10^5$ | $1.19 \times 10^{10}$ |

Example 5

Enterovirus 71 (EV-71) Stained with Fluorogenic Dyes for Nucleic Acid and Protein at Various Acidic pHs vs Physiological pH Fluid sample dilution series and corresponding blank samples with Enterovirus 71 were prepared and stained with fluorogenic dyes from Combo Dye® concentrate at different pHs, as summarized in Table 9, and were subjected to low cytometry evaluation for quantification of Enterovirus 71 particles.

TABLE 7

Example 4 - Stained Fluic Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 4-1 | Enterovirus 71 | Fluorogenic Dyes (Combo Dye ®) | PBS | 7.4 | 100/1000/10,000 |
| 4-2 | Enterovirus 71 | Fluorogenic Dyes (Combo Dye ®) | PBS | 6.2 | 100/1000/10,000 |
| 4-3 | Enterovirus 71 | Fluorogenic Dyes (Combo Dye ®) | MES | 5.5 | 100/1000/10,000 |

TABLE 9

Example 5 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 5-1 | Enterovirus 71 | Fluorogenic Dyes (Combo Dye ®) | PBS | 7.4 | 10/100/1000/10,000 |
| 5-2 | Enterovirus 71 | Fluorogenic Dyes (Combo Dye ®) | MES | 5.5 | 10/100/1000/10,000 |
| 5-3 | Enterovirus 71 | Fluorogenic Dyes (Combo Dye ®) | ACT | 4.0 | 10/100/1000/10,000 |
| 5-4 | Enterovirus 71 | Fluorogenic Dyes (Combo Dye ®) | CIT | 3.0 | 10/100/1000/10,000 |

Results are summarized in Table 10. Flow cytometry results shown in Table 10 indicate similar staining efficacy at pH 7.4, pH 5.5 and pH 4.0, with efficacy of staining at the acidic pH of pH 5.5 being somewhat better than staining at pH 7.4 or pH 4.0. Flow cytometry results for staining at pH 3.0 indicate reduced staining efficacy relative to staining at: the higher acidic pHs of either pH 5.5 or pH 4.0.

TABLE 10

Example 5 - Corrected Flow Cytometry Results

| | Enterovirus 71 Concentration (virus particles/mL) | | | | |
|---|---|---|---|---|---|
| Test Series | Dilution Factor 10 | Dilution Factor 100 | Dilution Factor 1000 | Dilution Factor 10,000 | Titer (virus particles/mL) |
| 5-1 (pH 7.4) | $8.27 \times 10^7$ | $1.60 \times 10^7$ | $1.58 \times 10^6$ | N/A* | $1.33 \times 10^9$ |
| 5-2 (pH 5.5) | $1.04 \times 10^8$ | $2.23 \times 10^7$ | $1.54 \times 10^6$ | N/A* | $1.60 \times 10^9$ |
| 5-3 (pH 4.0) | $8.82 \times 10^7$ | $1.66 \times 10^7$ | $1.10 \times 10^6$ | N/A* | $1.22 \times 10^9$ |
| 5-4 (pH 3.0) | $2.80 \times 10^7$ | $2.00 \times 10^6$ | N/A* | N/A* | $2.40 \times 10^8$ |

*Results excluded as anomalous or because uncorrected counts below instrument quantification limit of $5 \times 10^5$ particles/mL.

Example 6

Enterovirus 71 (EV-71) Stained with Antibody Stain at Acidic pH vs Physiological pH Fluid sample dilution series and corresponding blank samples with Enterovirus 71 were prepared and stained with fluorescent antibody stain at different pHs, as summarized in Table 11 and were subjected to flow cytometry evaluation for quantification of Enterovirus particles.

TABLE 11

| Example 6 - Stained Fluid Samples Prepared and Tested | | | | | |
|---|---|---|---|---|---|
| Test Series | Virus Particles | Fluorescent Stain | Sample Dilution Buffer System | Stained Fluid Sample Approximate pH | Dilution Factors Prepared & Tested |
| 6-1 | Enterovirus 71 | Fluorescent Antibody Stain (EV71) | PBS | 7.4 | 10/100/1000/10,000 |
| 6-2 | Enterovirus 71 | Fluorescent Antibody Stain (EV71) | MES | 5.5 | 10/100/1000/10,000 |

Results are summarized in Table 12. The flow cytometry results summarized in Table 12 indicate effective staining of fluid sample at the acidic pH of pH 5.5, whereas staining at about physiological pH at pH 7.4 was ineffective.

TABLE 12

| Example 6 - Raw** (Uncorrected) Flow Cytometry Results | | | | |
|---|---|---|---|---|
| | Enterovirus 71 Concentration (virus particles/mL) | | | |
| Test Series | Dilution Factor 10 | Dilution Factor 100 | Dilution Factor 1000 | Dilution Factor 10,000 |
| 6-1 (pH 7.4) | N/A* | N/A* | N/A* | N/A* |
| 6-2 (pH 5.5) | $2.08 \times 10^7$ | $4.35 \times 10^6$ | $6.48 \times 10^5$ | $9.11 \times 10^5$ |

*Results excluded as anomalous or because uncorrected counts below instrument quantification limit of $5 \times 10^5$ particles/mL.

**Blank sample results anomalous for test series 6-2 and results are presented are raw (uncorrected) flow cytometry results.

Example 7

Enterovirus 71 (EV-71) Stained with as Stain at Various Acidic pHs vs Physiological pH Fluid samples at a single dilution factor of 130 and corresponding blank samples with Enterovirus 71 were prepared and stained with fluorescent antibody stain at different pHs, as summarized in Table 13, and were subjected to flow cytometry evaluation for quantification of Enterovirus 71 particles.

TABLE 13

Example 7 - Stained Fluid Samples Prepared and Tested

| Test Series | Virus Particles | Fluorescent Stain | Sample Dilution Buffer System | Stained Fluid Sample Approximate pH | Dilation Factors Prepared & Tested |
|---|---|---|---|---|---|
| 7-1 | Enterovirus 71 | Fluorescent Antibody Stain (EV71) | PBS | 8.2 | 130 |
| 7-2 | Enterovirus 71 | Fluorescent Antibody Stain (EV71) | PBS | 7.4 | 130 |
| 7-3 | Enterovirus 71 | Fluorescent Antibody Stain (EV71) | PBS | 7.0 | 130 |
| 7-4 | Enterovirus 71 | Fluorescent Antibody Stain (EV71) | PBS | 6.6 | 130 |
| 7-5 | Enterovirus 71 | Fluorescent Antibody Stain (EV71) | PBS | 6.2 | 130 |
| 7-6 | Enterovirus 71 | Fluorescent Antibody Slain (EV71) | PBS | 6.0 | 130 |
| 7-7 | Enterovirus 71 | Fluorescent Antibody Stain (EV71) | PBS | 5.8 | 130 |
| 7-8 | Enterovirus 71 | Fluorescent Antibody Stain (EV71) | MES | 5.5 | 130 |

Results are summarized in Table 14. As shown in Table 14, Enterovirus 71 concentration determined by flow cytometry evaluation generally increases with decreasing pH for acidic pHs of 6.6, 6.2, 6.0, and 5.8, and with best results obtained when staining was performed at pH 5.8. Although the results at pH 5.5 indicate less effective staining at that pH, based on results for other tests on this virus, the result appears to be anomalous and a problem with the test is suspected.

TABLE 14

Example 7 - Corrected Flow Cytometry Results

| Test Series | Enterovirus 71 Concentration (virus particles/mL) Dilution Factor 130 |
|---|---|
| 7-1 (pH 8.2) | N/A* |
| 7-2 (pH 7.4) | $9.76 \times 10^5$ |
| 7-3 (pH 7.0) | $6{,}65 \times 10^5$ |
| 7-4 (pH 6.6) | $2.53 \times 10^6$ |
| 7-5 (pH 6.2) | $2.72 \times 10^6$ |
| 7-6 (pH 6.0) | $4{,}51 \times 10^6$ |
| 7-7 (pH 5.8) | $4{,}87 \times 10^6$ |
| 7-8 (pH 5.5) | $6.87 \times 10^5$ |

*Results excluded as anomalous or because uncorrected counts below instrument quantification limit of $5 \times 10^5$ particles/mL.

Example 8

Adeno-Associated Virus 8 (AAV8) and Adeno-Associated Virus 9 (AAV9) Stained with Antibody Stain at Acidic pH vs Physiological pH Fluid sample dilution series and corresponding blank samples with either Adeno-associated virus serotype 8 or 9 were prepared and stained with fluorescent antibody stain (AAV819) at both near physiological pH (pH 7.4) and at an acidic pH (pH 5.5), as summarized in Table 15, and were subjected to flow cytometry evaluation for quantification of the respective virus particles. Fluid sample dilution series were also prepared with fluid samples including Adeno-associated virus 2 (AAV2) particles as a negative control for testing specificity of the AAV8/9 fluorescent antibody stain at different staining pH conditions.

TABLE 15

Example 8 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 8-1 | AAV2 | Fluorescent Antibody Stain (AAV8/9) | PBS | 7.4 | 10/100/1000/10,000/100,000 |

TABLE 15-continued

Example 8 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 8-2 | AAV2 | Fluorescent Antibody Stain (AAV8/9) | MES | 5.5 | 10/100/1000/10,000/100,000 |
| 8-3 | AAV8 | Fluorescent Antibody Stain (AAV8/9) | PBS | 7.4 | 10/100/1000/10,000/100,000 |
| 8-4 | AAV8 | Fluorescent Antibody Stain (AAV8/9) | MES | 5.5 | 100/1000/10,000/100,000 |
| 8-5 | AAV9 | Fluorescent Antibody Stain (AAV8/9) | PBS | 7.4 | 10/100/1000/10,000/100,000 |
| 8-6 | AAV9 | Fluorescent Antibody Stain (AAV8/9) | MES | 5.5 | 10/100/1000/10,000/100,000 |

Results are summarized in Table 16, For Adeno-associated virus 2, usable flow cytometry results were not obtained for staining at either pH, indicating that binding specificity of the fluorescent antibody stain AAV 9 does not appear to be affected by the shin in staining pH. For both Adeno-associated virus 8 and Adeno-associated virus 9, results indicate significantly enhanced staining at an acidic pH of pH 5.5 relative to staining at about physiological pH of pH 74. Notably, for the acidic pH tests flow cytometry particle counts were above the instrument quantification limit and therefore usable across a greater range of dilution factors than for the pH 7.4 tests.

TABLE 16

Example 8 - Corrected Flow Cytometry Results

Adeno-Associated Virus 2, 8 or 9 Concentration (virus particles/mL)

| Test Series | Dilution Factor 10 | Dilution Factor 100 | Dilution Factor 1000 | Dilution Factor 10,000 | Dilution Factor 100,000 | Titer (virus particles/mL) |
|---|---|---|---|---|---|---|
| 8-1 (AAV2 pH 7.4) | N/A* | N/A* | N/A* | N/A* | N/A* | — |
| 8-2 (AAV2 pH 5.5) | N/A* | NA* | N/A* | N/A* | N/A* | — |
| 8-3 (AAV8 pH 7.4) | $9.57 \times 10^6$ | $1.47 \times 10^6$ | N/A* | N/A* | N/A* | $1.21 \times 10^8$ |
| 8-4 (AAV8 pH 5.5) | — | $1.08 \times 10^8$ | $4.15 \times 10^7$ | $4.17 \times 10^6$ | $8.68 \times 10^5$ | $4.52 \times 10^{10}$ |
| 8-5 (AAV9 pH 7.4) | $9.88 \times 10^5$ | N/A* | N/A* | N/A* | N/A* | $9.88 \times 10^6$ |
| 8-6 (AAV9 pH 5.5) | $3.76 \times 10^7$ | $5.55 \times 10^6$ | $5.09 \times 10^5$ | N/A* | N/A* | $4.80 \times 10^8$ |

*Results excluded as anomalous or because uncorrected counts below instrument quantification limit of 5 × 10$^5$ particles/mL.

Example 9

Adeno-Associated Virus 8 (AAV8) Stained with Antibody Stain at Various Acidic pHs Fluid samples at a single dilution factor and corresponding blank samples with Adeno-associated virus 8 were prepared and stained with fluorescent antibody stain at a variety of acidic pHs, as summarized in Table 17, and were subjected to flow cytometry evaluation for quantification of Adeno-associated virus 8 particles.

TABLE 17

| Test Series | Virus Particles | Fluorescent Stain | Sample Dilution Buffer System | Stained Fluid Sample Approximate pH | Dilation Factors Prepared & Tested |
|---|---|---|---|---|---|
| 9-1 | AAV8 | Fluorescent Antibody Stain (AAV8/9) | PBS | 6.6 | 1000 |
| 9-2 | AAV8 | Fluorescent Antibody Stain (AAV8/9) | PBS | 6.2 | 1000 |
| 9-3 | AAV8 | Fluorescent Antibody Stain (AAV8/9) | PBS | 6.0 | 1000 |
| 9-4 | AAV8 | Fluorescent Antibody Stain (AAV8/9) | PBS | 5.8 | 1000 |
| 9-5 | AAV8 | Fluorescent Antibody Stain (AAV8/9) | MES | 5.5 | 1000 |

Results are summarized in Table 18. As shown in Table 18, flow cytometry results indicate more effective staining of fluid samples as the staining pH decreases, with best results obtained for staining at pH 5.5. Results at the higher pHs (pH 6.6 and pH 6.2) did not provide useful results.

TABLE 18

Example 9 - Corrected Flow Cytometry Results

| Test Series | Adeno-Associated Virus 8 Concentration (virus particles/mL) Dilution Factor 1000 |
|---|---|
| 9-1 (pH 6.6) | N/A* |
| 9-2 (pH 6.2) | N/A* |
| 9-3 (pH 6.0) | $3.57 \times 10^6$ |
| 9-4 (pH 5.8) | $5.23 \times 10^6$ |
| 9-5 (pH 5.5) | $7.02 \times 10^6$ |

*Results excluded as anomalous or because uncorrected counts below instrument quantification limit of $5 \times 10^5$ particles/mL.

Example 10

Feline Panleukopenia Virus (FPV) Stained with Fluorogenic Dyes for Nucleic Acid and Protein at Various Acidic pHs vs Physiological pH and Basic pH Fluid sample dilution series and corresponding blank samples with Feline panleukopenia virus were prepared and stained with fluorogenic dyes from Combo Dye® concentrate at different pHs ranging from pH 8.0 to 5.5, as summarized in Table 19, and were subjected to flow cytometry evaluation for quantification of Feline panleukopenia virus particles.

TABLE 19

Example 10 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 10-1 | FPV | Fluorogenic Dyes (Combo Dye ®) | EPPS | 8.0 | 10/100/1000/10,000 |
| 10-2 | FPV | Fluorogenic Dyes (Combo Dye ®) | PSB | 7.4 | 10/100/1000/10,000 |
| 10-3 | FPV | Fluorogenic Dyes (Combo Dye ®) | ACES | 6.5 | 10/100/1000/10,000 |
| 10-4 | FPV | Fluorogenic Dyes (Combo Dye ®) | MES | 5.5 | 10/100/1000/10,000 |

Results are summarized in Table 20, which indicate more effective staining at the acidic pHs of pH 6.5 and pH 5.5 compared to staining at pH 8.0 or pH 7.4, with most effective staining, indicated for the tests with staining at pH 6.5

TABLE 20

Example 10 - Corrected Flow Cytometry Results

Feline Panleukopenia virus Concentration
(virus particles/mL)

| Test Series | Dilution Factor W | Dilution Factor 300 | Dilution Factor 1000 | Dilution Factor 10,000 | Titer (virus particles/mL) |
|---|---|---|---|---|---|
| 10-1 (pH 8.0) | $1.99 \times 10^7$ | $7.14 \times 10^6$ | $9.20 \times 10^5$ | N/A* | $6.11 \times 10^8$ |
| 10-2 (pH 7.4) | $1.63 \times 10^7$ | $4.72 \times 10^6$ | $9.03 \times 10^5$ | N/A* | $5.43 \times 10^8$ |
| 10-3 (pH 6.5) | $3.67 \times 10^7$ | $7.21 \times 10^6$ | $2.06 \times 10^6$ | $6.25 \times 10^5$ | $2.35 \times 10^9$ |
| 10-4 (pH 5.5) | $6.95 \times 10^7$ | $9.68 \times 10^6$ | $2.04 \times 10^6$ | N/A* | $1.23 \times 10^9$ |

*Results excluded as anomalous, outside of identified optimal performance range or because uncorrected counts below instrument quantification limit of $5 \times 10^5$ particles/mL.

Example 11

Feline Panleukopenia Virus (FPV) Stained with Fluorogenic Dyes for Nucleic Acid and Protein at various Acidic pHs vs physiological pH Fluid sample dilution series and corresponding blank samples with Feline panleukopenia virus were prepared and stained with fluorogenic dyes from Combo Dye® concentrate at different pHs ranging from pH 7.4 to pH 3.0, as summarized in Table 21, and subjected to flow cytometry evaluation for quantification of Feline panleukopenia virus particles.

TABLE 21

Example 11 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 11-1 | FPV | Fluorogenic Dyes (Combo Dye ®) | PSB | 7.4 | 10/100/1000/10,000 |
| 11-2 | FPV | Fluorogenic Dyes (Combo Dye ®) | MES | 5.5 | 10/100/1000/10,000 |
| 11-3 | FPV | Fluorogenic Dyes (Combo Dye ®) | ACT | 4.0 | 10/100/1000/10,000 |
| 11-4 | FPV | Fluorogenic Dyes (Combo Dye ®) | CIT | 3.0 | 10/100/1000 |

Results are summarized in Table 22. As shown in Table 22, staining appears to be more effective at both pH 5.5 and pH 4.0 than staining at physiological pH of about pH 7.4. However, results for staining at pH 3.0 show degradation of flow cytometry results, indicating that staining at such a low pH may be outside an optimal acidic pH range for effective staining of this virus,

TABLE 22

Example 11 - Corrected Flow Cytometry Results

Feline Panleukopenia virus Concentration
(virus particles/mL)

| Test Series | Dilution Factor 10 | Dilution Factor 100 | Dilution Factor 1000 | Dilution Factor 10,000 | Titer (virus particles/mL) |
|---|---|---|---|---|---|
| 11-1 (pH 7.4) | $1.93 \times 10^7$ | —** | $3.94 \times 10^6$ | N/A* | $2.07 \times 10^9$ |
| 11-2 (pH 5.5) | $4.07 \times 10^7$ | $2.58 \times 10^7$ | $5.81 \times 10^6$ | —** | $2.93 \times 10^9$ |
| 11-3 (pH 4.0) | $7.21 \times 10^7$ | $3.24 \times 10^7$ | $3.91 \times 10^6$ | $4.29 \times 10^5$ | $3.04 \times 10^9$ |
| 11-4 (pH 3.0) | N/A* | $1.38 \times 10^6$ | N/A* | — | $1.38 \times 10^8$ |

*Results excluded as anomalous or because uncorrected counts below instrument quantification limit of $5 \times 10^5$ particles/mL.
**Sample vial broke and sample lost

Example 12

Rotavirus Stained with Fluorogenic Dyes for Nucleic Acid and Protein at Various Acidic pHs vs Physiological pH and Basic pH Fluid sample dilution series and corresponding blank samples with a rotavirus, human Rotavirus A, strain Wa (tissue culture adapted), were prepared and sunned with fluorogenic dyes from Combo Dye® concentrate at different pHs ranging from pH 8.02 pH 5.5, as summarized in Table 23, and subjected to flow cytometry evaluation for quantification of rotavirus particles.

TABLE 23

Example 12 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 12-1 | Rotavirus | Fluorogenic Dyes (Combo Dye ®) | EPPS | 8.0 | 10/100/1000/10,000 |
| 12-2 | Rotavirus | Fluorogenic Dyes (Combo Dye ®) | PBS | 7.4 | 10/100/1000/10,000 |
| 12-3 | Rotavirus | Fluorogenic Dyes (Combo Dye ®) | ACES | 6.5 | 10/100/1000/10,000 |
| 12-4 | Rotavirus | Fluorogenic Dyes (Combo Dye ®) | MBS | 5.5 | 10/100/1000/10,000 |

Results are summarized in Table 24, which indicate more effective staining at the acidic pHs of pH 6.5 and 5.5, with best results obtained with staining at the most acidic pH tested, pH 5.5.

TABLE 24

Example 12- Corrected Flow Cytometry Results

| | Rotavirus Concentration (virus particles/mL) | | | | |
|---|---|---|---|---|---|
| Test Series | Dilution Factor 10 | Dilution Factor 100 | Dilution Factor 1000 | Dilution Factor 10,000 | Titer (virus particles/mL) |
| 12-1 (pH 8.0) | $3.52 \times 10^7$ | $6.06 \times 10^6$ | N/A* | N/A* | $4.79 \times 10^8$ |
| 12-2 (pH 7.4) | $3.95 \times 10^7$ | $7.74 \times 10^6$ | $6.48 \times 10^5$ | N/A* | $6.06 \times 10^8$ |
| 12-3 (pH 6.5) | $3.61 \times 10^7$ | $8.00 \times 10^6$ | $7.17 \times 10^5$ | N/A* | $6.26 \times 10^8$ |
| 12-4 (pH 5.5) | $2.19 \times 10^7$ | $8.28 \times 10^6$ | $1.07 \times 10^6$ | N/A* | $7.06 \times 10^8$ |

*Results excluded as anomalous or because uncorrected counts below instrument quantification limit of $5 \times 10^5$ particles/mL

Example 13

Adeno-Associated Virus 2 (AAV2) with Fluorogenic Dyes for Nucleic Acid and Protein at Various Acidic pHs vs Physiological pH and Basic pH Fluid sample dilution series and corresponding blank samples with adeno-associated virus 2 were prepared and stained with fluorogenic dyes from Combo Dye® concentrate at different pHs ranging from pH 8.0 to pH 5.5, as summarized in Table 25, and subjected to flow cytometry evaluation for quantification of Adeno-associated virus 2 particles.

Results are summarized in Table 26, which indicate more effective staining as the pH is reduced from pH 8.0 to pH 5.5, with most effective staining indicated for tests with staining at pH 5.5.

TABLE 26

Example 13- Corrected Flow Cytometry Results

| | Adeno-associated Virus 2 Concentration (virus particles/mL) | | | | |
|---|---|---|---|---|---|
| Test Series | Dilution Factor 10 | Dilution Factor 100 | Dilution Factor 1000 | Dilution Factor 10,000 | Titer (virus particles/mL) |
| 13-1 (pH 8.0) | $6.11 \times 10^7$ | $9.95 \times 10^6$ | $9.05 \times 10^5$ | N/A* | $8.37 \times 10^8$ |
| 13-2 (pH 7.4) | $5.89 \times 10^7$ | $1.01 \times 10^7$ | $1.13 \times 10^6$ | N/A* | $9.12 \times 10^8$ |
| 13-3 (pH 6.5) | $7.03 \times 10^7$ | $1.13 \times 10^7$ | $1.53 \times 10^6$ | N/A* | $1.12 \times 10^9$ |
| 13-4 (pH 5.5) | $1.75 \times 10^8$ | $1.77 \times 10^7$ | $2.15 \times 10^6$ | N/A* | $1.89 \times 10^9$ |

*Results excluded as anomalous or because uncorrected counts below instrument quantification limit of $5 \times 10^5$ particles/mL.

Example 14

Adeno-Associated Virus 2 (AAV2) with Fluorogenic Dyes for Nucleic Acid and Protein at Various Acidic PHs vs Physiological pH, using DMSO as Organic Liquid to Dissolve the Dry Powder Dye Mixture to Prepare the Aqueous Dye Formulation Fluid sample dilution series and corresponding blank samples with adeno-associated virus 2 were prepared and stained with fluorogenic dyes from Combo Dye at different pHs ranging from pH 7.4 to pH 4.0, as summarized in Table

TABLE 25

Example 13 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 13-1 | AAV2 | Fluorogenic Dyes (Combo Dye ®) | EPPS | 8.0 | 0/100/1000/10,000 |
| 13-2 | AAV2 | Flurogenic Dyes (Combo Dye ®) | PBS | 7.4 | 0/100/1000/10,000 |
| 13-3 | AAV2 | Fluorogenic Dyes (Combo Dye ®) | ACES | 6.5 | 0/100/1000/10,000 |
| 13-4 | AAV2 | Fluorogenic Dyes (Combo Dye ® | MES | 5.5 | 0/100/1000/10,000 |

27, and subjected to flow cytometry evaluation for quantification of Adeno-associated virus 2 particles. In this example, the aqueous dye formulation was prepared using DMSO is the organic liquid.

TABLE 27

Example 14 - Stained Fluid Samples Prepared and Tested

| Test Series | Virus Particles | Fluorescent Stain | Sample Dilution Buffer System | Stained Fluid Sample Approximate pH | Dilution Factors Prepared & Tested |
|---|---|---|---|---|---|
| 14-1 | AAV2 | Fluorogenic Dyes (Combo Dye ®) | PSB | 7.4 | 100/1000/10,000 |
| 14-2 | AAV2 | Fluorogenic Dyes (Combo Dye ®) | MES | 5.5 | 10/100/1000/10,000 |
| 14-3 | AAV2 | Fluorogenic Dyes (Combo Dye ®) | ACT | 5.0 | 10/100/1000/10,000 |
| 14-4 | AAV2 | Fluorogenic Dyes (Combo Dye ®) | ACT | 4.0 | 10/100/1000/10,000 |

Results are summarized in Table 28. As shown in Table 28, staining appears to be somewhat more effective a pH 74 than pH 5.5, but results tend to indicate similar staining performance at all of pH 7.4, pH 5.5 and pH 5.0.

TABLE 28

Example 14- Corrected Flow Cytometry Results

Adeno-associated Virus 2 Concentration (virus particles/mL)

| Test Series | Dilution Factor 10 | Dilution Factor 100 | Dilution Factor 1000 | Dilution Factor 10,000 | Titer (virus particles/mL) |
|---|---|---|---|---|---|
| 14-1 (pH 7.4) | — | $5.24 \times 10^7$ | $6.27 \times 10^6$ | N/A* | $5.76 \times 10^9$ |
| 14-2 (pH 5.5) | $2.87 \times 10^8$ | $3.57 \times 10^7$ | $5.11 \times 10^6$ | N/A* | $3.85 \times 10^9$ |
| 14-3 (pH 5.0) | $2.66 \times 10^8$ | $2.98 \times 10^7$ | $3.27 \times 10^6$ | N/A* | $2.92 \times 10^9$ |
| 14-4 (pH 4.0) | $6.78 \times 10^7$ | $2.47 \times 10^7$ | $8.65 \times 10^5$ | N/A* | $1.34 \times 10^9$ |

*Results excluded as anomalous or because uncorrected counts below instrument quantification limit of $5 \times 10^5$ particles/mL.

Example 15

Adenovirus 5 (Ad5) with Antibody Stain at Acidic pH with Varying Concentrations of Buffering Agent in Sample Dilution Buffer Fluid sample dilution series and corresponding blank samples with Adenovirus 5 were prepared and stained with fluorescent antibody stain at an acidic elf of pH 5.5 using MES-based sample dilution buffer at about pH 5.5, but prepared with varying concentrations of MES, as summarized in Table 29. The stained fluid sample and blank samples were subjected to flow cytometry evaluation for quantification of Adenovirus 5 particles.

TABLE 29

Example 15 - Stained Fluid Samples Prepared and Tested

| Test Series | Virus Particles | Fluorescent Stain | Sample Dilution Buffer System | Stained Fluid Sample Approximate pH | MES Concentration (mM) | Dilution Factors Prepared & Tested |
|---|---|---|---|---|---|---|
| 15-1 | Ad5 | Fluorescent Antibody Stain (ADVX) | MES | 5.5 | 20 | 100/200/400 |
| 15-2 | Ad5 | Fluorescent Antibody Stain (ADVX) | MES | 5.5 | 50 | 200/400 |
| 15-3 | Ad5 | Fluorescent Antibody Stain (ADVX) | MES | 5.5 | 100 | 100/200/400 |
| 15-4 | Ad5 | Fluorescent Antibody Stain (ADVX) | MES | 5.5 | 200 | 100/200/400 |

Results are summarized in Table 30, indicating enhanced performance with MES concentrations of 50 mM and 100 mM relate to the lowest tested MES concentration of 20 mM and the highest tested MES concentration of 200 mM.

TABLE 30

Example 15- Corrected Flow Cytometry Results

| | Adenovirus 5 Concentration (virus particles/mL) | | | |
|---|---|---|---|---|
| Test Series | Dilution Factor 100 | Dilution Factor 200 | Dilution Factor 400 | Titer (virus particles/mL) |
| 15-1 (20 mM MES) | $7.65 \times 10^7$ | $3.44 \times 10^7$ | $1.31 \times 10^7$ | $6.58 \times 10^9$ |
| 15-2 (50 mM MES) | — | $9.77 \times 10^7$ | $4.98 \times 10^7$ | $1.97 \times 10^{10}$ |
| 15-3 (100 mM MES) | $9.03 \times 10^7$ | $6.45 \times 10^7$ | $4.03 \times 10^7$ | $1.27 \times 10^{10}$ |
| 15-4 (200 mM MES) | $5.27 \times 10^7$ | $3.37 \times 10^7$ | $2.01 \times 10^7$ | $6.68 \times 10^9$ |

Example 16

Adenovirus 5 (Ad5) with Antibody Stain at Acidic pH with Varying Salt Concentrations in Sample Dilution Buffer Fluid sample dilution series and corresponding blank samples with Adenovirus 5 were prepared and stained with fluorescent antibody stain at an acidic pH of 5.5 using MES-based sample dilution buffer at a pH of about 5.5, but prepared with varying concentrations of sodium chloride, as summarized in Table 31. The stained fluid samples and blank samples were subjected to flow cytometry evaluation for quantification of Adenovirus 5 particles.

Results are summarized in Table 32, indicating a generally declining performance with increasing concentration of sodium chloride for the concentrations tested.

TABLE 32

Example 16- Corrected Flow Cytometry Results

| | Adenovirus 5 Concentration (virus particles/mL) | | | |
|---|---|---|---|---|
| Test Series | Dilution Factor 100 | Dilution Factor 300 | Dilution Factor 900 | Titer (virus particles/mL) |
| 16-1 (50 mM NaCl) | $1.83 \times 10^8$ | $1.13 \times 10^8$ | $4.32 \times 10^7$ | $3.04 \times 10^9$ |
| 16-2 (100 mM NaCl) | $1.18 \times 10^8$ | $5.35 \times 10^7$ | $9.37 \times 10^6$ | $1.21 \times 10^9$ |
| 16-3 (300 mM NaCl) | $1.37 \times 10^7$ | $3.40 \times 10^6$ | $8.42 \times 10^5$ | $1.05 \times 10^9$ |
| 16-4 (500 mM NaCl) | $1.02 \times 10^7$ | $3.41 \times 10^6$ | $8.18 \times 10^5$ | $9.26 \times 10^8$ |

Example 17

Adenovirus 5 (Ad5) and Adenovirus 4 (Ad4) with Antibody Stain at Acidic pH with Varying Salt Concentrations in Sample Dilution Buffer Fluid sample dilution series and corresponding blank samples with either Adenovirus 5 Adenovirus 4 were prepared and stained with fluorescent antibody stain at an acidic pH of 5.5 using MES-based sample dilation buffer at a pH of about 5.5, but prepared with varying concentrations of sodium chloride, as summarized in Table 33. The stained fluid samples and blank samples were subjected to flow cytometry evaluation for quantification of Adenovirus 5 or Adenovirus 4 particles.

TABLE 31

Example 16 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 16-1 | Ad5 | Fluorescent Antibody Stain (ADVX) | MES | 5.5 | 50 | 100/300/900 |
| 16-2 | Ad5 | Fluorescent Antibody Stain (ADVX) | MES | 5.5 | 100 | 100/300/900 |
| 16-3 | Ad5 | Fluorescent Antibody Stain (ADVX) | MES | 5.5 | 300 | 100/300/900 |
| 16-4 | Ad5 | Fluorescent Antibody Stain (ADVX) | MES | 5.5 | 500 | 100/300/900 |

TABLE 33

Example 17 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 17-1 | Ad5 | Fluorescent Antibody Stain (ADVX) | MES | 5.5 | 50 | 100/300/900 |
| 17-2 | Ad5 | Fluorescent Antibody Stain (ADVX) | MES | 5.5 | 100 | 100/300/900 |
| 1.7-3 | Ad5 | Fluorescent Antibody Stain (ADVX) | MES | 5.5 | 300 | 100/300/900 |
| 17-4 | Ad4 | Fluorescent Antibody Stain (ADVX) | MES | 5.5 | 50 | 100/300/900 |
| 17-5 | Ad4 | Fluorescent Antibody Stain (ADVX) | MES | 5.5 | 100 | 100/300/900 |
| 17-6 | Ad.4 | Fluorescent Antibody Stain (ADVX) | MES | 5.5 | 300 | 100/300/900 |

Results are summarized in Table 34, indicating generally acceptable results for both virus serotypes at sodium chloride concentrations of 50 mM and 100 mM and generally unacceptable results at the sodium chloride concentration of 300 mM.

Example 18

Blank Particle Counts

Concentrated dye formulations with both POPO™-3 iodide stain and SYPRO™ Red stain were prepared in 5 microliters of DMSO from 2.8 microliters of dry powder dye composition and then diluted 500:1 by volume with aa regular aqueous stain dilution buffer prepare an aqueous diluted dye formulation with both fluorogenic dyes. Three replicate blank fluid samples containing no particles for evaluation were then prepared by adding, 50 microliters of the diluted aqueous dye formulation to 100 microliters of a regular sample dilution buffer at about physiological pH, to prepare blank fluid sample of 150 microliters volume each at about physiological pH. The blank fluid samples were subjected to flow cytometry evaluation and particle emus were separately evaluated on detection channel 1 (detecting, for the emission of signature from POPO™-3 iodide stain) and detection channel 2 (detecting for the emission signature from SYPRO™ Red stain) of the Virus Counter® 3100 flow cytometer to determine a background blank particle count separately for each fluorogenic dye. Average blank particle counts on detection channel 1 (POPO™-3 iodide stain) were relatively low, on the order of $10^5$ blank particle counts per milliliter, whereas average blank particle counts on detection channel 2 (SYPRO™ Red stain were on the order of $10^7$ blank particle counts per milliliter.

Additional tests were performed in which such a concentrated dye formulation with both fluorogenic dyes is diluted with modified aqueous stain dilution buffer to prepare aqueous diluted dye formulations, which is used to prepare modified 150 microliter blank fluid samples at approximately physiological pH. The modified aqueous stain dilution buffer is prepared with the same composition as the noted regular aqueous stain dilution buffer, except also including 15% w/v percent dissolved sugar, which when diluted at a 1:2 volume dilution ratio with sample dilution buffer to prepare the blank fluid sample results in the blank fluid sample containing 5% w/v of the dissolved sugar as fed to the flow cytometer. Sugars tested include a monosaccharide (galactose), disaccharides (sucrose, lactose and trehalose) and trisaccharides (maltotriose and raffinose). The monosaccharide galactose was found to detrimentally increase blank counts on detection Channel 1. The trisaccharides maltotriose and raffinose did not improve blank particle count performance, and with maltotriose increasing blank counts on detection channel 2. All of the tested disaccharides sucrose, lactose and trehalose significantly reduced blank particle counts on detection channel 2, with trehalose exhibiting the greatest reduction. These tests demonstrate beneficial effect of adding disaccharide, even though the tests were not performed at an acidic pH.

TABLE 34

Example 17- Corrected Flow Cytometry Results

| | Adenovirus 5 and Adenovirus 4 Concentration (virus particles/mL) | | | |
|---|---|---|---|---|
| Test Series | Dilution Factor 100 | Dilution Factor 300 | Dilution Factor 900 | Titer (virus particles/mL) |
| 17-1 (Ad5, 50 mM NaCl) | $1.89 \times 10^7$ | $3.41 \times 10^6$ | N/A* | $1.46 \times 10^9$ |
| 17-2 (Ad5, 100 mM NaCl) | $5.59 \times 10^6$ | $6.37 \times 10^5$ | N/A* | $3.75 \times 10^8$ |
| 17-3 (Ad5, 300 mM NaCl) | N/A* | N/A* | N/A* | — |
| 17-4 (Ad4, 50 mM NaCl) | $4.66 \times 10^7$ | $1.68 \times 10^7$ | $4.04 \times 10^6$ | $4.44 \times 10^9$ |
| 17-5 (Ad4, 100 mM NaCl) | $2.66 \times 10^7$ | $6.90 \times 10^6$ | $1.19 \times 10^6$ | $1.93 \times 10^9$ |
| 17-6 (Ad4, 300 mM NaCl) | N/A* | N/A* | N/A* | — |

*Results excluded as anomalous or because uncorrected counts below instrument quantification limit of $5 \times 10^5$ particles/mL

Example 18

Adeno-Associated Virus 2 (AAV2) Stained with Fluorogenic Dye for Nucleic Acid at Acidic pH vs Physiological pH and Basic pH Fluid sample dilution series and corresponding, blank samples with Adeno-associated virus 2 were prepared and stained with fluorogenic stain from nucleic acid content from POPO™-3 formulation at different pHs ranging from pH 8.0 to pH 5.5 and with sample dilution buffers including either 50 or 100 mM sodium chloride concentration, as summarized in Table 35, and were subjected to flow cytometry evaluation for quantification of Adeno-associated virus 2 particles. For these tests, the fluorogenic staining composition was prepared using 3 of the diluted POPO™-3 stain formulation.

TABLE 35

Example 18 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 18-1 | AAV2 | Fluorogenic nucleic acid stain (POPO™-3 formulation) | TRI | 8.0 | 50 | 100 |
| 18-2 | AAV2 | Fluorogenic nucleic acid stain (POPO™-3 formulation) | TRI | 8.0 | 100 | 100 |
| 18-3 | AAV2 | Fluorogenic nucleic acid stain (POPO™-3 formulation) | PBS | 7.4 | 50 | 100 |
| 18-4 | AAV2 | Fluorogenic nucleic acid stain (POPO™-3 formulation) | PBS | 7.4 | 100 | 100 |
| 18-3 | AAV2 | Fluorogenic nucleic acid stain (POPO™-3 formulation) | MES | 5.5 | 50 | 100 |
| 18-6 | AAV2 | Fluorogenic nucleic acid stain (POPO™-3 formulation) | MES | 5.5 | 100 | 100 |

Results are summarized in Table 36, indicating much more effective staining of AAV2 at pH 5.5 compared to staining at either pH 8.0 or pH 7.4 at both sodium chloride concentrations tested.

TABLE 36

Example 18- Corrected Flow Cytometry Results

| Test Series | Adeno-associated virus 2 Concentration (virus particles/mL) Dilution Factor 100 |
|---|---|
| 18-1 (pH 8.0, 50 mM NaCl) | $1.59 \times 10^6$ |
| 18-2 (pH 8.0, 100 mM NaCl) | $1.64 \times 10^6$ |
| 18-3 (pH 7.4, 50 mM NaCl) | $5.71 \times 10^5$ |
| 18-4 (pH 7.4, 100 mM NaCl) | $1.21 \times 10^6$ |
| 18-5 (pH 5.5, 50 mM NaCl) | $1.20 \times 10^8$ |
| 18-6 (pH 5.5, 100 mM NaCl) | $9.15 \times 10^7$ |

Example 9

Adeno-Associated Virus 2 (AAV2) Stained with Fluorogenic Dye for Nucleic Acid at Acidic pH vs Physiological pH and Basic pH Fluid sample dilation series and corresponding blank samples with Adeno-associated virus 2, were prepared and stained with fluorogenic stain from nucleic acid content from POPO™-3 formulation at different pHs ranging from pH 8.0 to pH 5.5 and with sample dilution buffers including either 50 or 100 mM sodium chloride concentration as summarized in Table 37 and subjected to flow cytometry evaluation for quantification of Adeno-associated virus 2 particles. For these tests, the fluorogenic staining composition was prepared using 6 µL of the diluted POPO™-3 stain formulation,

TABLE 37

Example 19 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 19-1 | AAV2 | Fluorogenic nucleic acid stain (POPO™-3 formulation) | TRI | 8.0 | 50 | 100 |
| 19-2 | AAV2 | Fluorogenic nucleic acid stain (POPO™-3 formulation) | TRI | 8.0 | 100 | 100 |
| 19-3 | AAV2 | Fluorogenic nucleic acid stain (POPO™-3 formulation) | PBS | 7.4 | 50 | 100 |
| 19-4 | AAV2 | Fluorogenic nucleic acid stain (POPO™-3 formulation) | PBS | 7.4 | 100 | 100 |
| 19-5 | AAV2 | Fluorogenic nucleic acid stain (POPO™-3 formulation) | MES | 5.5 | 50 | 100 |
| 19-6 | AAV2 | Fluorogenic nucleic acid stain (POPO™-3 formulation) | MES | 5.5 | 100 | 100 |

Results are summarized in Table 38, indicating much more effective staining of AAV2 at pH 5.5 compared to staining at either pH 8.0 or pH 7.4. Compared to Example 18, titer concentrations are somewhat higher due to the larger amount of POPO™-3 formulation used to prepare fluorogenic staining compositions,

TABLE 38

Example 19- Corrected Flow Cytometry Results

| Test Series | Adeno-associated virus 2 Concentration (virus particles/mL) Dilution Factor 100 |
|---|---|
| 19-1 (pH 8.0, 50 mM NaCl) | $2.82 \times 10^6$ |
| 19-2 (pH 8.0, 100 mM NaCl) | $3.52 \times 10^6$ |
| 19-3 (pH 7.4, 50 mM NaCl) | $1.11 \times 10^6$ |
| 19-4 (pH 7.4, 100 mM NaCl) | $3.69 \times 10^6$ |
| 19-5 (pH 5.5, 50 mM NaCl) | $1.27 \times 10^8$ |
| 19-6 (pH 5.5, 100 mM NaCl) | $1.24 \times 10^8$ |

Example 20

Adeno-Associated Virus 2 (AAV2) Stained with Fluorogenic Dye for Nucleic Acid and with Antibody Stain at Acidic pH vs Physiological pH Fluid sample dilution series and corresponding blank samples with Adeno-associated virus 2 were prepared and stained at various pHs ranging from pH 8.0 to pH 5.5 with either fluorogenic stain for nucleic acid content using POPO™-3 formulation or using AAV2/3 fluorescent antibody stain for staining the non-enveloped viral capsid, as summarized in Table 39. Sodium Chloride concentrations in the sample dilution buffer for each test series is shown in Table 39. For the test using POPO™-3, the fluorogenic staining composition was prepared using 6 μL of the diluted POPO™-3 stain formulation. Stained fluid samples and blank samples were subjected to flow cytometry evaluation for quantification of Adeno-associated virus 2 particle concentration.

TABLE 39

Example 20 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 20-1 | AAV2 | Fluorogenic nucleic acid stain (POPO™-3 formulation) | PBS | 7.4 | 100 | 100 |
| 20-2 | AAV2 | Fluorescent Antibody Stain (AAV2/3) | PBS | 7.4 | 100 | 100 |

TABLE 39-continued

Example 20 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 20-3 | AAV2 | Fluorogenic nucleic acid stain (POPO™-3 formulation) | MES | 5.5 | 100 | 100 |
| 20-4 | AAV2 | Fluorescent Antibody Stain (AAV2/3) | MES | 5.5 | 100 | 100 |
| 20-5 | AAV2 | Fluorogenic nucleic acid stain (POPO™-3 formulation) | MES | 5.5 | 50 | 100 |
| 20-6 | AAV2 | Fluorescent Antibody Stain (AAV2/3) | MES | 5.5 | 50 | 100 |

Results are summarized in Table 40, indicating much more effective staining AAV2 at pH 5.5 compared to staining at pH 7.4 both for fluorogenic staining using POPO™-3 and for fluorescent antibody staining using AAV2/3. It is noted that determined concentrations based staining with POPO™-3 were generally higher than concentration based on staining with AAV2/3, Which may be an indication of some viral particles having empty non-enveloped capsids, that is not containing stainable nucleic acid content.

TABLE 40

Example 20- Corrected Flow Cytometry Results

| Test Series | Adeno-associated virus 2 Concentration (virus particles/mL) Dilution Factor 100 |
|---|---|
| 20-1 (pH 7.4, POPO™-3, 100 mM NaCl) | $1.92 \times 10^6$ |
| 20-2 (pH 7.4, AAV2/3, 100 mM NaCl) | $7.94 \times 10^7$ |
| 20-3 (pH 5.5, POPO™-3, 100 mM NaCl) | $1.51 \times 10^7$ |
| 20-4 (pH 5.5, AAV2/3, 100 mM NaCl) | $3.39 \times 10^8$ |
| 20-5 (pH 5.5, POPO™-3, 50 mM NaCl) | $1.72 \times 10^8$ |
| 20-6 (pH 5.5, AAV2/3, 50 mM NaCl) | $3.18 \times 10^8$ |

Example 21

Adeno-Associated Virus 2 (AAV2) Stained with Fluorogenic Dyes for Nucleic Acid and Protein Content at Acidic pH vs Physiological pH Fluid sample dilution series and corresponding blank samples with Adeno-associated virus 2 were prepared and stained with fluorogenic dyes from Combo Dye® concentrate at pH 7.4 or pH 5.5, as summarized in Table 41. Sodium Chloride concentrations in the sample dilution buffer for each test series is shown in Table 41. Stained fluid samples and blank samples were subjected to flow cytometry evaluation for quantification of Adeno-associated virus 2 particle concentration.

TABLE 41

Example 21 - Stained Fluid Samples Prepared and Tested

| Test Series | Virus Particles | Fluorescent Stain | Sample Dilution Buffer System | Stained Fluid Sample Approximate pH | NaCl Concentration (mM) | Dilution Factors Prepared & Tested |
|---|---|---|---|---|---|---|
| 21-1 | AAV2 | Fluorogenic Dyes (Combo Dye ®) | PBS | 7.4 | 100 | 10/100/1000/10,000 |
| 20-2 | AAV2 | Fluorogenic Dyes (Combo Dye ®) | MES | 5.5 | 50 | 100/1000/10,000 |

Results are summarized in Table 42, indicating much more effective staining of AAV2 at pH 5.5 compared to staining at pH 7.4. Notably, counts for nucleic acid and protein stains both increase for fluid samples stained at pH 5.5 relative to staining at pH 7.4, but increase in particle counts is more pronounced for nucleic acid stain than for protein stain, indicating enhanced accessibility of nucleic acid content in the capsid for staining by the fluorogenic nucleic acid stain.

TABLE 42

Example 21- Corrected Flow Cytometry Results

| Test Series | Adeno-associated virus 2 Concentration (virus particles/mL) | | | | |
|---|---|---|---|---|---|
| | Dilution Factor 10 | Dilution Factor 100 | Dilution Factor 1000 | Dilution Factor 10,000 | Titer (virus particles/mL) |
| 21-1 (pH 7.4, Combo Dye ®) | N/A* | $5.57 \times 10^5$ | $4.75 \times 10^6$ | N/A* | $2.40 \times 10^9$ |
| 21-2 (pH 5.5, Combo Dye ®) | — | $2.77 \times 10^7$ | $9.58 \times 10^7$ | $6.35 \times 10^6$ | $5.42 \times 10^{10}$ |

*Results excluded as anomalous or because uncorrected counts below instrument

Exemplary Implementation Combinations

Some other contemplated embodiments of implementation combinations for various aspects of this disclosure, with or without additional features as disclosed above or elsewhere herein, are summarized in exemplary numbered combinations presented below, and in the appended claims:

1. A method for flow cytometry evaluation of a biological material for unassociated non-enveloped viral particles having a non-enveloped viral capsid, the method comprising:
preparing; a fluorescently-stained fluid sample lot flow cytometry evaluation, the fluorescently-stained fluid sample comprising:
an aqueous liquid medium;
a sample of biological material to be evaluated by flow cytometry for the unassociated non-enveloped viral particles having the non-enveloped viral capsid;
at least one fluorescent stain to fluorescently stain the unassociated non-enveloped viral particles to prepare unassociated labeled particles of virus size dispersed in the aqueous liquid medium, wherein each said unassociated labeled particle comprise a said unassociated non-enveloped viral particle stained with the at least one fluorescent stain, and wherein each said fluorescent stain has a fluorescent emission response when the unassociated labeled particle is subjected to a stimulation radiation;
after the preparing, subjecting the fluorescently-stained fluid sample to flow cytometry evaluation in a flow cytometer, the flow cytometry evaluation comprising flowing the fluorescently-stained fluid sample through an investigation zone of the flow cytometer and in the investigation zone subjecting the fluorescently-stained fluid sample to the stimulation radiation and detecting for the fluorescent emission response from the investigation zone and counting identified occurrences of the unassociated labeled particles; and
the preparing the fluorescently-stained fluid sample comprising fluorescent staining the biological material in a fluid sample composition with a said fluorescent stain to prepare a stained fluid sample composition at an acidic pH in an acidic pH range of from pH 3.0 to pH 6.5.

2. The method of combination 1, wherein the acidic pH of stained fluid sample composition is not larger than pH 6.0.

3. The method of either one of combination 1 or combination 2, wherein the acidic pH of the stained fluid sample composition is not smaller than pH 4.5.

4. The method of any one of combinations 1-3, wherein the acidic pH range is from pH 4.0 to pH 6:0.

5. The method of any one of combinations 1-4, wherein the at least one fluorescent stain comprises a fluorogenic dye for staining of nucleic acid content inside the viral capsid of the non-enveloped viral particles.

6. The method of combination 5, wherein the fluorogenic dye is a first fluorogenic dye and the at least one fluorescent stain comprises a second fluorogenic dye for staining of protein content of the viral capsid.

7. The method of either one of combination 5 or combination 6, wherein the fluorescently-stained fluid sample as prepared during the preparing and as fed to the flow cytometer comprises an organic liquid component as a minor component, on a molar basis, of the aqueous liquid medium, optionally with the fluorescently-stained fluid sample comprising at 0.25 weight percent or at least 0.5 weight percent of the organic liquid component or another minimum concentration as described elsewhere herein, and with a separate or further option being that the fluorescently-stained fluid sample comprises up to 30 weight percent of the organic liquid component or up to another maximum concentration as described elsewhere herein.

8. The method of combination 7, wherein the organic liquid component is dimethyl sulfoxide (DMSO).

9. The method of combination 7, wherein the organic liquid component is acetonitrile.

10. The method of one of combinations 7-9, wherein the aqueous liquid medium comprises a weight ratio of water to the organic liquid component in a range of from 30:1 to 3000:1.

11. The method daily one of combinations 7-10, wherein the preparing the fluorescently-stained fluid sample comprises:
first preparatory processing to prepare a concentrated stain formulation with the fluorogenic dye containing at least one aromatic group susceptible to pi stacking interactions in aqueous liquids, the first preparatory processing comprising dissolving the fluorogenic dye into a first liquid medium from a dry powder dye composition with the fluorogenic dye, wherein the first liquid medium comprises the organic liquid component;
after the first preparatory processing, second preparatory processing while the fluorogenic dye remains in solution to prepare an aqueous diluted stain formulation comprising the fluorogenic dye dissolved in a diluted aqueous liquid comprising the organic liquid component, the second preparatory processing comprising diluting the first liquid medium with aqueous stain dilution liquid at a volume ratio of the aqueous stain dilution liquid to the first liquid medium of at least 10:1 to prepare the diluted aqueous liquid with a weight ratio of water to the organic liquid component of at least 10:1; and
during the fluorescent staining, mixing at least a portion of the aqueous diluted stain formulation with the fluid sample composition, and optionally with the fluid sample composition already at a pH within the acidic pH range prior to the mixing.

12. The method of combination 11, wherein the first preparatory processing comprises mixing the dry powder dye composition with the first liquid medium and after the mixing permitting the resulting mixture to sit for a residence time of at least 3 minutes prior to diluting the first liquid medium with the aqueous stain dilution liquid during the second preparatory processing; and preferably for a residence time of at least 7 minutes when the organic liquid component is DMSO.

13. The method according to either one of combination 11 or combination 12, wherein,
the fluorogenic dye is a first fluorogenic dye with a first fluorescent emission signature and the at least one stain comprises a second fluorogenic dye for staining of protein content of the viral capsid, the second fluorogenic dye containing at least one aromatic group susceptible to pi stacking interactions in aqueous liquids and having a second fluorescent emission signature that is different than the first fluorescent emission signature;
the dry powder dye composition comprises a dry powder mixture including the first fluorogenic dye and the second fluorogenic dye;
the first preparatory processing comprises dissolving the second fluorogenic dye into the first liquid medium from the dry powder dye composition to prepare the concentrated stain formulation including the second fluorogenic dye, wherein the stained fluid sample composition includes both the first fluorogenic dye and the second fluorogenic dye;
the second preparatory processing comprises, while the second fluorogenic dye remains in solution, preparing the aqueous diluted stain formulation comprising the first fluorogenic dye and the second fluorogenic dye dissolved in the diluted aqueous liquid; and
the flow cytometry evaluation comprises detecting and counting occurrences of the unassociated labeled particles stained with both the first fluorogenic dye and the second fluorogenic dye.

14. The method of any one of combinations 11-13, wherein the aqueous stain dilution liquid has a pH in the acidic pH range.

15. The method of any one of combinations 11-14, wherein the diluted aqueous liquid of the aqueous diluted stain formulation has a pH in the acidic pH range.

16. The method of any one of combinations 6-10, wherein the preparing the fluorescently-stained fluid sample comprises:
providing a liquid dye concentrate comprising the first fluorogenic dye and the second fluorogenic dye in a stain liquid medium; and
during the fluorescent staining, mixing the liquid dye concentrate with the fluid sample composition;
and wherein the method comprises at least one member selected from the group consisting of:
(i) the stain liquid medium comprising a mixture including water and liquid phase organic material, and preferably the stain liquid medium aqueous, and more preferably the stain liquid medium of the liquid dye concentrate comprising more than 50 percent by moles of water;
(ii) the liquid dye concentrate comprising disaccharide dissolved in the stain liquid medium;
(iii) the providing the liquid dye concentrate being in the absence of reconstituting the fluorogenic dyes from a dry form into the stain liquid medium; and
(iv) combinations including two or more of any of (i)-(iii).

17. The method of claim 16, wherein the fluorescent staining comprises combining the fluid sample composition and the liquid dye concentrate at a volume ratio of volume of the liquid dye concentrate to volume of the fluid sample composition of at least 1:125.

18. The method of either one of combination 16 or combination 17, wherein the fluorescent staining comprises combining the fluid sample composition with a volume of the liquid dye concentrate in a volume ratio of the volume of the liquid dye concentrate to a volume of the fluid sample composition of no greater than 1:24.

19. The method of any one of combinations 16-18, comprising the providing the liquid dye concentrate being in the absence of reconstituting the first and second fluorogenic dyes from a dry form into the stain liquid medium.

20. The method of any one of combinations 16-19, wherein the providing the liquid dye concentrate comprises unsealing a sealed container containing the aqueous liquid dye concentrate and removing from the unsealed container a quantity of the liquid dye concentrate for combining with the fluid sample composition during the staining.

21. The method of combination 20, wherein the sealed container containing the liquid dye concentrate is provided in a kit also comprising a different sealed container containing an aqueous sample dilution liquid, optionally with the sealed containers packaged in a common packaging enclosure, and optionally with the aqueous sample dilution liquid at an acidic pH of up to pH 6.5, and preferably not smaller than pH 3.0, and optionally the pH of the aqueous sample dilution liquid is in the acidic pH range.

22, The method of combination 21, comprising:
providing a plurality of said fluid sample compositions each with a portion of a biological material from a stock source and each diluted to different dilution ratios with the aqueous sample dilution liquid;
and separately subjecting each said fluorescently-stained fluid sample to the flow cytometry.

23. The method of any one of combinations 16-22, wherein the stain liquid medium comprises a liquid mixture including water and liquid phase organic material.

24. The method of combination 23, wherein the fluorescently-stained fluid sample comprises a concentration of the liquid phase organic material of at least 0.25 weight percent, optionally at least 0.35 weight percent or optionally at least 0.5 weight percent.

25. The method of either one of combination 23 or combination 24, wherein the fluorescently-stained fluid sample comprises a concentration of the liquid phase organic material of no larger than 2 weight percent, optionally no larger than 1.25 weight percent or optionally no larger than 0.75 weight percent, and with one preferred range for the concentration of the liquid phase organic material being from 0.25 weight percent to 1.25 weight percent and a more preferred range being from 0.5 weight percent to 1.25 weight percent.

26. The method of any one of combinations 1-25, wherein the fluorescently-stained fluid sample comprises a disaccharide dissolved in the stain liquid medium.

27. The method of combination 26, wherein the fluorescently-stained fluid sample comprises a concentration of the disaccharide of at least 0.1 weight percent, optionally at least 0.2 weight percent or optionally at least 0.3 weight percent.

28. The method of either one of combination 26 or combination 27, wherein the fluorescently-stained fluid sample comprises a concentration of the disaccharide of no larger than 3 weight percent, optionally no larger than 2 weight percent, optionally no larger than 1 weight percent or optionally no larger than 0.75 weight percent; and with one preferred range for the concentration for the concentration of the disaccharide being from 0.1 weight percent to 2 weight percent and a more preferred range being from 0.2 weight percent to 1 weight percent.

29. The method of any one of combinations 1-28, wherein the preparing the fluorescently-stained fluid sample comprises diluting a preliminary fluid sample with aqueous sample dilution liquid to prepare a diluted preliminary fluid sample, wherein the aqueous sample dilution liquid has a pH in the acidic pH range.

30. The method of combination 29, wherein the diluted preliminary fluid sample has a pH in the acidic pH range.

31. The method of either one of combination 29 or combination 30, wherein the fluorescent staining comprises adding the said fluorescent stain to the diluted preliminary fluid sample as the fluid sample composition.

32. The method of any one of combinations 29-31 wherein the diluting comprises adding to the preliminary fluid sample a quantity of the aqueous sample dilution liquid to prepare the diluted preliminary fluid sample at a dilution factor of at least 5 relative to the preliminary fluid sample.

33. The method of any one of combinations 1-32, wherein the at least one fluorescent stain comprises a fluorescent antibody stain for binding with an epitope of the viral capsid of the unassociated non-enveloped viral particle.

34. The method of combination 33, wherein the preparing the fluorescent-stained fluid sample comprises:
mixing the fluorescent antibody stain with the biological material and
after the mixing not separating an unbound portion of the fluorescent antibody stain from the biological material prior to the flow cytometry evaluation, wherein the fluorescently-stained fluid sample as subjected to flow cytometry comprises the unbound portion of the fluorescent stain.

35. The method of either one of combination 33 or combination 34, wherein:
the fluorescently-stained fluid sample as fed to the flow cytometer includes the unbound portion of the fluorescent antibody stain at a concentration within a range having a lower limit and an upper limit;
the lower limit is 0.25 microgram per milliliter, optionally 0.35 microgram per milliliter, as another option 0.5 microgram per milliliter, as another option 0.75 microgram per milliliter, as another option 1 microgram per milliliter and as yet another option 1.5 micrograms per milliliter; and
the upper limit is 10 micrograms per milliliter, optionally 8 micrograms per milliliter, as another option 6 micrograms per milliliter, as another option 5 micrograms per milliliter, as another option 4 micrograms per milliliter and as yet another option 3 micrograms per milliliter.

36. The method of any one of combinations 33-35 wherein the fluorescently-stained fluid sample as fed to the flow cytometer includes a primary antibody for binding with the epitope, and wherein the fluorescent antibody stain comprises a secondary antibody with fluorophore to bind with the primary antibody to indirectly fluorescently stain the unassociated non-enveloped viral particles.

37. The method of any one of combinations 33-36, wherein the epitope is a conformational epitope of the viral capsid.

38. The method of any one of combinations 33-36, wherein the epitope is a sequential epitope of the viral capsid.

39. The method of any one of combinations 33-38, wherein the fluorescent antibody stain comprises a said fluorescent stain in the fluorescent staining and the stained fluid sample composition at the acidic pH includes the fluorescent antibody stain.

40. The method of combination 39, wherein:
the at least one fluorescent stain comprises a fluorogenic dye for staining of nucleic acid content inside the viral capsid of the non-enveloped viral particles; and
the fluorogenic dye for staining of nucleic acid comprises a said fluorescent stain in the fluorescent staining and the stained fluid sample composition at the acidic pH includes the fluorogenic dye.

41. The method of any one of combinations 1-40, wherein as fed to the flow cytometer the fluorescently-stained fluid sample has a pH in the acidic pH range.

42. The method of combination 41, wherein as fed to the flow cytometer the fluorescently-stained fluid sample is the stained fluid sample composition from the fluorescent staining.

43. The method of any one of combinations 33-3920-25, wherein the at least one fluorescent stain comprises a fluorogenic dye for staining of nucleic acid content inside the viral capsid of the non-enveloped viral particles.

44. The method of combination 43, wherein the fluorogenic dye for staining of nucleic acid content comprises a said fluorescent stain in the fluorescent staining and the stained fluid sample composition includes the fluorogenic dye for staining of nucleic acid content.

45. The method of combination 44, wherein as fed to the flow cytometer the fluorescently-stained fluid sample has a pH in the acidic pH range.

46. The method of combination 45, wherein as fed to the flow cytometer the fluorescently-stained fluid sample is the stained fluid sample composition of the fluorescent staining.

47. The method of combination 43, wherein:
the fluorescent staining, is a first fluorescent staining the biological material and the stained fluid sample composition is a first stained fluid sample composition, and the preparing the fluorescently-stained fluid sample comprises second fluorescent staining the biological material after the first fluorescent staining; and
the second fluorescent staining comprises staining the biological material with the fluorescent antibody stain to prepare a second stained fluid sample composition including both the fluorescent antibody stain and the fluorogenic dye for staining of nucleic acid content, wherein the second stained fluid sample composition is at a second pH that is larger than the acidic pH.

48. The method of combination 47, wherein t e second pH is at least 0.5 pH unit larger than the acidic pH.

49. The method of either one of combination 47 or combination 48, wherein the second pH is pH 5.5 or larger.

50. The method of combination 49, wherein the second pH is pH 6.0 or larger.

51. The method of combination 49, wherein the second pH is larger than pH 6.5.

52. The method of any one of combinations 47-51 wherein the preparing the fluorescently-stained fluid sample comprises after the first fluorescent staining and prior to the second fluorescent staining;
adjusting pH, comprising raising the pH of the first stained fluid sample composition to prepare a pH adjusted stained fluid sample composition at a higher pH than the acidic pH, wherein the higher pH is at least 0.5 pH units larger than the acidic pH.

53. The method of combination 52, wherein the second fluorescent staining comprises adding the fluorescent antibody stain to the pH adjusted fluid sample.

54. The method of any one of combinations 1-53, wherein the aqueous liquid medium comprises aqueous buffer solution, optionally including buffering agent based on a buffering system selected from the group consisting of 2-(N- morpholino)ethanesulfonic acid (MES), citric acid, acetic acid, cacodylic acid, phosphoric acid, a salt of any of the foregoing and combinations thereof.

55. The method of any one of combinations 1-54, wherein the flow cytometry evaluation comprises flowing the fluorescently-stained fluid sample through the investigation zone at a flow rate in a range of from 300 nanoliters per minute to 6000 nanoliters per minute while subjecting the fluorescently-stained fluid sample to the stimulation radiation, and preferably the flow rate is in a range of float 600 nanoliters per minute to 3000 nanoliters per minute.

56. The method of any one of combinations 1-55, wherein the flow cytometry evaluation comprises evaluating only fluorescent emission response from the investigation zone to identify occurrences of the unassociated labeled particles, and not evaluating light scatter from the investigation zone.

57. The method of any one of combinations 1-56, wherein the at least one fluorescent stain includes a plurality of fluorescent stains and the flow cytometry evaluation comprises detecting for a separate fluorescent emission response from each of the said plurality of fluorescent stains.

58. The method of combination 57, wherein the flow cytometry evaluation comprises identifying coincidences of at least two different fluorescent emission responses from the plurality of fluorescent stains indicative of passage through the investigation zone of a said unassociated labeled particle including the at least two different fluorescent stains.

59. The method of combination 58, wherein the flow cytometry evaluation comprises counting as occurrences of said unassociated non-enveloped viral particles identified coincidences of the at least two different fluorescent emission responses.

60. The method of any one of combinations 1-59, wherein the unassociated non-enveloped viral particles are virions.

61. The method of any one of combinations 1-59, wherein the unassociated non-enveloped viral particles are virus-like particles.

62. The method of any one of combinations 1-61, wherein the unassociated non-enveloped viral particles are genetically modified.

63. The method of any one of combinations 1-62, wherein the viral capsid is of virus family Adenoviridae, and optionally of an adenovirus.

64. The method of any one of combinations 1-62, wherein the viral capsid is of virus family Parvoviridae, and optionally of an adeno adeno-associated virus, and as another option of a Minute virus of mice.

65. The method of any one of combinations 1-62, wherein the viral capsid is of virus family Parvoviridae, and optionally of an enterovirus.

66. The method of any one of combinations 1-62, wherein the viral capsid is of virus family Reoviridae, and optionally of a rotavirus.

67. The method of any one of combinations 1-62, wherein the viral capsid is of virus family Papillomaviridae.

68. The method of any one of combinations 1-62, wherein the viral capsid is of virus family Polyomaviridae.

69. The method of any one of combinations 1-62, wherein the viral capsid is of virus family Bidnaviridae.

70. The method of any one of combinations 1-62, wherein the viral capsid is of virus family Circoviridae.

71. The method of any one of combinations 1-62, wherein the viral capsid is of virus family Astroviridae.

72. The method of any one of combinations 1-62, wherein the viral capsid is of virus family Calciriviridae.

73. The method of any one of combinations 1-62, wherein the viral capsid is of virus family Hepeviridae.

74. The method of any one of combinations 1-62, wherein the viral capsid is of virus family Potyviridae.

75. The method of any one of combinations 1-62, wherein the viral capsid is of virus family Papovaviridae.

76. The method of any one of combinations 1-62, wherein the viral capsid is of a virus family selected from the group consisting of Myoviridae; Podoviridae; Siphoviridae; Rudiviridae; Clavaviridae; Corticoviridae; Marseilleviridae; hycodnaviridae; Sphaerolipoviridae; Tectiviridae; Turriviridae; Lavidaviridae; Spiraviridae; Anelloviridae; Geminiviridae; Genomoviridae; Inoviridae; Microviridae; Nanoviridae; Spiraviridae; Amalgaviridae; Birnaviridae; Chrysovirus; Endornaviridae; Hypoviridae; Megabirnaviridae; Partitiviridae; Totiviridae; Quadriviridae; Dicistroviridae; flaviridae; Marnaviridae; Secoviridae; Alphaflexiviridae; Betaflexiviridae; Gammaflexiviridae; Tymoviridae; Barnaviridae; Benyviridae; Bromoviridae; Carmotetraviridae; Closteroviridae; Leviviridae; Luteoviridae; Nodaviridae; Permutotetraviridae; Tombusviridae; Virgaviridae and Aspiviridae.

77. The method of any one of combinations 1-62, wherein the viral capsid is of a bacteriophage.

78. The method of any one of combinations 1-77, wherein the unassociated non-enveloped viral particles have a particle size of 2 microns or smaller, optionally 1 micron or smaller, as another option 600 nanometers or smaller, as another option 300 nanometers or smaller, as another option 200 nanometers or smaller and as yet a further option 100 nanometers or smaller.

79. The method of any one of combinations 1-78, wherein the unassociated non-enveloped viral particles have a particle size of at least 10 nanometers, optionally at least 20 nanometers, as another option at least 30 nanometers, and as yet another option at least 40 nanometers.

80. The method of any one of combinations 1-79, wherein the unassociated labeled particles have a particle size of 2.1 microns or smaller, optionally 1.1 microns or smaller, as another option 625 nanometers or smaller, as another option 425 nanometers or smaller, as another option 325 nanometers or smaller, as another option 225 nanometers or smaller and as yet another option 125 nanometers or smaller.

81. A kit for preparing a fluorescently-stained fluid sample for flow cytometry evaluation of biological material for quantification of unassociated non-enveloped viral particles of virus size, having a non-enveloped viral capsid, the kit comprising:
 a plurality of sealed containers;
 a fluorescent stain composition for fluorescent staining the unassociated non-enveloped viral particles to prepare unassociated labeled particles of virus size, each said unassociated labeled particle of virus size comprising a said unassociated non-enveloped viral particle stained with a fluorescent stain from the fluorescent stain composition, the fluorescent stain composition comprising at least one fluorescent stain and being contained in a first said sealed container;
 an aqueous dilution liquid for preparing a pH-adjusted fluid sample for fluorescent staining biological material at in an acidic pH of up to pH 6.5 during preparation of the unassociated labeled particles of virus size dispersed in an aqueous medium for flow cytometry evaluation of a fluorescently-stained fluid sample with the biological material, the aqueous dilution liquid having an acidic pH of no larger than pH 6.5 and being contained in a second said sealed container.

82. The kit of combination 81, wherein the first said sealed container and the second said sealed container are packaged in a common packaging enclosure.

83. The kit of combination $2, wherein the common packaging enclosure is a hermetically sealed enclosure.

84. The kit of any one of combinations 81-83, wherein the at least one fluorescent stain of the fluorescent stain composition comprises a fluorogenic dye for nonspecific staining nucleic acid content inside the viral capsid of the non-enveloped viral particles.

85. The kit of combination 84, wherein the fluorogenic dye is a first fluorogenic dye with a first fluorescent emission signature and the at least one fluorescent stain of the fluorescent stain composition comprises a second fluorogenic dye for nonspecific staining of protein content of the viral capsid, the second fluorogenic dye having a second fluorescent emission signature different than the first fluorescent emission signature.

86. The kit of combination 85, wherein each said fluorogenic dye in the fluorescent stain composition contains at least one aromatic group susceptible to pi stacking interactions in aqueous liquids.

87. The kit of any one of combinations 84-86, comprising a reconstitution liquid medium, the reconstitution liquid medium being a solvent for each said fluorogenic dye to provide each said fluorogenic dye in solution in the reconstitution liquid medium prior to mixing with the aqueous dilution liquid to prepare the pH-adjusted fluid sample, the reconstitution liquid medium comprising an organic liquid component;

and optionally, the reconstitution liquid medium is contained in the common packaging enclosure of either one of combination 82 or combination 83.

88. The kit of combination 874, wherein the organic liquid component is dimethyl sulfoxide (DMSO), and the reconstitution liquid medium comprises at least 34 percent by moles of DMSO.

8976. The kit of combination 87, wherein the organic liquid component is acetonitrile, and the reconstitution liquid medium comprises at least 34 percent by moles of the acetonitrile.

90. The kit of any one of combinations 87-89, wherein the reconstitution liquid medium is contained in a said sealed container, other than the first sealed container or the second sealed container, and optionally the other sealed container with the reconstitution liquid medium is contained in the common packaging enclosure of either one of combination 82 or combination 83.

91. The kit of any one of combinations 87-90, wherein the fluorescent stain composition comprises a dry powder dye composition including each said fluorogenic dye.

92. The kit of any one of combinations 87-89, wherein the fluorescent stain composition comprises the reconstitution liquid medium.

93. The kit of combination 92, wherein the fluorescent stain composition comprises each said fluorogenic dye dissolved in the reconstitution liquid medium.

94. The kit of any one of combinations 84-86, wherein the fluorescent stain composition comprises a dry powder stain composition including each said fluorogenic dye.

95. The kit of any one of combinations 84-94, wherein:
the fluorescent stain composition is a first fluorescent stain composition and the kit comprises a second fluorescent stain composition comprising a fluorescent antibody stain; and
the fluorescent antibody stain is either:
specific for binding with an epitope of die viral capsid for direct staining of the unassociated non-enveloped viral particles; or
specific for binding with a primary antibody that is specific for binding with all epitope of the viral capsid for indirect staining of the unassociated non-enveloped viral particles.

96. The kit of combination 95, wherein the kit comprises another said sealed container, other than the first sealed container or the second sealed container, containing the second fluorescent stain composition, and optionally the other sealed container with the second fluorescent stain composition is contained in the common packaging enclosure of either one of combination 69 or combination 70.

97. The kit of either one of combination 85 or combination 86, wherein the fluorescent stain composition comprises a liquid dye concentrate comprising the first fluorogenic dye and the second fluorogenic dye in a stain liquid medium, and wherein the liquid dye concentrate comprises at least one member selected from the group consisting of:
(i) the stain liquid medium comprising a liquid mixture including water and liquid phase organic material, and preferably the stain liquid medium is aqueous, and more preferably the stain liquid medium comprises more than 50 percent by moles of water;
(ii) disaccharide dissolved in the stain liquid medium; and
(iii) a combination including both (i) and (ii).

98. The kit of combination 97, wherein the stain liquid medium comprises the liquid mixture including water and liquid organic phase material.

99. The kit of combination 98, wherein the stain liquid medium is an aqueous liquid medium comprising a major proportion on a molar basis of water and a minor proportion on a molar basis of the liquid phase organic material in the liquid mixture.

100. The kit of either one of combination 98 or combination 99, wherein the liquid mixture is a single liquid phase comprised of mutually soluble liquid components.

101. The kit of any one of combinations 98-100, wherein the liquid phase organic material comprises dimethyl sulfoxide (DMSO).

102. The kit of combination 101, wherein the liquid phase organic material consists essentially of only DMSO.

103. The kit of any one of combinations 98-100, wherein the liquid phase organic material comprises acetonitrile.

104. The kit of any one of combinations 98-103, wherein the stain liquid medium comprises at least 10 weight percent of the liquid phase organic material, optionally at least 15 weight percent of the liquid phase organic material or optionally at least 20 weight percent of the liquid phase organic material.

105. The kit of any one of combinations 98-104, wherein the stain liquid medium comprises no greater than 50 weight percent of the liquid phase organic material, optionally no greater than 35 weight percent of the liquid phase organic material or optionally no greater than 30 weight percent of the liquid phase organic material.

106. The kit of any one of combinations 98-105, wherein the stain liquid medium comprises at least 50 weight percent water, optionally at least 60 weight percent water, optionally at least 65 weight percent water or optionally at least 70 weight percent water.

107. The kit of any one of combinations 98-106, wherein the stain liquid medium comprises no greater than 90 weight percent water.

108. The kit of any one of combinations 97-107, wherein the liquid dye concentrate comprises the disaccharide dissolved in the stain liquid medium.

109. The kit of combinations 108, wherein a concentration of the disaccharide in the liquid dye concentrate is at least 1 weight percent, optionally at least 2 weight percent, further optionally at least 3 weight percent, further optionally a least 4 weight percent, further optionally at least 6 weight percent, further optionally at least 9 weight percent or further optionally at least 12 weight percent.

110. The kit of either one of combination 108 Or combination 109, wherein the concentration of the disaccharide in the liquid dye concentrate is no greater than 45 weight percent, optionally no greater than 36 weight percent, further optionally no greater than 30 weight percent, further optionally no greater than 24 weight percent, further optionally no greater than 15 weight percent, further optionally no greater than 10 weight percent or further optionally no greater than 8 weight percent.

111. The kit of any one of combinations 81-83, wherein the at least one fluorescent stain comprises a fluorescent antibody stain, and the fluorescent antibody stain is either:
   specific for binding with an epitope of the viral capsid for direct staining of the unassociated non-enveloped viral particles; or
   specific for binding with a primary antibody that is specific for binding with an epitope of the viral capsid for indirect staining of the unassociated non-enveloped viral particles.

112. The kit of any one of combinations 95, 96 and 111, wherein the fluorescent antibody stain is specific for binding with an epitope of the viral capsid, and optionally the viral capsid is of a virus family of any one of combinations 63-76, and as another option the viral capsid is of a bacteriophage.

113. The kit of combination 112, wherein the fluorescent antibody stain is specific for binding with a conformational epitope of the viral capsid.

114. The kit of combination 113, wherein the fluorescent antibody stain is specific for binding with a sequential epitope of the viral capsid.

115. The kit of any one of combinations 95, 96 and 111, wherein the fluorescent antibody stain is specific for binding with a primary antibody that is specific for binding with an epitope of the viral capsid for indirect staining of the unassociated non-enveloped viral particles.

116. The kit of combination 115, comprising the primary antibody, optionally contained in the common packaging enclosure of either one of combination 81 or combination 82.

117. The kit of combination 116, wherein the primary antibody is contained in a said sealed container separate from the fluorescent antibody stain.

118. The kit of combination 116, wherein the primary antibody is contained in a said sealed container together with the fluorescent antibody stain.

119. The kit of any one of combinations 81-118, wherein the acidic pH of the aqueous dilution liquid is not larger than pH 6.0.

120. The kit of any one of combinations 81-119, wherein the acidic pH of the aqueous dilution liquid is not larger than 5.8.

121. The kit of any one of combinations 81-120, wherein the acidic pH of the aqueous dilution liquid is not larger than 5.6.

122. The kit of any one of combinations 81-121, wherein the acidic pH of the aqueous dilution liquid is not smaller than pH 3.0.

123. The kit of any one of combinations 81-122, wherein the acidic pH of the aqueous dilution liquid is not smaller than pH 4.0.

124. The kit of any one of combinations 81-123, wherein the acidic of the aqueous dilution liquid is not smaller than pH 4.5.

125. The kit of any one of combinations 81-124, wherein the acidic pH of the aqueous dilution liquid is not smaller than pH 5.0.

126. The kit of any one of combinations 81-125, wherein the aqueous dilution liquid comprises an aqueous buffer solution, optionally including a but agent based on a buffering system selected from the group consisting of 2-(N-morpholino)ethanesulfonic acid (MES), citric acid, acetic acid, cacodylic acid, phosphoric acid, a salt of any of the foregoing and combinations thereof.

127. The kit of any one of combinations 81-126, comprising a quantity of the fluorescent stain composition and a quantity of the aqueous dilution liquid for preparing at least 10 of the fluorescently-stained fluid samples for the flow cytometry evaluation.

128. The kit of combination 127, comprising a plurality of the first said sealed containers each comprising a portion of the quantity of the fluorescent stain composition.

129. The kit of any one of combinations 81-128, wherein the kit is for preparing a fluorescently-stained fluid sample comprising unassociated labeled particles of virus size dispersed in an aqueous liquid medium according the method of any one of combinations 1-67.

130. The kit of any one of combinations 81-129, wherein the aqueous dilution liquid is an aqueous sample dilution liquid to dilute a preliminary fluid sample including the biological material prior to a fluorescent staining step.

131. The kit of combination 130, comprising another said sealed container, other than the first sealed container and the second sealed container, containing an aqueous stain dilution liquid to prepare an aqueous diluted stain formulation to fluorescently stain the biological material, and optionally the other sealed container with the aqueous stain dilution liquid is packaged in the common packaging enclosure of either one of combination 82 or combination 83.

132. The kit of combination 131, wherein the aqueous sample dilution liquid and the aqueous stain dilution liquid have different compositions.

133. The kit of either one of combination 131 or combination 105, Wherein the aqueous stain dilution liquid has a higher pH than the acid pH of the aqueous sample dilution liquid.

134. The kit of any one of combinations 131-133, wherein the aqueous stain dilation liquid has a pH of larger than pH 6.5, optionally at least pH 7.0, and preferably no larger than pH 8.0.

135. The kit of any one of combinations 131-133, wherein the aqueous stain dilution liquid has a pH in an acidic pH range of from pH 3.0 to 6.5.

136. The kit of any one of combinations 130-135, wherein;
   the aqueous sample dilution liquid is a first aqueous sample dilution liquid and the kit comprises a second aqueous sample dilution liquid to dilute a preliminary stained fluid sample including the biological material following a fluorescent staining step;
   the second aqueous sample dilution liquid has a pH that is higher than the acidic pH of the first aqueous sample dilution liquid; and
   the second aqueous sample dilution liquid is contained in another sealed container, other than the first sealed container and the second sealed container, and optionally the other sealed container with the second aqueous sample dilution liquid is packaged in the common packaging enclosure of either one of combination 82 or combination 83.

137. The kit of combination 136, wherein the second aqueous sample dilution liquid has a composition that is different than, and is contained in a said fluid container that is different than any said fluid container that contains, any aqueous stain dilution liquid in the kit.

138. The kit of either on of combination 136 or 137, wherein the second aqueous sample dilution liquid has a pH that is at least 0.5 pH units larger than the acidic pH of the first aqueous sample dilution liquid.

139. The kit of any one of combinations 136-138, wherein the second aqueous sample dilution liquid has a pH of larger than pH 6.5, optionally at least pH 7.0, and preferably no larger than pH 8.0.

140. The kit of any one of combinations 81-139, comprising a disaccharide.

141. The kit of combination 140, wherein at least a portion of the dissolved disaccharide is in the aqueous dilution liquid.

142. The kit of either one of combination 140 or combination 141, wherein at least a portion of the dissolved disaccharide is in an aqueous sample dilution liquid.

143. The kit of any one of combinations 140-142, wherein at least a portion of the dissolved disaccharide is in an aqueous stain dilution liquid.

144. Use of the kit of any one of combinations 81-143 for preparation and flow cytometry evaluation of a fluorescently-stained fluid sample comprising unassociated labeled particles of virus size dispersed in an aqueous liquid medium.

145. The use of combination 144, wherein the flow cytometry evaluation is according to the method of any one of combinations 1-80.

146. The method of any one of combinations 1-80, wherein the stained fluid sample comprises dissolved disaccharide.

147. The method of combination 146, wherein at least a portion of the dissolved disaccharide is provided in an aqueous dilution liquid.

148. The method of either one of combination 146 or combination 147, wherein at least a portion of the dissolved disaccharide is provided in an aqueous sample dilution liquid.

149. The method of any one of combinations 146-149, wherein at least a pardon of the dissolved disaccharide is in an aqueous stain dilution liquid.

150. The method or kit of any of the previous combinations that comprise a disaccharide, wherein the said disaccharide comprises one or more than one member selected from the group consisting of trehalose, sucrose, lactose, lactulose, melibiose, melibiulose, cellobiose, nigerose, isomaltose, isomaltulose, maltulose, rutinose, β-laminaribiose, and maltose.

151. The method or kit of combination 150, wherein the said disaccharide comprises trehalose.

152. The method or kit of combination 151, wherein the said disaccharide consists essentially of only trehalose.

The foregoing description of the present invention and various aspects thereof has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrate processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing". "including" and "having", and grammatical variations of those terms in referring to the presence of one or more components, subcomponents or materials, also include and is intended to disclose the more specific embodiments in which the term "comprising", "containing", "including" or "having", (or the variation of such term) as the case may be, is replaced by any of the narrower terms "consisting essentially or" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. The term "at least a majority" means all or a majority part that is less than all. When reference is made to a "liquid medium" in which fluorogenic dyes are dissolved, such as in the case of the liquid medium of the liquid dye concentrate, it is meant the liquid medium of a liquid composition in which the fluorogenic dyes are dispersed in solution, and not including the fluorogenic dyes themselves. Such a liquid medium as used herein also does not include any suspended solids that may be carried by such a liquid composition. Such a liquid medium may include one or more than one normally-liquid components (e.g., DMSO and/or water and/or one or more other organic solvent components) and a liquid composition including the liquid medium may include one or more normally-solid materials (e.g., dissolved salts and other additives of buffer solutions) that may be in solution in the liquid medium of the liquid composition.

What is claimed is:

1. A method for flow cytometry evaluation of a biological material for unassociated non-enveloped viral particles having a non-enveloped viral capsid, the method comprising:

preparing a fluorescently-stained fluid sample for flow cytometry evaluation, the fluorescently-stained fluid sample comprising:
an aqueous liquid medium;
a sample of biological material to be evaluated by flow cytometry for the unassociated non-enveloped viral particles having the non-enveloped viral capsid;
at least one fluorescent stain to fluorescently stain the unassociated non-enveloped viral particles to prepare unassociated labeled particles of virus size dispersed in the aqueous liquid medium, wherein each said unassociated labeled particle comprise a said unassociated non-enveloped viral particle stained with the at least one fluorescent stain, and wherein each said fluorescent stain has a fluorescent emission response when the unassociated labeled particle is subjected to a stimulation radiation;

after the preparing, subjecting the fluorescently-stained fluid sample to flow cytometry evaluation in a flow cytometer, the flow cytometry evaluation comprising flowing the fluorescently-stained fluid sample through an investigation zone of the flow cytometer and in the investigation zone subjecting the fluorescently-stained fluid sample to the stimulation radiation and detecting for the fluorescent emission response from the investigation zone and counting identified occurrences of the unassociated labeled particles; and the preparing the fluorescently-stained fluid sample comprising fluorescent staining the biological material in a fluid sample composition with a said fluorescent stain to prepare a stained fluid sample composition at an acidic pH in an acidic pH range of from pH 3.0 to pH 6.5.

2. The method of claim 1, wherein the acidic pH range is from pH 4.0 to pH 6.0.

3. The method of claim 1, wherein the at least one fluorescent stain comprises a fluorogenic dye for staining of nucleic acid content inside the viral capsid of the non-enveloped viral particles.

4. The method of any one of claim 3, wherein the fluorogenic dye is a first fluorogenic dye and the at least one fluorescent stain comprises a second fluorogenic dye for staining of protein content of the viral capsid.

5. The method of claim 3, wherein as fed to the flow cytometer the fluorescently-stained fluid sample has a pH in the acidic pH range.

6. The method of claim 1, wherein the preparing the fluorescently-stained fluid sample comprises diluting a preliminary fluid sample with aqueous sample dilution liquid to prepare a diluted preliminary fluid sample, wherein the aqueous sample dilution liquid has a pH in the acidic pH range.

7. The method of claim 6, wherein the diluted preliminary fluid sample has a pH in the acidic pH range and the fluorescent staining comprises adding the said fluorescent stain to the diluted preliminary fluid sample as the fluid sample composition.

8. The method claim 1, wherein the at least one fluorescent stain comprises a fluorescent antibody stain for binding with an epitope of the viral capsid of the unassociated non-enveloped viral particle.

9. The method of claim 1, wherein as fed to the flow cytometer the fluorescently-stained fluid sample has a pH in the acidic pH range.

10. The method of claim 1, wherein:
the at least one fluorescent stain comprises a fluorogenic dye for staining of nucleic acid content inside the viral capsid of the non-enveloped viral particles;
the fluorescent staining is a first fluorescent staining the biological material and the stained fluid sample composition is a first stained fluid sample composition, and the preparing the fluorescently-stained fluid sample comprises second fluorescent staining the biological material after the first fluorescent staining; and
the second fluorescent staining comprises staining the biological material with a fluorescent antibody stain to prepare a second stained fluid sample composition including both the fluorescent antibody stain and the fluorogenic dye for staining of nucleic acid content, wherein the second stained fluid sample composition is at a second pH that is larger than the acidic pH by at least 0.5 pH unit, and the second pH is pH 5.5 or larger.

11. The method of claim 1, wherein the stained fluid sample comprises dissolved disaccharide.

12. The method of claim 3, wherein as fed to the flow cytometer the fluorescently-stained fluid sample is the stained fluid sample composition from the fluorescent staining.

13. The method of claim 10, wherein the second pH is pH 6.0 or larger.

14. The method of claim 1, wherein the unassociated non-enveloped viral particles are virions.

15. The method claim 1, wherein the unassociated non-enveloped viral particles are virus-like particles.

16. The method of claim 1, wherein the unassociated non-enveloped viral particles are genetically modified.

17. The method of claim 1, wherein the viral capsid is of a bacteriophage.

18. The method of claim 1, wherein the viral capsid is of virus family Adenoviridae or of virus family Parvoviridae.

19. The method of claim 1, wherein the unassociated non-enveloped viral particles have a particle size of from 30 nanometers to 1 micron.

20. The method of claim 11, wherein the disaccharide comprises trehalose.

* * * * *